United States Patent [19]
Yanagishita et al.

[11] Patent Number: 5,937,091
[45] Date of Patent: *Aug. 10, 1999

[54] METHOD AND APPARATUS FOR ASSIGNING TEMPORARY AND TRUE LABELS TO DIGITAL IMAGE

[75] Inventors: Hideki Yanagishita, Yokohama; Satoshi Naoi, Kawasaki, both of Japan

[73] Assignee: Fujitsu Ltd., Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/921,318

[22] Filed: Aug. 29, 1997

Related U.S. Application Data

[63] Continuation of application No. 08/311,456, Sep. 26, 1994, Pat. No. 5,717,784.

[30] Foreign Application Priority Data

Sep. 24, 1993 [JP] Japan .................................. 5-237552

[51] Int. Cl.$^6$ ...................................................... G06K 9/00
[52] U.S. Cl. ........................................... 382/180; 382/176
[58] Field of Search .................................... 382/173, 180, 382/204, 171, 164, 170, 176, 181, 190, 195, 203, 224, 243, 282, 283, 284, 286, 293, 308; 348/615, 672

[56] References Cited

U.S. PATENT DOCUMENTS

| | | | |
|---|---|---|---|
| H713 | 11/1989 | May et al. | 382/180 |
| 4,624,013 | 11/1986 | Urushibata | 382/180 |
| 4,718,101 | 1/1988 | Ariga et al. | 382/180 |
| 4,847,786 | 7/1989 | Wang et al. | 382/180 |
| 4,887,302 | 12/1989 | Urushibata | 382/180 |
| 5,073,953 | 12/1991 | Westdijk | 382/180 |
| 5,199,083 | 3/1993 | Takeda | 382/180 |
| 5,305,393 | 4/1994 | Kawai et al. | 382/9 |

*Primary Examiner*—Leo H. Boudreau
*Assistant Examiner*—Bijan Tadayon

[57] ABSTRACT

A method and apparatus for assigning a temporary label to each connected area in an image by scanning the image by using a window which has a size of two pixels in the vertical direction and of a plurality of pixels in the horizontal direction. A set of values of pixels contained in the above window is obtained and one of predetermined temporary label assignment rules corresponding to the obtained set of pixel values is selected. A temporary label is assigned to each pixel contained in the window, based on the above one of the temporary label assignment rules determined as above, and based on temporary labels of pixels in the second group in the window at the above each location. In addition, the temporary labels are converted to true labels, by scanning the image pixel within the at least one circumscribing area only, where each circumscribing area is predetermined so that the at least one circumscribing area contains all pixels which do not belong to a background area in the image.

15 Claims, 37 Drawing Sheets

| 1 | 1 | 1 | 4 | 5 |
|---|---|---|---|---|
| 2 | 3 | 6 | 7 | 7 |

Fig.6

| TEMPORARY LABEL | 0 | 1 | 2 | 3 | 4 | 5 | 6 | 7 |
|---|---|---|---|---|---|---|---|---|
| CONNECTED TEMPORARY LABEL | 0 | 0 | 1 | 1 | 0 | 4 | 1 | 5 |

TEMPORARY LABEL  0 1 2 3 4 5 6 7
TRUE LABEL | 0 | 1 | 1 | 1 | 2 | 2 | 1 | 2 |

TEMPORARY LABELED-PIXEL IMAGE → TRUE LABELED-PIXEL IMAGE

Fig.15

| | | | | |
|---|---|---|---|---|
| 1 | x1[1] | y1[1] | x2[1] | y2[1] |
| 2 | x1[2] | y1[2] | x2[2] | y2[2] |
| | ⋮ | ⋮ | ⋮ | ⋮ |
| L−1 | x1[L−1] | y1[L−1] | x2[L−1] | y2[L−1] |
| L | x1[L] | y1[L] | x2[L] | y2[L] |
| L+1 | x1[L+1] | y1[L+1] | x2[L+1] | y2[L+1] |
| L+2 | x1[L+2] | y1[L+2] | x2[L+2] | y2[L+2] |
| | ⋮ | ⋮ | ⋮ | ⋮ |
| | | | | |

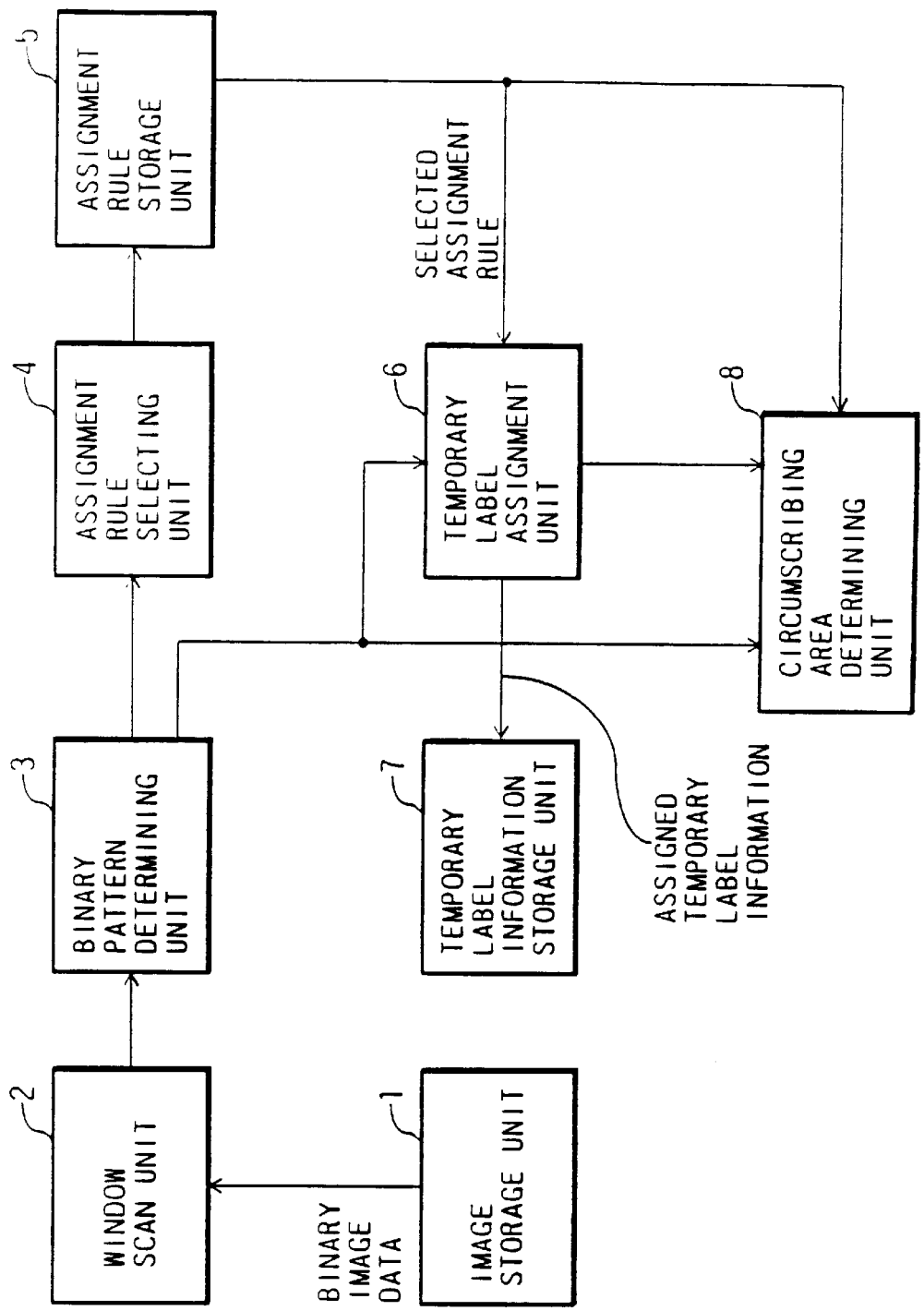

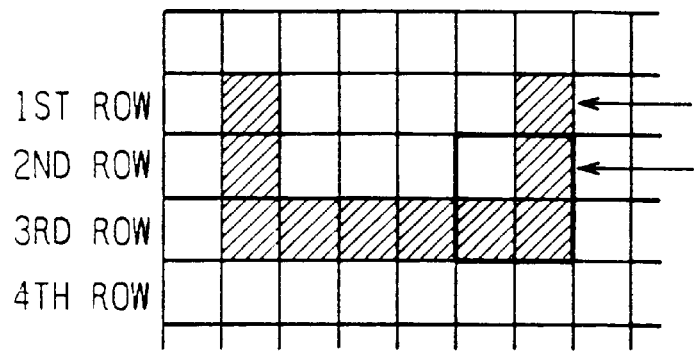

TEMPORARY LABEL
CONNECTED
TEMPORARY LABEL

TEMPORARY LABEL
TRUE LABEL

| | | |
|---|---|---|
| 0 | 0 | |
| 1 | 1 | |
| 2 | 2 | TB1 |
| ... | ... | |
| L-1 | L-1 | |
| TOP OF TEMPORARY LABEL → L | 1 | |
| L+1 | 1 | |
| L+2 | 2 | TB2 |
| ... | ... | |

| 0 | RULE FOR PATTERN 0 |
| 1 | RULE FOR PATTERN 1 |
| 2 | RULE FOR PATTERN 2 |
| ⋮ | ⋮ |
| 254 | RULE FOR PATTERN 254 |
| 255 | RULE FOR PATTERN 255 |

Fig.43A

| PATTERN | PROCESS (RULE) |
|---|---|
| a | (1) RENEW X₂ WHEN LEFT ADJACENT PAIR IS ▯.<br>(2) ASSIGN LABEL "0" TO ▭▭▭▭. |
| c & a' | (1) RENEW X₂ WHEN LEFT ADJACENT PAIR IS ▯.<br>(2) ASSIGN LABEL "0" TO ▭▭. |
| d & b' | (1) RENEW X₂ WHEN LEFT ADJACENT PAIR IS ▯.<br>(2) ASSIGN LABEL "0" TO ▭▭.<br>(3) RENEW Y₂. |
| e & c' | (1) RENEW X₂ WHEN LEFT ADJACENT PAIR IS ▯.<br>(2) ASSIGN LABEL "0" TO VALUE "0" PIXEL OF →▭▭, ASSIGN NEW LABEL TO VALUE "1" PIXEL OF ▭▭← WHEN UPPER RIGHT ADJACENT PIXEL IS VALUE "0" PIXEL, AND ASSIGN SAME LABEL AS UPPER RIGHT ADJACENT PIXEL WHEN UPPER RIGHT PIXEL IS VALUE "1" PIXEL. SET NEW X₁ & Y₁ (SEE (2) OF FIG.44A) |

▯ : PIXEL OF VALUE "1"
▯ : PIXEL OF VALUE "0"
▭▭ : LOWER PIXELS OF PATTERN ▭▭

Fig. 43B

| PATTERN | PROCESS (RULE) |
|---|---|
| f & d' | (1) RENEW $X_2$ WHEN LEFT ADJACENT PAIR IS ▢. <br> (2) ASSIGN LABEL "0" TO VALUE "0" PIXEL OF ▢. AND ASSIGN SAME LABEL AS UPPER PIXEL ▢ TO VALUE "1" PIXEL OF ▢. |
| g & e' | (1) CONNECT TO LEFT ADJACENT PIXEL WHEN LEFT ADJACENT PAIR IS ▢. <br> (2) ASSIGN LABEL "0" TO ▢. <br> (3) RENEW $X_2$. |
| h & f' | (1) CONNECT TO LEFT ADJACENT PAIR WHEN LEFT ADJACENT PAIR IS ▢. <br> (2) RENEW $Y_2$ WHEN LEFT ADJACENT WHEN LEFT ADJACENT PAIR IS ▢. <br> (3) ASSIGN LABEL "0" TO ▢. |
| i & g' | (1) CONNECT TO LEFT ADJACENT PIXEL LABEL WHEN LEFT ADJACENT PAIR IS ▢. <br> (2) ASSIGN LABEL "0" TO VALUE "0" PIXEL OF ▢. <br> (3) ASSIGN SAME LABEL AS ▢ TO VALUE "1" PIXEL OF ▢. |

Fig. 43C

| PATTERN | PROCESS (RULE) |
|---|---|
| <br><br>j & h' | (1) CONNECT TO LEFT ADJACENT PIXEL LABEL WHEN LEFT ADJACENT PAIR IS .<br>(2) ASSIGN LABEL "0" TO VALUE "0" PIXEL OF , AND ASSIGN SAME LABEL AS  TO VALUE "1" PIXEL OF . |
| <br><br>k & i' | (1) ASSIGN LABEL "0" TO .<br>(2) RENEW $X_2$ WHEN LEFT ADJACENT PAIR IS  OR  OR .<br>(3) ASSIGN SAME LABEL AS UPPER LEFT ADJACENT PIXEL TO VALUE "1" PIXEL  AND SET NEW $X_1$ & $Y_1$ (SEE (1) OF FIG.44A) WHEN LEFT ADJACENT PAIR IS . |
| <br><br>l & j' | (1) ASSIGN LABEL "0" TO VALUE "0" PIXEL OF , AND ASSIGN SAME LABEL AS  TO VALUE "1" PIXEL OF .<br>(2) CONNECT TO LEFT ADJACENT PIXEL LABEL WHEN LEFT ADJACENT PAIR IS  OR .<br>(3) CONNECT TO UPPER LEFT ADJACENT PIXEL LABEL WHEN LEFT ADJACENT PAIR IS . |

Fig. 43D

| PATTERN | PROCESS (RULE) |
|---|---|
| m & k' | (1) ASSIGN SAME LABEL AS LEFT ADJACENT PIXEL TO VALUE "1" PIXELS WHEN LEFT ADJACENT PAIR IS OR . <br> (2) ASSIGN SAME LABEL AS UPPER LEFT ADJACENT PIXEL TO VALUE "1" PIXELS WHEN LEFT ADJACENT PAIR IS . <br> (3) ASSIGN NEW LABEL TO VALUE "1" PIXELS , AND SET NEW $X_1$ & $Y_1$ (SEE (2) OF FIG.44A) WHEN LEFT ADJACENT PAIR IS AND UPPER RIGHT ADJACENT PIXEL IS VALUE "0" PIXEL. <br> (4) ASSIGN SAME LABEL AS UPPER RIGHT ADJACENT PIXEL WHEN LEFT ADJACENT PAIR IS AND UPPER RIGHT ADJACENT PIXEL IS VALUE "1" PIXEL |
| n & l' | (1) ASSIGN SAME LABEL AS ← TO . <br> (2) CONNECT TO LEFT ADJACENT PIXEL LABEL WHEN LEFT ADJACENT PAIR IS OR . <br> (3) CONNECT TO UPPER LEFT ADJACENT PIXEL LABEL WHEN LEFT ADJACENT PAIR IS . <br> (4) RENEW $X_1$ WHEN LEFT ADJACENT PAIR IS . |

Fig. 43E

| PATTERN | PROCESS (RULE) |
|---|---|
| o & m' | (1) ASSIGN SAME LABEL AS →▦ TO ▤, AND ASSIGN LABEL "0" TO ▤. <br> (2) CONNECT TO LEFT ADJACENT PIXEL LABEL WHEN LEFT ADJACENT PAIR IS ▯. |
| p & n' | (1) ASSIGN SAME LABEL AS ▦← TO ▤, AND ASSIGN LABEL "0" TO ▤. <br> (2) CONNECT TO LEFT ADJACENT PIXEL LABEL WHEN LEFT ADJACENT PAIR IS ▯. |
| q & o' | (1) ASSIGN SAME LABEL AS →▦ TO ▤. <br> (2) CONNECT TO LEFT ADJACENT PIXEL LABEL WHEN LEFT ADJACENT PAIR IS ▯. |
| r & p' | (1) ASSIGN SAME LABEL AS ▦← TO ▤. <br> (2) CONNECT TO LEFT ADJACENT PIXEL LABEL WHEN LEFT ADJACENT PAIR IS ▯. |

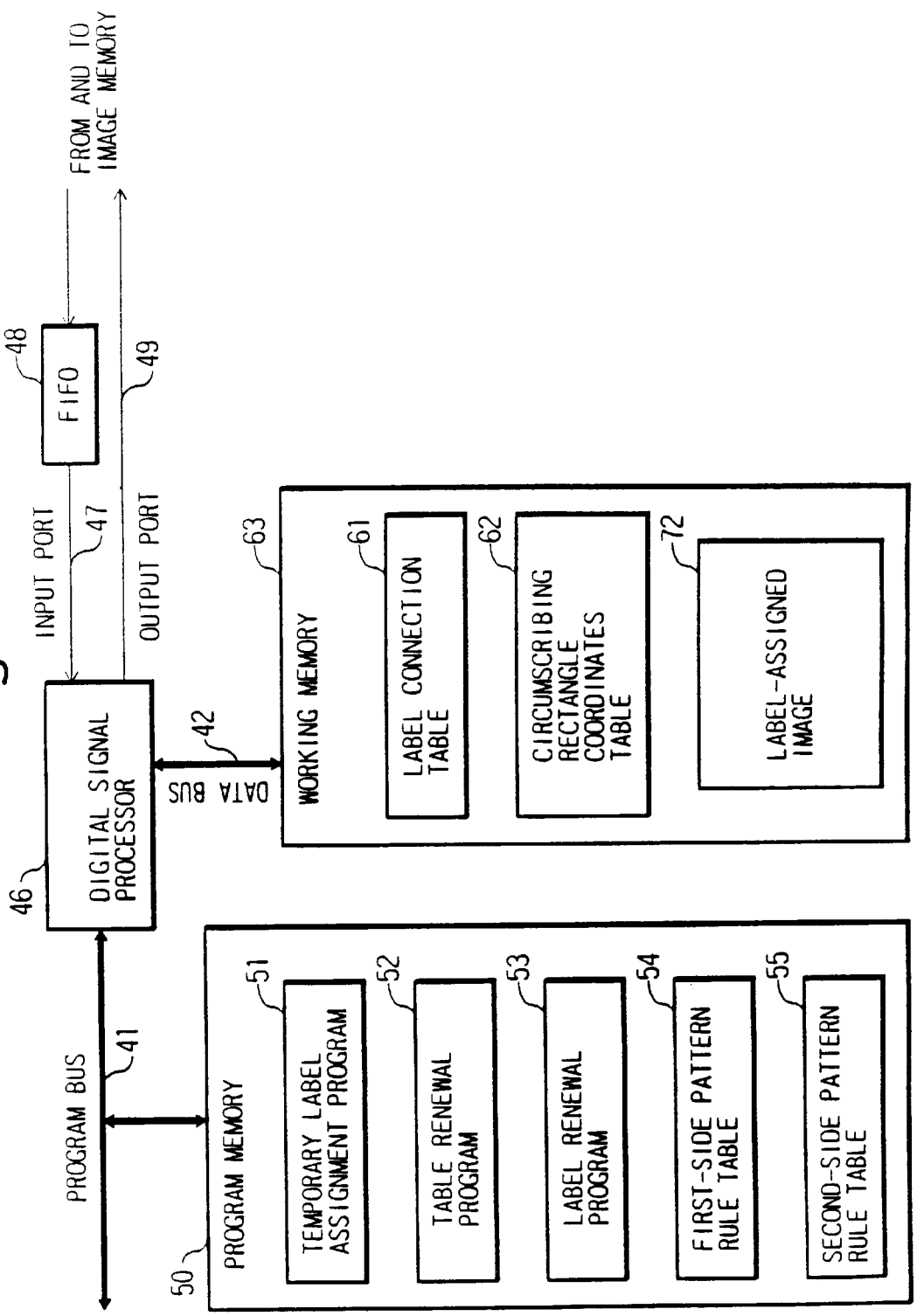

METHOD AND APPARATUS FOR ASSIGNING TEMPORARY AND TRUE LABELS TO DIGITAL IMAGE

CROSS REFERENCE TO RELATED APPLICATIONS

This application is a continuation of U.S. application Ser. No. 08/311,456, filed Sep. 26, 1994, now U.S. Pat. No. 5,717,784. This application is also related to U.S. application Ser. No. 08/843,187, filed Apr. 14, 1997, now U.S. Pat. No. 5,909,507, which is a Divisional of U.S. Ser. No. 08/311,456, filed Sep. 26, 1994, now U.S. Pat. No. 5,717,784.

BACKGROUND OF THE INVENTION (1) Field of the Invention

The present invention relates to a method and apparatus for assigning a temporary label to each connected area in an image. The present invention also relates to a method and apparatus for converting a temporary label assigned to each connected area in an image, to a true label so that one true label is assigned to each connected area, and different true labels are assigned to connected areas which are not connected to each other. Generally, any area in an image is constituted by at least one pixel, and the processing must be performed on pixels when the image is processed by a computer. When the above assignment of a label to each connected area is performed by a computer, the operation of assigning the label to each connected area is actually the assignment of the label to each of the at least one pixel in each connected area. Conventionally, the assignment of the label to each pixel in an image is performed pixel by pixel in the manner of a raster scan. Namely, throughout this specification, it is assumed that scanning is performed row by row and in a predetermined direction in each row.

Generally, an image may contain one or more connected areas each of which is constituted by a group of pixels which are in contact with each other (in any of the vertical, horizontal, and diagonal directions) and having a value or values different from the value of the pixels in the background area. Note that, through the specification, the expression, "a pixel value" or "a value of pixel" means a value indicating brightness of the pixel, or a set of values indicating brightness of three primary colors.

An example of an image is shown in FIG. 1. When processing such an image, it is often required to assign a label to each of the above connected areas as indicated in FIG. 1. In FIG. 1, labels A1, A2, and A3 are assigned to the connected areas, respectively. Throughout this specification, pixels in an image which do not belong to the background are treated in the same way regardless of the values of the respective pixels as long as the pixel values are different from the pixel value of the background, since the inventors' interest is directed only to the assignment of a label to each connected area. Namely, when the image to be processed is a multi-valued image such as a color image or an image with gradation, the pixels in the respective connected areas may have various values other than the pixel value of the background, the label assignment within the scope of the present invention can be carried out regardless of the pixel values within the respective connected areas as long as the pixel values are different from the pixel value of the background. Therefore, in this specification, all the explanations basically concern binary images in which it is assumed that the pixel value in the background is "0", and the pixel values in the respective connected areas are "1". In the embodiments of the present invention, the pixel values in the respective connected areas may be various values other than the pixel value of the background. However, the techniques for a binary image described in the specification can be applied to any multi-valued image for the above-explained reason.

(2) Description of the Related Art

FIG. 2 is a diagram illustrating an example binary pixel image containing a white background area and two connected areas each of which is constituted by a group of pixels (where each pixel in the respective connected areas is indicated by a black square in FIG. 2). In the raster-scan type labelling, the label assignment is carried out in two steps. First, a temporary label is assigned to the respective pixels in the image by raster-scanning the image by use of a window (or mask), and then the temporary labels are converted to true labels by raster-scanning the image again, where the true label assignment is performed so that only one true label is assigned to each connected area and different true labels are assigned to connected areas which are not connected to each other. Conventionally, the window (or mask) as indicated in FIG. 3 is used in the temporary label assignment. As indicated in FIG. 3, the conventional window contains only one pixel of interest (the pixel to which a temporary label is to be newly assigned when the window is located at each position during the raster scanning), and the window (or mask) as indicated in FIG. 3 is moved one pixel by one pixel along the paths of the raster scan so that the respective pixels in the image are scanned as the pixel of interest in the window. Namely, the raster scan is carried out concerning the pixels of interest one pixel by one pixel.

In the above operation of temporary label assignment, when the pixel of interest is determined to be connected to (in contact with) another pixel to which the temporary label has already been assigned, the same temporary label is assigned to the pixel of interest. When the pixel of interest is determined not to be connected to (in contact with) a pixel to which the temporary label has already been assigned, a new temporary label is assigned to the pixel of interest. Thus, a temporarily-labelled image, as indicated in FIG. 4, is obtained.

In addition, during the operation of temporary label assignment, connection relationships between groups of pixels (areas constituted by pixels) to which groups (areas) respectively different temporary labels are assigned, are determined as indicated in FIG. 5. FIG. 5 indicates that a temporarily-labelled area in which the temporary label "1" is assigned to respective pixels in the area, is connected to a temporarily-labelled area in which the temporary label "2" is assigned to respective pixels in the area, to a temporarily-labelled area in which the temporary label "3" is assigned to respective pixels in the area, and to a temporarily-labelled area in which the temporary label "6" is assigned to respective pixels in the area.

The connection relationship is stored in the form of a label connection table (or connection relationship table), for example, as indicated in FIG. 6. In the table of FIG. 6, one entry is provided for each temporary label, and numbers, "0", "1", "2", . . . are used as the temporary labels. In the table of FIG. 6, the number "0" is assigned as the temporary label to respective pixels in the background area. When a temporarily-labelled area in which a temporary label is assigned to respective pixels in the area, is not connected to any other temporarily-labelled area in which a first temporary label with a smaller number is assigned, "0" is written in the entry for the temporary label. When a temporarily-labelled area, in which a number is assigned as the temporary label to respective pixels in the area, is connected to any other temporarily-labelled area in which a second temporary label with a smaller number is assigned, the smaller number is written in the entry for the above first temporary label "0". Thus, the table of FIG. 6 indicates that: the temporarily-labelled area in which the number "1" is assigned as the temporary label to respective pixels in the area, is not connected to any other temporarily-labelled area in which a number smaller than the number "1" is assigned as the temporary label to pixels in the area; that the temporarily-labelled area in which the number "2" as the temporary label is assigned to respective pixels in the area, is connected to the temporarily-labelled area in which the number "1" as the temporary label is assigned to respective pixels in the area; that the temporarily-labelled area in which the number "3" as the temporary label is assigned to respective pixels in the area, is connected to the temporarily-labelled area in which the number "1" as the temporary label is assigned to respective pixels in the area; that the temporarily-labelled area in which the number "4" as the temporary label is assigned to respective pixels in the area, is not connected to any other temporarily-labelled area in which a temporary label smaller than the number "4" is assigned to respective pixels in the area; that the temporarily-labelled area in which the number "5" as the temporary label is assigned to respective pixels in the area, is connected to the temporarily-labelled area in which the number "4" as the temporary label is assigned to respective pixels in the area; that the temporarily-labelled area in which the number "6" as the temporary label is assigned to respective pixels in the area, is connected to the temporarily-labelled area in which the number "1" as the temporary label is assigned to respective pixels in the area; that the temporarily-labelled area in which the number "7" as the temporary label is assigned to respective pixels in the area, is connected to the temporarily-labelled area in which the number "5" as the temporary label is assigned to respective pixels in the area; and so on.

Based on the above label connection table as FIG. 6, a (temporary-to-true) label conversion table, as indicated in FIG. 7, is generated for use in the conversion from the temporary labels to the true labels. The label conversion table of FIG. 7 has an entry for each temporary label including that for the background area, and indicates that: the temporary label "1" should be converted to the true label "1"; that the temporary label "2" should be converted to the true label "1"; that the temporary label "3" should be converted to the true label "1"; that the temporary label "4" should be converted to the true label "2"; that the temporary label "5" should be converted to the true label "2"; that the temporary label "6" should be converted to the true label "1"; that the temporary label "7" should be converted to the true label "2"; and so on. Then, based on the above label conversion table, the above raster scan for the conversion is carried out. Namely, along the paths of the raster scan, temporary labels of the respective pixels are converted to true labels pixel by pixel. After the conversion, the temporarily-labelled image is converted to a true-labelled image, for example, as indicated in FIG. 8.

However, in the above operation of the temporary label assignment, a temporary label can be assigned to only one pixel of interest while the window is located at each location, since the conventional window contains only one pixel of interest, and the window (or mask) as indicated in FIG. 3 is moved one pixel by one pixel along the paths of the raster scan. Therefore, it takes a long time to carry out the operation of the temporary label assignment.

In addition, in the above conversion from the temporary labels to the true labels, the raster scan is carried out for all of the pixels in the image subject to the label assignment. Therefore, it also takes much time to carry out the conversion from the temporary labels to the true labels.

SUMMARY OF THE INVENTION

A first object of the present invention is to provide a method and apparatus for assigning a temporary label to each pixel in each connected area in an image, wherein the time required for performing the temporary label assignment is reduced.

A second object of the present invention is to provide a method and apparatus for converting a temporary label assigned to each pixel in each connected area in an image, to a true label, wherein the time required for performing the conversion is reduced.

According to the first aspect of the present invention, there is provided a method for assigning a temporary label to each pixel in each connected area in an image by scanning the image in a predetermined direction in each row of pixels constituting the image and row by row, by moving a location of a predetermined window which has a size of two pixels in the vertical direction and of a plurality of pixels in the horizontal direction. The above method contains the steps of: (a) obtaining a set of pixel values contained in the above window while the window is located at each location during the scanning, where the window contains first and second groups of pixels, temporary labels are not assigned to the first group of pixels, and temporary labels are already assigned to the second group of pixels; (b) selecting one of a plurality of predetermined temporary label assignment rules corresponding to the obtained set of pixel values, where the temporary label assignment rules are predetermined corresponding to all possible sets of values of the pixels in the window, and the temporary label assignment rules indicate, corresponding to the all possible pixel values, how a temporary label is to be assigned to each of the first group of the pixels, based on the corresponding one of the plurality of temporary label assignment rules, and on temporary labels of pixels in the second group; and (c) assigning a temporary label to each of the first group of the pixels contained in the window at the above each location, based on the above one of the plurality of temporary label assignment rules selected in step (b), and on temporary labels of pixels in the second group in the window at the above each location.

(1-1) In the method according to the first aspect of the present invention, when moving the location of the predetermined window in the horizontal direction during the above scanning, the above window may be shifted by more than one pixel in the horizontal direction.

(1-2) In the method according to the first aspect of the present invention, when moving the location of the predetermined window in the horizontal direction during the above scanning, the above window may be shifted by the number of pixels which is equal to the number of the above plurality of pixels in the horizontal direction.

(1-3) In the method of the above (1-2), the above temporary label assignment rules may indicate, corresponding to the all possible pixel values, how a temporary label is to be assigned to each of the first group of the pixels, based on pixel values located on both sides of the window and adjacent to the window, in addition to the above corresponding one of the plurality of temporary label assignment rules, and the above temporary labels of pixels in the second group of the pixels in the window; and in step (c), the above temporary label is assigned based on pixel values located on both sides of the window and adjacent to the window, in addition to the above one of the plurality of temporary label assignment rules selected in step (b), and the above temporary labels of pixels in the second group of the pixels contained in the window at the above each location.

(1-4) In the method according to the first aspect of the present invention, when moving the location of the predetermined window in the horizontal direction during the above scanning, the above window may be shifted by a predetermined number of pixels which is one pixel less than the number of the above plurality of pixels in the horizontal direction.

(1-5) In the method according to the first aspect of the present invention, when moving the location of the predetermined window in the vertical direction during the above scanning, the above window may be shifted one row by one row in the vertical direction.

(1-6) The method according to the first aspect of the present invention further contains the steps of: (d) determining whether or not at least one pixel to which a first temporary label is assigned in the above second group in the window at each location is connected to another pixel to which a second temporary label is assigned in the above second group, through at least one pixel in the first group in the window; and (e) storing information on a connection between a first group of pixels to which the first temporary label is assigned and a second group of pixels to which the second temporary label is assigned, when it is selected in step (d), that at least one pixel to which the first temporary label is assigned in the above second group in the window at each location is connected to the other pixel to which the second temporary label is assigned in the above second group, through the at least one pixel in the first group in the window.

(1-7) In the method of the above (1-6), the above plurality of temporary label assignment rules further indicate whether or not at least one pixel to which a temporary label is assigned in the above second group in the window is connected to another pixel to which another temporary label is assigned in the above second group, through at least one pixel in the first group in the window, based on the corresponding one of the plurality of temporary label assignment rules, on the pixel values in the window, and on temporary labels of the pixels in the second group in the window; and in step (d), it is determined whether or not at least one pixel to which the first temporary label is assigned in the above second group in the window at the above each location is connected to the other pixel to which the second temporary label is assigned in the above second group, through the at least one pixel in the first group in the window, based on the above one of the plurality of temporary label assignment rules selected in step (b), on the pixel values in the window at the above each location, and on temporary labels of the pixels in the second group in the window.

(1-8) The method according to the first aspect of the present invention further contains the steps of: (f) determining whether or not at least one pixel to which a first temporary label is assigned in the above second group in the window at each location is connected to another pixel located adjacent to the window and to which other pixel a second temporary label is assigned; and (g) storing information on a connection between a first group of pixels to which the first temporary label is assigned and a second group of pixels to which the second temporary label is assigned, when it is selected in step (f), that the at least one pixel to which the first temporary label is assigned in the above second group in the window at each location is connected to the other pixel located adjacent to the window and to which other pixel the second temporary label is assigned.

(1-9) In the method of the above (1-8), the above plurality of temporary label assignment rules further indicate whether or not at least one pixel to which a temporary label is assigned in the above second group in the window is connected to another pixel located adjacent to the window and to which other pixel another temporary label is assigned, based on the corresponding one of the plurality of temporary label assignment rules, pixel values located adjacent to the window, on the pixel values in the window, and on temporary labels of the pixels in the second group in the window, and on temporary labels of pixels located adjacent to the window; and in step (f), it is determined whether or not at least one pixel to which the first temporary label is assigned in the above second group in the window at the above each location is connected to another pixel located adjacent to the window and to which other pixel the second temporary label is assigned, based on the above one of the plurality of temporary label assignment rules selected in step (b), the pixel values located adjacent to the window, the pixel values in the window at the above each location, and temporary labels of the pixels in the second group in the window at the above each location and temporary labels of pixels located adjacent to the window.

(1-10) The method according to the first aspect of the present invention further contains the step of: (h) performing one of determination and renewal of coordinates of the at least one circumscribing area when coordinates of at least one boundary of the at least one circumscribing area are detected in the window at the above each location.

(1-11) In the method of the above (1-10), the above plurality of temporary label assignment rules further indicate whether or not coordinates of at least one boundary of the at least one circumscribing area are detected in the window at the above each location, based on the corresponding one of the plurality of temporary label assignment rules, and the pixel values in the window, and in step (h), it is determined whether or not the coordinates of at least one boundary of the at least one circumscribing area are detected in the window at the above each location, based on the above one of the plurality of temporary label assignment rules selected in step (b), and on the pixel values in the window at the above each location.

(1-12) In the method of the above (1-10), the above plurality of temporary label assignment rules further indicate whether or not coordinates of at least one boundary of the at least one circumscribing area are detected in the window at the above each location, based on the corresponding one of the plurality of temporary label assignment rules, on the pixel values in the window, and pixel values located adjacent to the window; and in step (h), it is determined whether or not the coordinates of at least one boundary of the at least one circumscribing area are detected in the window at the above each location, based on the above one of the plurality of temporary label assignment rules selected in step (b), on the pixel values in the window, and on pixel values located adjacent to the window at the above each location.

(1-13) In the method of the above (1-10), the above circumscribing area has a form of a rectangle, and the above at least one boundary corresponds to one of two corner points of the rectangle located at ends of a diagonal line of the rectangle.

According to the second aspect of the present invention, there is provided an apparatus for assigning a temporary label to each pixel in each connected area in an image by scanning the image in a predetermined direction in each row of pixels constituting the image and row by row, by moving a location of a predetermined window which has a size of two pixels in the vertical direction and of a plurality of pixels in the horizontal direction. The above apparatus contains: a window scan unit for obtaining a set of pixel values contained in the above window while the window is located at each location during the scanning, where the window contains first and second groups of pixels, temporary labels are not assigned to the first group of pixels, and temporary labels are already assigned to the second group of pixels; an assignment rule storing unit for storing a plurality of predetermined temporary label assignment rules, which are predetermined corresponding to all possible sets of values of the pixels in the window, and the temporary label assignment rules indicate, corresponding to the all possible pixel values, how a temporary label is to be assigned to each of the first group of the pixels, based on the corresponding one of the plurality of temporary label assignment rules, and on temporary labels of pixels in the second group; a rule selecting unit for selecting one of the above plurality of temporary label assignment rules corresponding to the obtained set of pixel values; a temporary label assignment unit for assigning a temporary label to each of the first group of the pixels contained in the window at the above each location, based on the above one of the plurality of temporary label assignment rules selected in step (b), and on temporary labels of pixels in the second group in the window at the above each location.

(2-1) In the apparatus according to the second aspect of the present invention, when moving the location of the predetermined window in the horizontal direction during the above scanning, the above window may be shifted by more than one pixel in the horizontal direction.

(2-2) In the apparatus according to the second aspect of the present invention, when moving the location of the predetermined window in the horizontal direction during the above scanning, the above window may be shifted by the number of pixels which is equal to the number of the above plurality of pixels in the horizontal direction.

(2-3) In the apparatus of the above (2-2), the temporary label assignment rules indicate, corresponding to the all possible pixel values, how a temporary label is to be assigned to each of the first group of the pixels, based on pixel values located on both sides of the window and adjacent to the window, in addition to the above corresponding one of the plurality of temporary label assignment rules, and the above temporary labels of pixels in the second group of the pixels in the window, and in the operation of the temporary label assignment unit, the above temporary label is assigned based on pixel values located on both sides of the window and adjacent to the window, in addition to the above one of the plurality of temporary label assignment rules selected by the rule selecting unit, and the above temporary labels of pixels in the second group of the pixels contained in the window at the above each location.

(2-4) In the apparatus according to the second aspect of the present invention, when moving the location of the predetermined window in the horizontal direction during the above scanning, the above window may be shifted by a predetermined number of pixels which is one pixel less than the number of the above plurality of pixels in the horizontal direction.

(2-5) In the apparatus according to the second aspect of the present invention, when moving the location of the predetermined window in the vertical direction during the above scanning, the above window may be shifted one row by one row in the vertical direction.

(2-6) The apparatus according to the second aspect of the present invention, further contains: a connection determining unit for determining whether or not at least one pixel to which a first temporary label is assigned in the above second group in the window at each location is connected to another pixel to which a second temporary label is assigned in the above second group, through at least one pixel in the first group in the window; and a connection information storing unit for storing information on a connection between a first group of pixels to which the first temporary label is assigned and a second group of pixels to which the second temporary label is assigned, when it is determined by the connection determining unit, that at least one pixel to which the first temporary label is assigned in the above second group in the window at each location is connected to the other pixel to which the second temporary label is assigned in the above second group, through the at least one pixel in the first group in the window.

(2-7) In the apparatus of the above (2-6), the plurality of temporary label assignment rules further indicate whether or not at least one pixel to which a temporary label is assigned in the above second group in the window is connected to another pixel to which another temporary label is assigned in the above second group, through at least one pixel in the first group in the window, based on the corresponding one of the plurality of temporary label assignment rules, on the pixel values in the window, and on temporary labels of the pixels in the second group in the window; and in the operation of the connection determining unit, it is determined whether or not at least one pixel to which the first temporary label is assigned in the above second group in the window at the above each location is connected to the other pixel to which the second temporary label is assigned in the above second group, through the at least one pixel in the first group in the window, based on the above one of the plurality of temporary label assignment rules determined by the connection determining unit, on the pixel values in the window at the above each location, and on temporary labels of the pixels in the second group in the window.

(2-8) The apparatus according to the second aspect of the present invention, further contains: a connection determining unit for determining whether or not at least one pixel to which a first temporary label is assigned in the above second group in the window at each location is connected to another pixel located adjacent to the window and to which other pixel a second temporary label is assigned, and a connection information storing unit for storing information on a connection between a first group of pixels to which the first temporary label is assigned and a second group of pixels to which the second temporary label is assigned, when it is determined by the connection determining unit, that the at least one pixel to which the first temporary label is assigned in the above second group in the window at each location is connected to the other pixel located adjacent to the window and to which other pixel the second temporary label is assigned.

(2-9) In the apparatus of the above (2-8), the plurality of temporary label assignment rules further indicate whether or not at least one pixel to which a temporary label is assigned in the above second group in the window is connected to another pixel located adjacent to the window and to which other pixel another temporary label is assigned, based on the corresponding one of the plurality of temporary label assignment rules, on pixel values located adjacent to the window, on the pixel values in the window, and, on temporary labels of the pixels in the second group in the window and temporary labels of pixels located adjacent to the window. In the operation of the connection determining unit, it is determined whether or not at least one pixel to which the first temporary label is assigned in the above second group in the window at the above each location is connected to another pixel located adjacent to the window and to which other pixel the second temporary label is assigned, based on the above one of the plurality of temporary label assignment rules selected by the rule selecting unit, on the pixel values located adjacent to the window, on the pixel values in the window at the above each location, and on temporary labels of the pixels in the second group in the window at the above each location and temporary labels of pixels located adjacent to the window.

(2-10) The apparatus according to the second aspect of the present invention, further contains: a determining and renewing unit for performing one of determination and renewal of coordinates of the at least one circumscribing area when coordinates of at least one boundary of the at least one circumscribing area are detected in the window at the above each location.

(2-11) In the apparatus of the above (2-10), the above plurality of temporary label assignment rules further indicate whether or not coordinates of at least one boundary of the at least one circumscribing area are detected in the window at the above each location, based on the corresponding one of the plurality of temporary label assignment rules, and on the pixel values in the window, and in the operation of the determining and renewing unit, it is determined whether or not the coordinates of at least one boundary of the at least one circumscribing area are detected in the window at the above each location, based on the above one of the plurality of temporary label assignment rules selected by the rule selecting unit, and on the pixel values in the window at the above each location.

(2-12) In the apparatus of the above (2-10), the plurality of temporary label assignment rules further indicate whether or not coordinates of at least one boundary of the at least one circumscribing area are detected in the window at the above each location, based on the corresponding one of the plurality of temporary label assignment rules, on the pixel values in the window, and on pixel values located adjacent to the window; and in the operation of the determining and renewing unit, it is determined whether or not the coordinates of at least one boundary of the at least one circumscribing area are detected in the window at the above each location, based on the above one of the plurality of temporary label assignment rules selected by the rule selecting unit, the pixel values in the window, and on pixel values located adjacent to the window at the above each location.

(2-13) In the apparatus of the above (2-10), the circumscribing area has a form of a rectangle, and the above at least one boundary corresponds to one of two corner points of the rectangle located at ends of a diagonal line of the rectangle.

According to the third aspect of the present invention, there is provided a method for assigning true labels, respectively identifying connected areas contained in an image, to pixels in the image to which pixels temporary labels are assigned in advance. The method contains a step of assigning the true labels to pixels contained in at least one circumscribing area in the image, in accordance with a predetermined relationship between the temporary labels and the true labels, and by scanning the image pixel by pixel within the at least one circumscribing area only, where the at least one circumscribing area is predetermined so that the at least one circumscribing area contains all pixels which do not belong to a background area in the image.

According to the fourth aspect of the present invention, there is provided a method for assigning true labels, respectively identifying connected areas contained in an image, to pixels in the image to which pixels temporary labels are assigned in advance. The above method contains the steps of: (a) determining at least one circumscribing area so that the at least one circumscribing area contains all pixels which do not belong to a background area in the image; and (b) determining a true label to be assigned to each pixel in each of the above at least one circumscribing area in the image, in accordance with a predetermined relationship between the temporary labels and the true labels, by scanning the image pixel by pixel, within the at least one circumscribing area only.

(4-1) In the method according to the fourth aspect of the present invention, the above at least one circumscribing area may be determined so that each of the at least one circumscribing area contains at least one connected area constituted by pixels which are connected.

(4-2) In the method according to the fourth aspect of the present invention, the above information may contain coordinates of the circumscribing area.

(4-3) In the method of the above (4-2), the above circumscribing area may have a form of a rectangle, and the above information may contain coordinates of at least two corner points located at ends of a diagonal line of the circumscribing area.

According to the fifth aspect of the present invention, there is provided an apparatus for assigning true labels, respectively identifying connected areas contained in an image, to pixels in the image to which pixels temporary labels are assigned in advance, in accordance with a predetermined relationship between the temporary labels and the true labels, by scanning the image pixel by pixel. The above apparatus contains: a relationship storing unit for storing the above predetermined relationship between the temporary labels and the true labels; a circumscribing area storing unit for storing information on location and extent of at least one circumscribing area which is predetermined so that the at least one circumscribing area contains all pixels which do not belong to a background area in the image; a scan unit for scanning the image pixel by pixel within the extent of at least one circumscribing area only; and a true label determining unit for determining the true labels to be assigned to the pixels in the at least one circumscribing area only.

(5-1) In the apparatus according to the fifth aspect of the present invention, the above at least one circumscribing area may be determined so that each of the at least one circumscribing area contains at least one connected area constituted by pixels which are connected.

(5-2) The apparatus according to the fifth aspect of the present invention may further contain a circumscribing area determining unit for determining the at least one circumscribing area.

(5-3) In the apparatus according to the fifth aspect of the present invention, the above information may contain coordinates of the circumscribing area.

(5-4) In the apparatus of the above (5-3), the above circumscribing area may have a form of a rectangle, and the above information may contain coordinates of at least two corner points located at ends of a diagonal line of the circumscribing area.

According to the sixth aspect of the present invention, there is provided a method for obtaining information on location and extent of at least one circumscribing area in an image each of which circumscribing area contains a connected area, constituted by pixels which are connected, by scanning the image in a predetermined direction in each row of pixels constituting the image and row by row, by moving a location of a predetermined window which has a size of two pixels in the vertical direction and of a plurality of pixels in the horizontal direction.

(6-1) The method according to the sixth aspect of the present invention may further contain the steps of: (a) obtaining a set of pixel values contained in the above window while the window is located at each location during the scanning; (b) selecting one of a plurality of predetermined circumscribing-area determining-and-renewing rules corresponding to the obtained set of pixel values; and (c) performing one of determination and renewal of coordinates of the at least one circumscribing area when coordinates of at least one boundary of the at least one circumscribing area are detected in the window at the above each location, based on the above one of the plurality of circumscribing-area determining-and-renewing rules selected in step (b).

(6-2) In the method of the above (6-1), when moving the location of the predetermined window in the horizontal direction during the above scanning, the above window may be shifted by more than one pixel in the horizontal direction.

(6-3) In the method of the above (6-1), when moving the location of the predetermined window in the horizontal direction during the above scanning, the above window is shifted by the number of pixels which is equal to the number of the above plurality of pixels in the horizontal direction.

(6-4) In the method of the above (6-3), in step (c) the above coordinates of the at least one circumscribing area may be determined or renewed based on pixel values located on both sides of the window and adjacent to the window, in addition to the above one of the plurality of circumscribing-area determining-and-renewing rules selected in step (b).

(6-5) In the method of the above (6-1), when moving the location of the predetermined window in the horizontal direction during the above scanning, the above window may be shifted by a predetermined number of pixels which is one pixel less than the number of the above plurality of pixels in the horizontal direction.

(6-6) In the method of the above (6-1), when moving the location of the predetermined window in the vertical direction during the above scanning, the above window may be shifted one row by one row in the vertical direction.

(6-7) In the method of the above (6-1), wherein the above circumscribing area has a form of a rectangle, and the above at least one boundary corresponds to one of two corner points of the rectangle located at ends of a diagonal line of the rectangle.

According to the seventh aspect of the present invention, there is provided an apparatus for obtaining information on location and extent of at least one circumscribing area in an image each of which circumscribing area contains a connected area, constituted by pixels which are connected, by scanning the image in a predetermined direction in each row of pixels constituting the image and row by row, by moving a location of a predetermined window which has a size of two pixels in the vertical direction and of a plurality of pixels in the horizontal direction. The above apparatus contains: a window scan unit for obtaining a set of pixel values contained in the above window while the window is located at each location during the scanning; a circumscribing-area determining-and-renewing rule storing unit for storing a plurality of predetermined circumscribing-area determining-and-renewing rules; a rule selecting unit for selecting one of the above plurality of circumscribing-area determining-and-renewing rules corresponding to the obtained set of pixel values; and a determining and renewing unit for performing one of determination and renewal of coordinates of the at least one circumscribing area when coordinates of at least one boundary of the at least one circumscribing area are detected in the window at the above each location, the above one of the plurality of circumscribing-area determining-and-renewing rules determined by the rule determining unit.

(7-1) In the apparatus according to the seventh aspect of the present invention, when moving the location of the predetermined window in the horizontal direction during the above scanning, the above window may be shifted by more than one pixel in the horizontal direction.

(7-2) In the apparatus according to the seventh aspect of the present invention, when moving the location of the predetermined window in the horizontal direction during the above scanning, the above window may be shifted by the number of pixels which is equal to the number of the above plurality of pixels in the horizontal direction.

(7-3) In the apparatus of the above (7-2), in the operation of the determining and renewing unit, the above coordinates of the at least one circumscribing area may be determined or renewed based on pixel values located on both sides of the window and adjacent to the window, in addition to the above one of the plurality of circumscribing-area determining-and-renewing rules selected by the rule selecting unit.

(7-4) In the apparatus according to the seventh aspect of the present invention, when moving the location of the predetermined window in the horizontal direction during the above scanning, the above window is shifted by a predetermined number of pixels which is one pixel less than the number of the above plurality of pixels in the horizontal direction.

(7-5) In the apparatus according to the seventh aspect of the present invention, when moving the location of the predetermined window in the vertical direction during the above scanning, the above window is shifted one row by one row in the vertical direction.

(7-6) In the apparatus according to the seventh aspect of the present invention, the above circumscribing area has a form of a rectangle, and the above at least one boundary corresponds to one of two corner points of the rectangle located at ends of a diagonal line of the rectangle.

According to the eighth aspect of the present invention, there is provided a method for assigning true labels, respectively identifying connected areas contained in an image, to pixels in the image. The method contains the steps of: (a) assigning temporary labels to all pixels in each of the connected areas in the image by scanning the image, where the temporary labels have different representations from the true labels; (b) obtaining connection relationships among the connected areas, and storing the connection relationships; (c) generating a label conversion table which is comprised of first and second portions, based on the above connection relationship, where the first portion contains first information which indicates that the true labels should not be changed by an operation of step (d), and the second portion of the label conversion table contains second information indicating correspondences between each of the first temporary labels and a corresponding one of the true labels; and (d) assigning the true labels to pixels contained in at least one circumscribing area in the image, in accordance with the above first and second information, by scanning a portion of the image within each of the at least one circumscribing area only, one circumscribing area by one circumscribing area, where the at least one circumscribing area is predetermined so that the at least one circumscribing area contains all pixels which do not belong to a background area in the image.

(8-1) In the method according to the eighth aspect of the present invention, the above first portion of the label conversion table may contain a first plurality of entries corresponding to the true labels, contents of the first plurality of entries may be respectively the same true labels as the first plurality of entries correspond to, and the above second portion of the label conversion table may contain a second plurality of entries which contains information concerning which other connected area the connected area to which the corresponding one of the temporary labels is assigned, is connected to.

According to the ninth aspect of the present invention, there is provided an apparatus for assigning true labels, respectively identifying connected areas contained in an image, to pixels in the image. The apparatus contains: a temporary label assigning unit for assigning temporary labels to all pixels in each of the connected areas in the image by scanning the image, where the temporary labels have different representations from the true labels; a connection relationship obtaining unit for obtaining connection relationships among the connected areas, and storing the connection relationships; a label conversion table generating unit for generating a label conversion table which is comprised of first and second portions, based on the above connection relationship, where the first portion contains first information which indicates that the true labels should not be changed by an operation of step (d), and the second portion of the label conversion table contains second information indicating correspondences between each of the first temporary labels and a corresponding one of the true labels; and a true label assigning unit for assigning the true labels to pixels contained in at least one circumscribing area in the image, in accordance with the above first and second information, by scanning a portion of the image within each of the at least one circumscribing area only, one circumscribing area by one circumscribing area, where the at least one circumscribing area is predetermined so that the at least one circumscribing area contains all pixels which do not belong to a background area in the image.

(9-1) In the apparatus according to the eighth aspect of the present invention, the above first portion of the label conversion table may contain a first plurality of entries corresponding to the true labels, contents of the first plurality of entries may be respectively the same true labels as the first plurality of entries correspond to, and the above second portion of the label conversion table may contain a second plurality of entries which contains information concerning which other connected area the connected area to which the corresponding one of the temporary labels is assigned, is connected to.

BRIEF DESCRIPTION OF THE DRAWINGS

In the drawings:

FIG. 4 is a diagram illustrating an example of a temporarily-labelled image;

FIG. 5 is a diagram illustrating connection relationships between groups of pixels to which groups respectively different temporary labels are assigned;

FIG. 6 is a diagram illustrating an example of a label connection table (or connection relationship table);

FIG. 15 is a diagram illustrating the circumscribing rectangle coordinate table;

FIG. 16 is a block diagram illustrating the construction of another embodiment realizing the first, second, sixth, seventh, eighth, and ninth aspects of invention;

FIGS. 17 to 19 are explanatory diagrams for explaining detection of connection relationship between two areas;

FIG. 29 is a diagram illustrating the same portion of the image as the image portion of FIG. 23, wherein the numbers beginning with "L" are assigned as the temporary labels;

FIG. 30 is a diagram illustrating the label conversion table generated from the table of FIG. 28;

FIGS. 43A to 43E are diagrams illustrating details of the temporary label assignment rules which are predetermined corresponding to the patterns indicated in FIGS. 38 and 40 in the most preferable embodiment of the present invention;

FIGS. 48 to 50 are diagrams illustrating example hardware constructions for performing the operations of the present invention.

DESCRIPTION OF THE PREFERRED EMBODIMENTS

Construction of Embodiment of First and Second Aspects of Invention (FIGS. 9, 10, 11, and 12)

Figure 9:
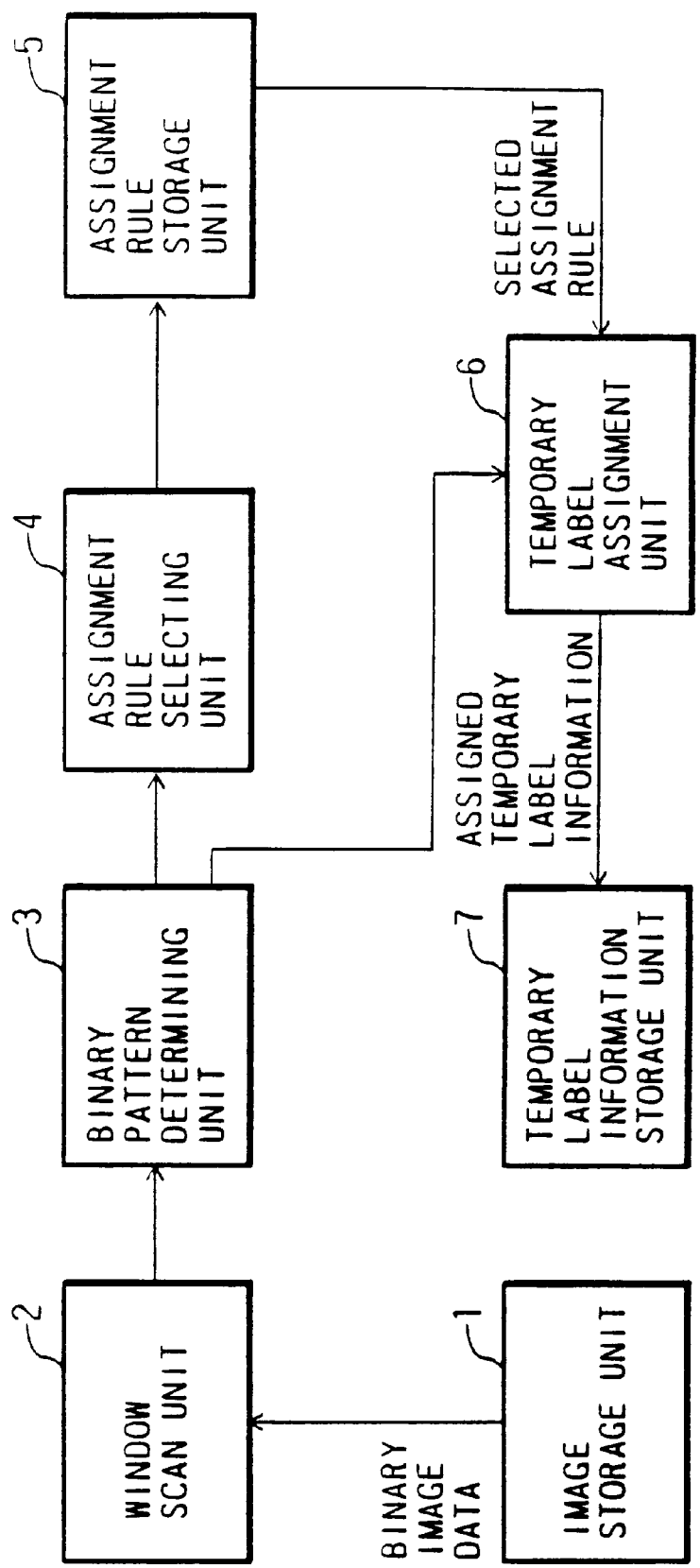
FIG. 9 is a block diagram illustrating the construction of an embodiment realizing the first aspect of the present invention.

FIG. 9 is a block diagram illustrating a construction of an embodiment realizing the first and second aspects of the present invention. In FIG. 9, reference numeral 1 denotes an image storage unit, 2 denotes a window scan unit, 3 denotes a binary pattern determining unit, 4 denotes an assignment rule selecting unit, 5 denotes an assignment rule storage unit, 6 denotes a temporary label assignment unit, and 7 denotes a temporary label information storage unit.

The image storage unit 1 stores data of binary image data. The window scan unit 2 scans the binary image by using a predetermined window which has a size of two pixels in the vertical direction and of a plurality of pixels in the horizontal direction. The scanning is performed in a predetermined direction in each row of pixels constituting the image and row by row, for example, from the top left to the bottom right. During the scanning, the window is moved in a predetermined direction in each row of pixels constituting the image and row by row, for example, from the top left to the bottom right. The pixels covered by the window located at each location during the scanning, include a first group of pixels to which temporary labels have not yet been assigned, and a second group of pixels to which temporary labels have already been assigned.

While the window is located at each location during the scanning, the temporary labels are assigned to the pixels in the first group based on pixel values in the window and the temporary labels of the pixels in the second group. Alternatively, the assignment of the temporary labels to the pixels in the first group may be performed based on pixel values in the window, on the temporary labels of the pixels in the second group, on pixel values located adjacent to the pixels in the window at each location, and on temporary labels of pixels located adjacent to the pixels in the window at each location. Whether or not the pixel values located adjacent to the pixels in the window at each location, and the temporary labels of pixels located adjacent to the pixels in the window at each location, are used for the assignment of the temporary labels to the pixels in the first group, depends on the pitch in the movement of the window during the scanning. In a first case wherein the pitch is the same as the width of the window in the horizontal direction, the pixel values located adjacent to the pixels in the window at each location, and the temporary labels of pixels located adjacent to the pixels in the window at each location, are used for the assignment of the temporary labels to the pixels in the first group. In a second case wherein the pitch is at least one pixel less than the width of the window in the horizontal direction, the pixel values located adjacent to the pixels in the window at each location, and the temporary labels of pixels located adjacent to the pixels in the window at each location, are not used for the assignment of the temporary labels to the pixels in the first group, since the above pixels located adjacent to the pixels in the window in the first case are contained in the window in the second case.

The above assignment is performed by the binary pattern determining unit 3, the assignment rule selecting unit 4, the assignment rule storage unit 5, and the temporary label assignment unit 6. The assignment rule storage unit 5 stores predetermined assignment rules which indicate (as explained later with reference to FIGS. 43A to 43E) how the temporary labels should be assigned to the pixels in the first group, based on pixel values in the window and on the temporary labels of the pixels in the second group, or based on pixel values in the window, on the temporary labels of the pixels in the second group, on pixel values located adjacent to the pixels in the window at each location, and on temporary labels of pixels located adjacent to the pixels in the window at each location. The respective predetermined assignment rules are provided in advance corresponding to all the possible patterns of pixel values in the window at each location as explained later with reference to FIGS. 36 to 39. The binary pattern determining unit 3 in FIG. 9 recognizes the pattern of the pixel values in the window at each location, and the assignment rule selecting unit 4 selects one of the plurality of assignment rules corresponding to the recognized pattern, and reads the selected assignment rule from the assignment rule storage unit 5. Then, the temporary label assignment unit 6 assigns the temporary labels to the pixels in the first group as above in accordance with the selected assignment rule. The newly assigned temporary labels of the pixels in the first group in the window are stored in the temporary label information storage unit 7.

Figure 10:
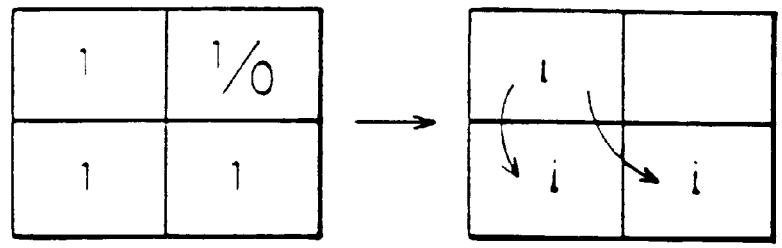
FIGS. 10 to 12 are explanatory diagrams illustrating an example operation of the assignment of temporary labels.
Figure 11:
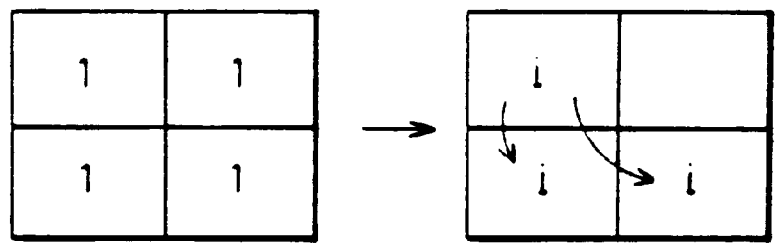
Figure 12:
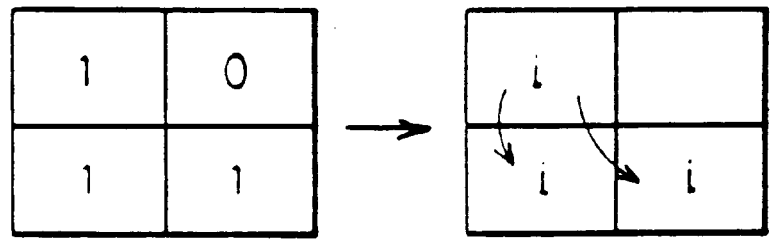

FIGS. 10 to 12 are explanatory diagrams illustrating an example operation of the assignment of temporary labels. In FIGS. 10 to 12, pixel values in a window containing 2×2 pixels are indicated on the left side, and a corresponding operation of assignment is indicated on the right side. Among the four pixels in the window, two pixels in the lower row correspond to the above first group, and two pixels in the upper row correspond to the above second group. Namely, the temporary labels are already assigned to the two pixels in the upper row, and the temporary labels are not assigned yet to the two pixels in the lower row. FIGS. 10 to 12 indicate that when the value of the upper left pixel is equal to "1", the same value "i" of the temporary label as the temporary label of the upper left pixel is assigned to both the two pixels in the lower row, regardless of the temporary label of the upper right pixel, since both the two pixels in the lower row in contact with the upper left pixel in the vertical direction and in the diagonal direction, respectively. FIGS. 11 and 12 indicate the case wherein the value of the upper right pixel is "1" and the case wherein the value of the upper right pixel is "0", respectively.

Figure 13:
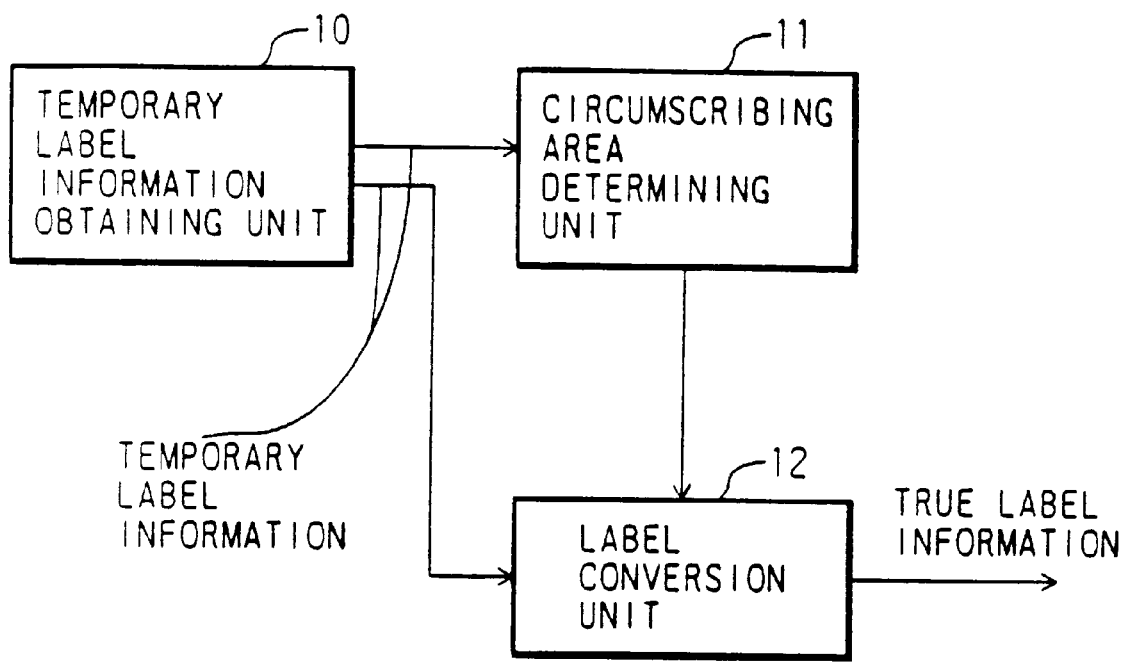
FIG. 13 is a block diagram illustrating a construction of an embodiment realizing the third to fifth aspects of the present invention.
Figure 14:
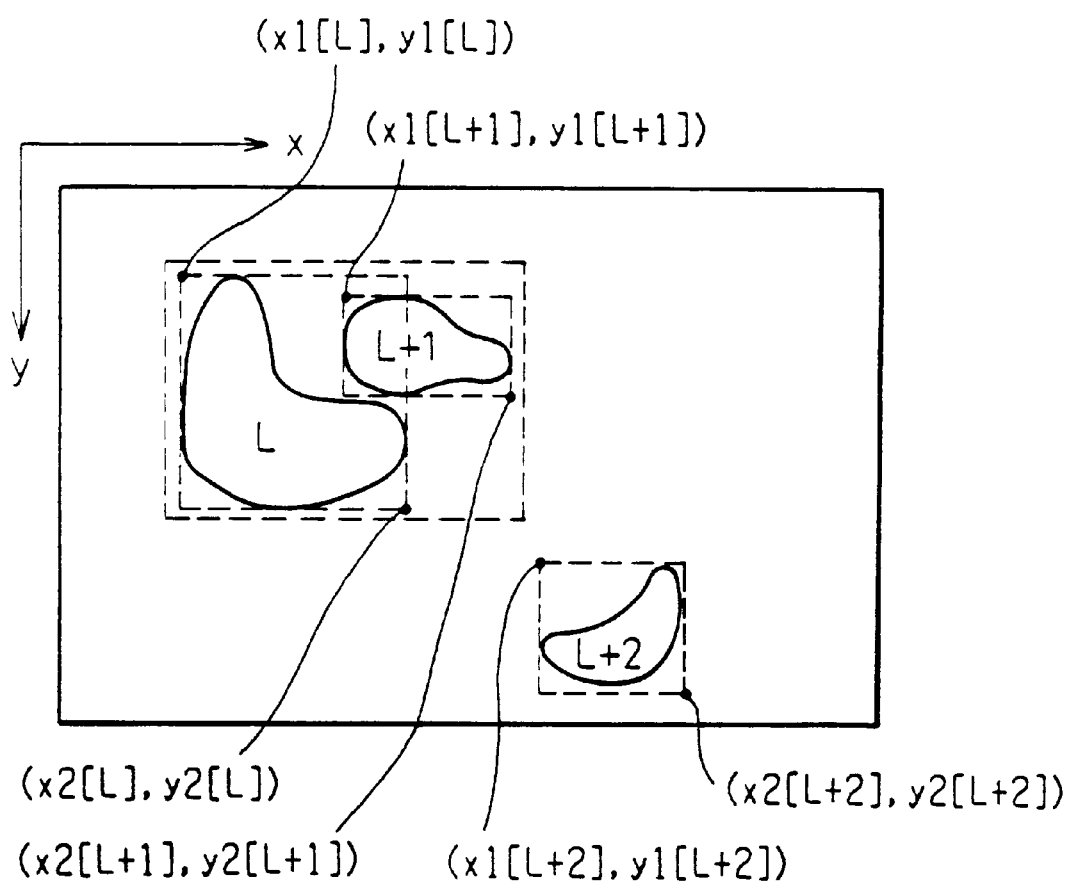
FIG. 14 is a diagram illustrating an example of an image in which connected areas are respective contained by circumscribing areas.

Construction of Embodiment of Third to Fifth Aspects of Invention (FIGS. 13, 14, and 15)

FIG. 13 is a block diagram illustrating a construction of an embodiment realizing the third to fifth aspects of the present invention. In FIG. 13, reference numeral 10 denotes a temporary label information obtaining unit, 11 denotes a circumscribing area determining unit, and 12 denotes a label conversion unit.

The temporary label information obtaining unit 10 obtains information on the temporary label assignment, i.e., information concerning what temporary label is assigned to each pixel in an image subject to the operation of the embodiment. The temporary label information may be obtained by the first and second aspects of the present invention.

The circumscribing area determining unit 11 determines at least one circumscribing area so that the at least one circumscribing area contains all pixels which do not belong to a background area in the image, and each of the at least one circumscribing area contains at least one connected area constituted by pixels which are connected. The above circumscribing area may have a form of a rectangle, and the circumscribing area determining unit 11 may determine the coordinates of at least two corner points located at ends of a diagonal line of the circumscribing area (for example, upper left and lower right corner points of the rectangle).

The label conversion unit 12 converts the temporary label assigned to each pixel, to a true label. In other words, the label conversion unit 12 assigns a true label to each pixel based on the temporary label assigned to the pixel. In the operation of the label conversion unit 12, the pixels in the image are scanned pixel by pixel. According to the third to fifth aspects of the present invention, the scanning is carried out within the above at least one circumscribing area only. Thus, the number of pixels which are scanned is reduced, and therefore, the time necessary for the temporary-to-true conversion of the total image is reduced.

In the construction of FIG. 13, the temporary label information obtaining unit 10 may be a memory for storing the information on the temporary labels assigned to the pixels in the image, and the circumscribing area determining unit 11 may be a memory for storing the information on the information on the location and extent (coordinates) of the at least one circumscribing area. The information on the location and extent (coordinates) may be arranged in the form of the circumscribing rectangle coordinate table as indicated in FIG. 15 and explained later.

FIG. 14 is a diagram illustrating an example of an image in which connected areas are respective contained by circumscribing areas. In the examples of FIG. 14, the connected areas are labeled as L, L+1, and L+2, where L is an integer, and the circumscribing areas are circumscribing rectangles which are indicated by dashed lines. The location and extent of each of the circumscribing rectangles in FIG. 14 are determined by the coordinates of two corner points located at ends of a diagonal line of the circumscribing rectangle. The coordinates of upper left corner point of the circumscribing rectangle containing the connected area labeled as L are denoted by (x1[L], y1[L]), and the coordinates of the lower left corner point of the circumscribing rectangle containing the connected area labeled as L are denoted by (x2[L], y2[L]). The coordinates of upper left corner point of the circumscribing rectangle containing the connected area labeled as L+1 are denoted by (x1[L+1], y1[L+1]), and the coordinates of the lower left corner point of the circumscribing rectangle containing the connected area labeled as L+1 are denoted by (x2[L+1], y2[L+1]). The coordinates of upper left corner point of the circumscribing rectangle containing the connected area labeled as L+2 are denoted by (x1[L+2], y1[L+2]), and the coordinates of the lower left corner point of the circumscribing rectangle containing the connected area labeled as L+2 are denoted by (x2[L+2], y2[L+2]). As indicated in FIG. 14, the connected area L+1 is connected to the connected area L. In this case, a greater circumscribing rectangle containing both the circumscribing rectangles which originally contain the connected areas L and L+1, is determined, and the coordinates of the circumscribing rectangle containing the connected area L are renewed accordingly.

The coordinates of the circumscribing rectangles are determined by scanning the image, as explained later in detail for an example with reference to FIGS. 43A to 43E, 44A and 44B, and 46. The coordinates of the circumscribing rectangles determined by the scanning of the image are stored in an memory in the form of the circumscribing rectangle coordinate table. FIG. 15 is a diagram illustrating the circumscribing rectangle coordinate table. The circumscribing rectangle coordinate table of FIG. 15 has entries for all labels which are assigned to the connected areas, and the coordinates of the two corner points of one of the circumscribing rectangles which contains the connected area are written in the entries for the label.

Construction of Another Embodiment of First, Second, Sixth, and Seventh Aspects of Invention (FIG. 16)

FIG. 16 is a block diagram illustrating the construction of another embodiment realizing the first, second, sixth, seventh, eighth, and ninth aspects of invention. In the construction of FIG. 16, the determination of at least one circumscribing area in an image is carried out in parallel with the operation of the construction of FIG. 9. In the construction of FIG. 16, the circumscribing area determining unit 8 is added to the construction of FIG. 9. The operation of the circumscribing area determining unit 8 in FIG. 16 is basically the same as the circumscribing area determining unit 11 in the construction of FIG. 9, except for the following operations.

In the case wherein the pitch of the window is less than the width in the horizontal direction of the window, the circumscribing area determining unit 8 in FIG. 16 operates in parallel with the operation of the temporary label assignment unit 6, and determines and renews the information on location and extent of the at least one circumscribing area based on the pattern of the pixel values in the window at each location during the scanning, and on the assignment rule selected by the assignment rule selecting unit 4 and provided from the assignment rule storage unit 5, where the plurality of temporary label assignment rules may indicate, in addition to the rules for the assignment as explained with reference to FIG. 9, whether or not coordinates of at least one boundary of the at least one circumscribing area are detected in the window at the above each location, based on the corresponding one of the plurality of temporary label assignment rules, and on the pixel values in the window. The circumscribing area determining unit 8 determines whether or not the coordinates of at least one boundary of the at least one circumscribing area are detected in the window at the above each location, based on the above one of the plurality of temporary label assignment rules selected by the assignment rule selecting unit 4 and provided from the assignment rule storage unit 5, and on the pixel values in the window.

In the case wherein the pitch of the window is equal to the width in the horizontal direction of the window, the plurality of temporary label assignment rules may indicate, in addition to the rules for the assignment as explained with reference to FIG. 9, whether or not coordinates of at least one boundary of the at least one circumscribing area are detected in the window at the above each location, based on the corresponding one of the plurality of temporary label assignment rules, on the pixel values in the window, and pixel values located adjacent to the window. In this case, the circumscribing area determining unit 8 determines whether or not the coordinates of at least one boundary of the at least one circumscribing area are detected in the window at the above each location, based on the above one of the plurality of temporary label assignment rules selected by the assignment rule selecting unit 4 and provided from the assignment rule storage unit 5, on the pixel values in the window, and on pixel values located adjacent to the window at the above each location.

Detection of Connection of Areas to which Different Temporary Labels are Assigned (FIGS. 17, 18, and 19)

FIGS. 17 to 19 are explanatory diagrams for explaining detection of connection relationship between two connected areas. FIG. 17 illustrates a portion of a binary image. In FIG. 17, blank (white) squares are pixels having value "0" and constituting the background in the image, and hatched squares are pixels having value "1" and constituting a connected area. In the example of FIGS. 17 to 19, it is assumed that the size of the window used in the scanning of the image is two X two pixels, as indicated in FIGS. 17 to 19 by bold lines, and that the scanning is carried out in the manner of a raster scan, i.e., from the pixel at the upper left corner to the pixel at the lower right corner row by row and from left to right in each row. As explained before, the pitch of the movement of window is equal to the width of the window in the horizontal direction, or at least one pixel less than the width of the window in the horizontal direction. In the example of FIGS. 17 to 19, it is assumed that the pitch of the movement of window is equal to the width of the window in the horizontal direction.

FIG. 18 illustrates temporary labels assigned to pixels in a portion of the image in the midway of the scanning for the temporary label assignment. The sequential numbers 0, 1, and 2 are temporary labels assigned to the respective pixels in the portion of the image, where the temporary label "0" is assigned to the pixels in the background, and the numbers are assigned in the order from smaller to larger. During the scanning for the temporary label assignment, the upper two pixels in the window are on a row on which temporary labels have already been assigned to respective pixels, and lower two pixels in the window are on a row on which temporary labels have not yet been assigned to respective pixels, and therefore, the lower two pixels in the window at the location indicated in FIG. 18 are the pixels of interest, i.e., the pixels to which temporary labels should be assigned while the window is located at the location.

Although the details of the assignment of the temporary labels in the window at each location during the scanning are explained later with reference to FIGS. 43A to 43E, the assignment of the temporary labels is carried out based on the pixel values and temporary labels of pixels in the window at each location during the scanning, and on the pixel values and temporary labels of the pixels located adjacent to the window.

According to the scanning in the above manner, the connection of the two pixels at the upper right portion (indicated by arrows in FIG. 17) in the connected area in the image of FIG. 17, to the other pixels in the connected area, cannot be detected during the scanning of the second and third rows. Note that the scanning of nth row means the scanning during which the window is moved from left to right so that the lower two pixels in the window are on the nth row, i.e., the scanning of nth row is carried out for assigning temporary labels to the pixels on the nth row. Therefore, the number "2" is assigned as the temporary label to the two pixels at the upper right portion in the connected area as indicated in FIG. 18, while the number "1" is assigned to the other pixels in the connected area.

The connection of the two pixels at the upper right portion in the connected area in the image of FIG. 17, to the other pixels in the connected area, can be detected during the scanning of the fourth row. When the window is located as indicated in FIG. 19, first, the same temporary label as the temporary label of the upper right pixel is assigned to the two lower pixels in the window since the pixel values of these three pixels are "1", and these pixels are connected. However, taking the pixel value and the temporary label of the pixel located on the left side of the window on the fourth row, the connection of the above three pixels to the other pixels located on the left side of the window on the fourth row is detected. The connection relationships detected as above, are indicated on the label connection table as explained before with reference to FIG. 6. The operations to be carried out in response to the detection of the connection are explained later with reference to FIGS. 20 and 21.

Figure 20:
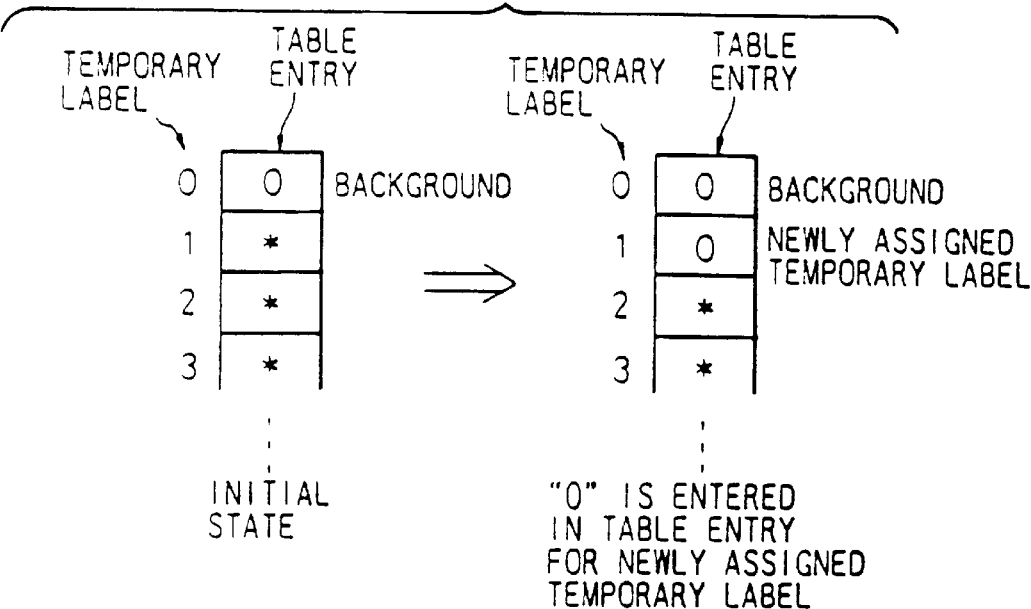
FIGS. 20 and 21 are explanatory diagrams for explaining generation of the label connection table. As explained before with reference to FIG. 6, the label connection table has an entry for each temporary label, and a sequential numbers are used as the temporary labels.
Figure 21:
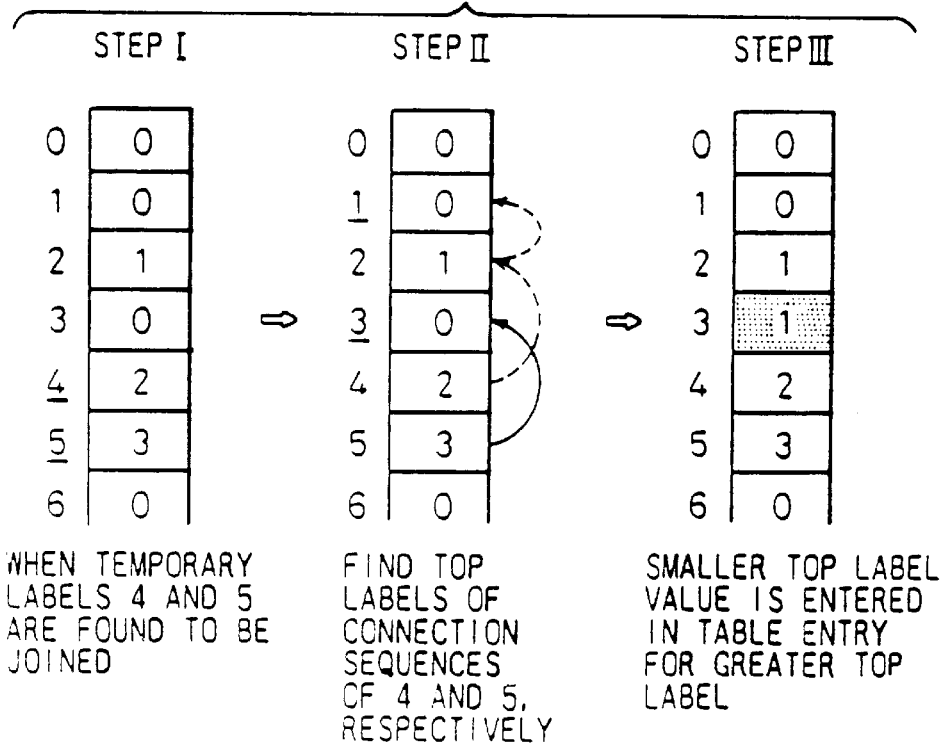

Generation of Label Connection Table (FIGS. 20 and 21)

FIGS. 20 and 21 are explanatory diagrams for explaining generation of the label connection table. As explained before with reference to FIG. 6, the label connection table has an entry for each temporary label, and a sequential numbers are used as the temporary labels. Since the number "0" is assigned to the background in the image, the first entry of the label connection table corresponds to the background as indicated on the left side of FIG. 20. In the first step of generation of the label connection table, the number "0" is written in the entry for the temporary label "0". As understood from the explanations with reference to FIG. 6, the number "0" in each entry of the label connection table indicates that the connected area corresponding to the entry is a connected area to which no other connected area to which a smaller number as the temporary label is assigned, is connected. Thus, the number "0" is also written in the entry corresponding to the temporary label "1", as indicated on the right side of FIG. 20, since the connected area to which the temporary label "1" is assigned is the first connected area to which the temporary label is assigned. Then, when connection of a first connected area to a second connected area to which a smaller number than that assigned to the first connected area is assigned as the temporary label, is detected, the smaller number is written in the entry corresponding to the first connected area in the label connection table. Thus, the label connection tables as indicated on the left side of FIG. 21 are obtained.

FIG. 21 is an explanatory diagram for explaining another operation in response to detection of connection of connected areas. The contents of the label connection table are as indicated on the left side of FIG. 21 (step I of FIG. 21) indicates as follows. The connected area labeled by the number "4" is connected to the connected area labeled by the number "2", the connected area labeled by the number "2" is connected to the connected area labeled by the number "2", and the connected area labeled by the number "1" is not connected to a connected area to which a number smaller than the number "1" is assigned. That is, the connected area corresponding to the temporary label "1", the connected area corresponding to the temporary label "2", and the connected area corresponding to the temporary label "4" form a first chain of connected areas which are connected to each other. In addition, the connected area labeled by the number "5" is connected to the connected area labeled by the number "3", and the connected area labeled by the number "3" is not connected to a connected area to which a number smaller than the number "3" is assigned. That is, the connected area corresponding to the temporary label "3" and the connected area corresponding to the temporary label "5" form a second chain of connected areas which are connected to each other. In the above state, assume that connection of two connected areas to which the numbers "4" and "5" are assigned as temporary labels, respectively, is detected. In this case, the connection of the two connected areas is reflected in the label connection table by the following operations.

In step II, the top (smallest) number assigned as the temporary label is obtained for each of the above first and second chains of connected areas. Thus, the numbers (temporary labels) "1" and "3" are obtained for the first and second chains of connected areas, respectively. Then, in step III, the smaller one of the above two top numbers is written in the entry for the greater one of the two top numbers. Thus, it is indicated that the connected area labeled by the number "3" is connected to the connected area labeled by the number "1", and thus the connection of the first and second chains is indicated in the label connection table, as indicated on the right side of FIG. 21.

Figure 22:
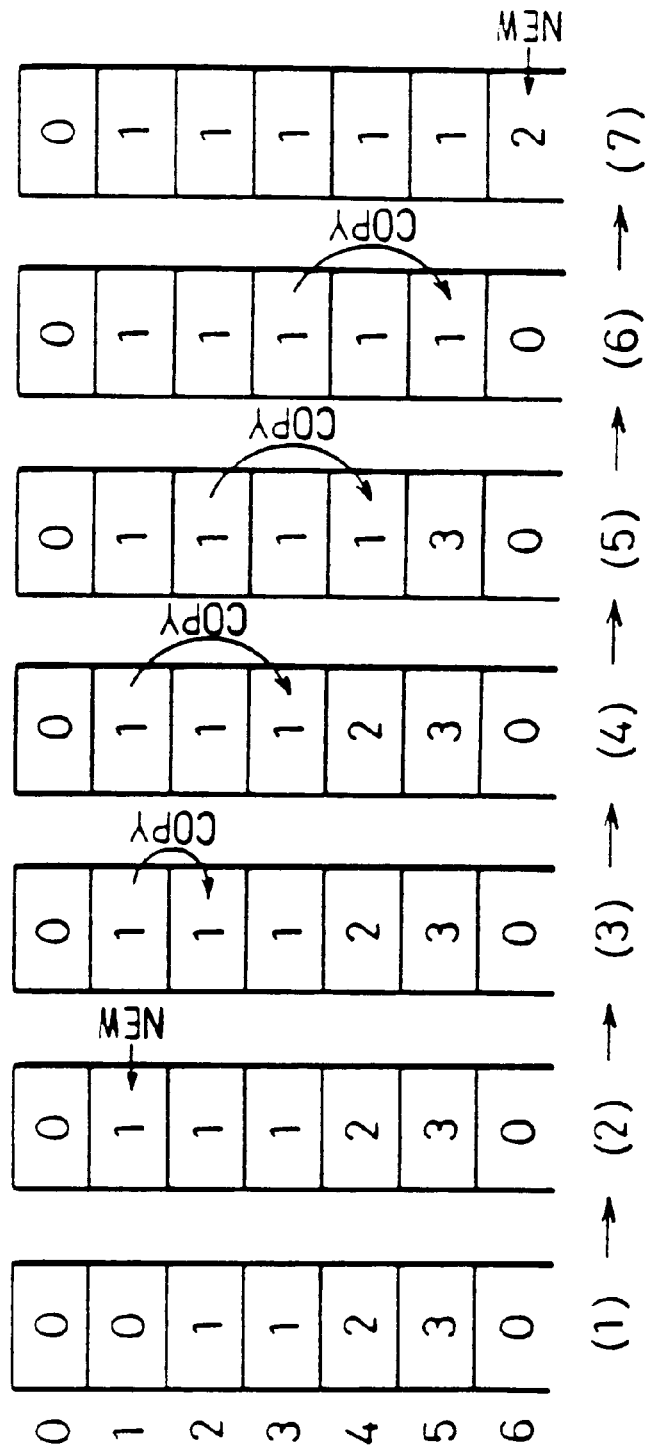
FIG. 22 is a diagram illustrating the operations of converting the label connection table to the label conversion table.

Conversion from Label Connection Table to Label Conversion Table (FIG. 22)

Figure 1:
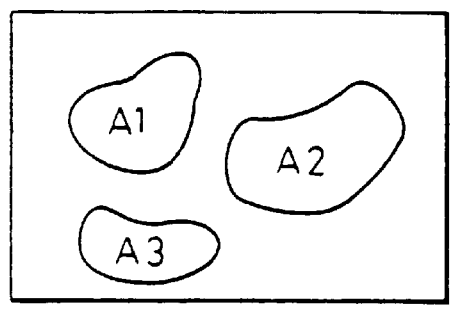
FIG. 1 is a diagram illustrating an example image containing three connected areas, respectively labelled A1, A2, and A3.
Figure 2:
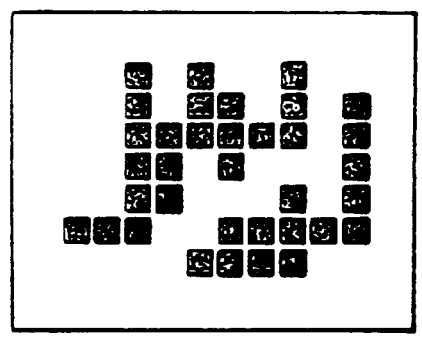
FIG. 2 is a diagram illustrating an example binary pixel image containing a white background area and two connected areas each of which is constituted by a group of pixels.
Figure 3:
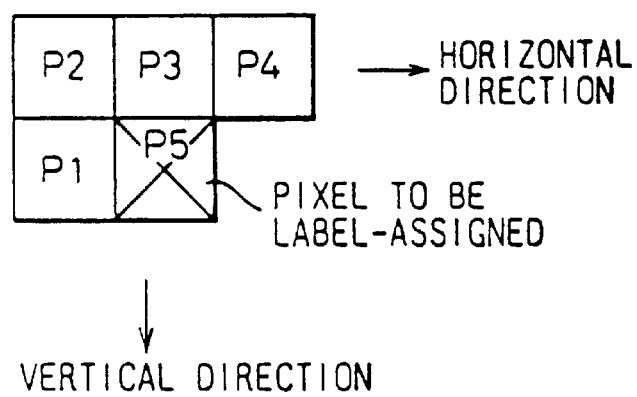
FIG. 3 is a diagram illustrating the window used in the conventional raster-type labelling operation.
Figures 7, 8:
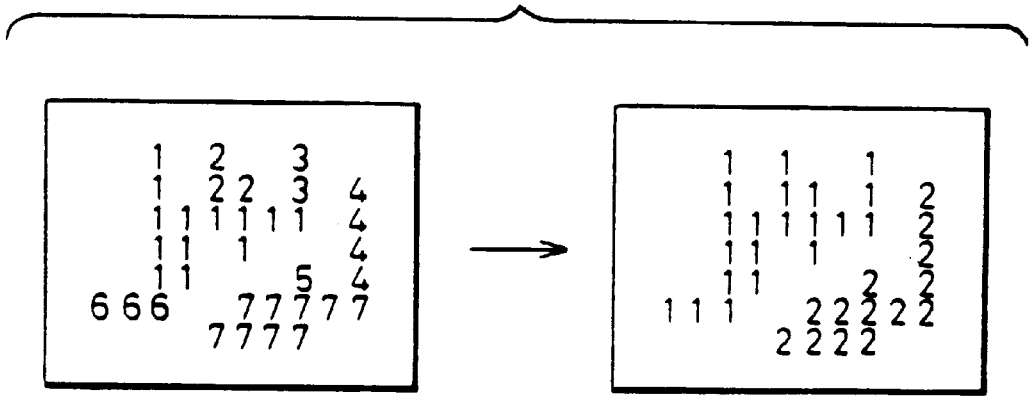
FIG. 7 is a diagram illustrating an example of a (temporary-to-true) label conversion table.
FIG. 8 is a diagram illustrating an example conversion from a temporarily-labelled image to a true-labelled image.

In the embodiment of the first to fifth aspects of the present invention, the label connection table and the (temporary-to-true) label conversion table, as explained before with reference to FIG. 7 use the same area in a memory. That is, the label connection table is generated and renewed during the scanning for the temporary label assignment as explained above, and then, before carrying out the next scanning for the conversion from the temporary label to the true label, the label connection table is converted to the label conversion table as explained below.

FIG. 22 is a diagram illustrating the operations of converting the label connection table to the label conversion table. Assume the contents of the label connection table is as indicated in step (1) of FIG. 22. Sine the entry for the temporary label "0" corresponds to the background, no conversion is performed on the entry. Then, a next smallest number as the temporary label for which the number "0" is written in the entry corresponding to the temporary label, is searched. In the example of FIG. 22, the number "0" as the temporary label is written in the entry for the temporary label "1". Then, the content of the entry for the temporary label "1" is converted from the number "0" as the temporary label to the smallest number "1" as a new true label, in step (2). In this embodiment, the sequential numbers beginning from the number "1" are assigned to the connected areas as the true labels, respectively. Therefore, the number assigned first as the true label is "1". Next, in steps (3) to (6), the above number "1" as the new true label is copied in the successive entries in which non-zero numbers are written until a next smallest number as the temporary label for which the number "0" as the temporary label is written in the entry for the temporary label, is reached. In step (7), the next smallest number as the temporary label for which the number "0" is written in the entry corresponding to the temporary label, is found to be the number "6" as the temporary label, and therefore, the content of the entry for the temporary label "6" is converted from the number "0" as the temporary label to the next smallest number "2" as a new true label. Then, similar operations are performed until the contents of all of the other entries are converted. When the contents of all of the other entries are converted, the conversion from the label connection table to the label conversion table is completed.

Shift of Top Temporary Label (FIGS. 23 to 28)

In the above explanations of the label connection table, it is assumed that the top temporary label assigned to the connected areas is the number "1", and the sequential numbers "1", "2", . . . , are used as the temporary labels in the label connection table, and are used as the true labels in the label conversion table which is generated by conversion from the label connection table as explained above. However, when more than one circumscribing areas overlap as indicated in FIG. 23, a problem arises during the conversion from temporary label to true labels as explained below.

Figure 23:
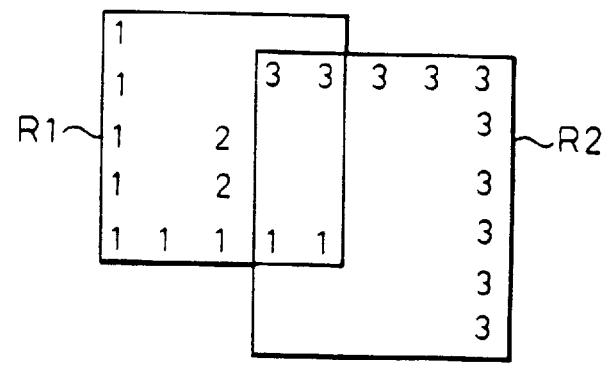
FIG. 23 is a diagram illustrating a portion of an image in which two circumscribing rectangles R1 and R2 overlap.
Figure 24:
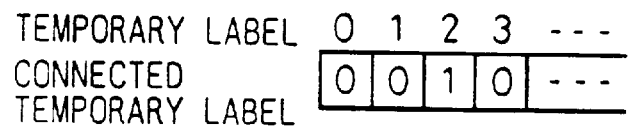
FIG. 24 is a diagram illustrating a label connection table which indicates connection relationship among connected areas to which the temporary labels are assigned, and which is generated for the portion of the image of FIG. 23.

FIG. 23 is a diagram illustrating a portion of an image in which two circumscribing rectangles R1 and R2 overlap. In FIG. 23, the circumscribing rectangle R1 is determined so that the circumscribing rectangle R1 contains the connected areas labeled by the numbers "1" and "2". The circumscribing rectangle R2 is determined so that the circumscribing rectangle R2 contains the connected area labeled by the number "3". However, two pixels in the connected area labeled by the number "1" and two other pixels in the connected area labeled by the number "3", are contained in both the circumscribing rectangles R1 and R2. The label connection table indicating connection relationship among connected areas to which the temporary labels are assigned, are generated for the portion of the image of FIG. 23 as indicated in FIG. 24.

In accordance with the procedure explained with reference to FIG. 22, a label conversion table as indicated in FIG.

25 is obtained. Then, all of the pixels in the circumscribing rectangles R1 and R2 are scanned, and the temporary labels of the scanned pixels are converted to the true labels corresponding to the temporary labels in accordance with the label conversion table of FIG. 25, as follows.

Figure 25:
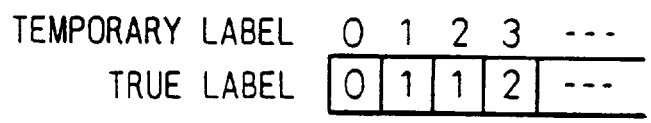
FIG. 25 is a diagram illustrating a label conversion table generated from the label connection table of FIG. 24.
Figure 26:
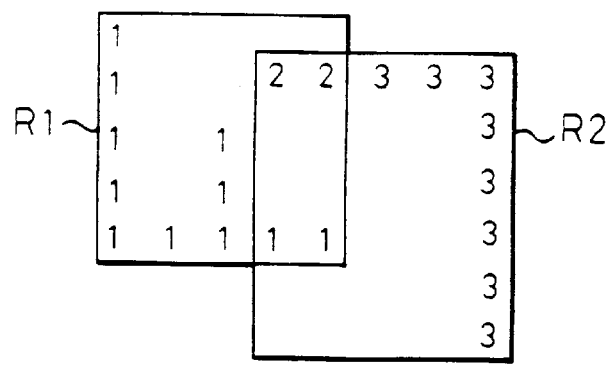
FIG. 26 is a diagram illustrating the result of conversion in accordance with the label conversion table of FIG. 25 within the circumscribing rectangle R1.
Figure 27:
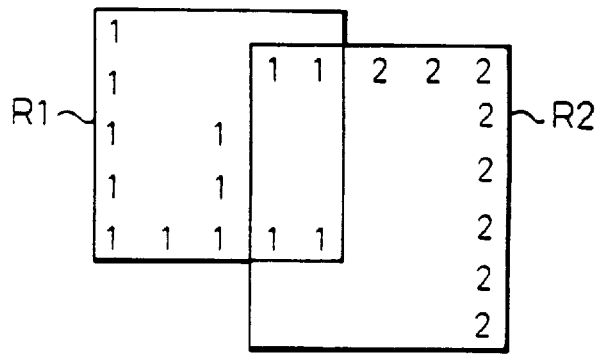
FIG. 27 is a diagram illustrating the result of the conversion within the circumscribing rectangle R2 only, following the conversion within the circumscribing rectangle R1.

First, the conversion in accordance with the label conversion table of FIG. 25 is performed within the circumscribing rectangle R1 only. The result of the conversion within the circumscribing rectangle R1 only is indicated in FIG. 26. Then, the conversion in accordance with the label conversion table of FIG. 25 is performed within the circumscribing rectangle R2 only. The result of the conversion within the circumscribing rectangle R2 only, following the above conversion within the circumscribing rectangle R1, is indicated in FIG. 27. As understood from the comparison of FIGS. 23 and 27, the same number "1" as the true label is assigned to the two areas which are apart from (not connected to) each other in FIG. 27. Since the true label should identify each connected area, the same true label should not be assigned to two areas which are apart from each other. This problem occurs because the pixels in the overlapped area are converted again by the conversion within the circumscribing rectangle R2 after the conversion within the circumscribing rectangle R1.

Figure 28:
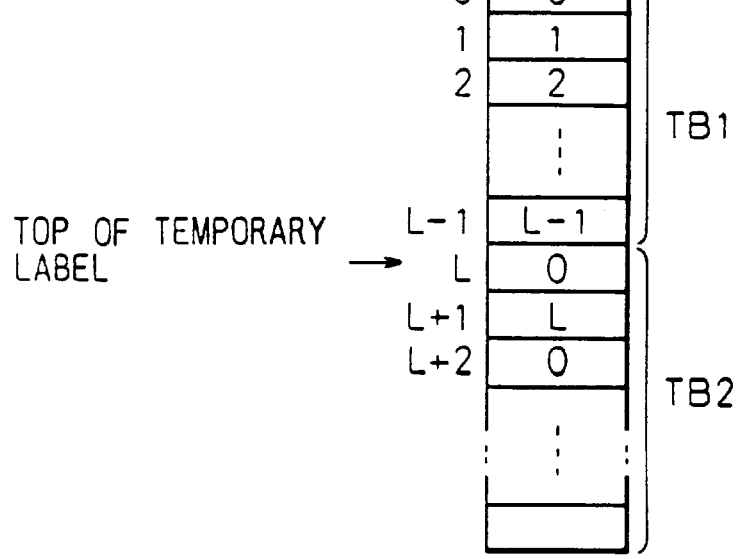
FIG. 28 is a diagram illustrating a table used as a label connection table in the temporary label assignment and used as a label conversion table in the conversion from temporary labels to true labels.

The above problem is solved by the provision as follows. FIG. 28 is a diagram illustrating a table used as a label connection table in the temporary label assignment and used as a label conversion table in the conversion from temporary labels to true labels. The table of FIG. 28 contains first and second portions TB1 and TB2. The addresses correspond to labels before converted by the temporary-to-true conversion, and the contents of the entries corresponding to the addresses correspond to true labels after converted by the temporary-to-true conversion. In the first portion TB1, the contents of the entries in the addresses from "0" to "L–1" are respectively the same as the corresponding addresses, where L is an integer which is predetermined so that the number "L" is sufficiently greater than the roughly estimated number of the connected areas in the image subject to the labeling. Thus, when the first portion is used as the label conversion table, the numbers assigned to pixels as (temporary or true) labels are not changed by the conversion. The second portion TB2 of the table of FIG. 28 correspond to the label conversion table as explained before with reference to FIGS. 7, 22, and 24. That is, the addresses of the second portion of the table correspond to the temporary labels, and the contents of the entries for the respective temporary labels respectively indicate the true labels to which the respective temporary labels should be converted. Namely, in this embodiment, the numbers beginning with "L" are assigned as the temporary labels.

FIG. 29 is a diagram illustrating the same portion of the image as the image portion of FIG. 23, wherein the numbers beginning with "L" are assigned as the temporary labels. The contents of the second portion TB2 of the label conversion table of FIG. 28 indicate the connection relationship of the image portion of FIG. 29. Next, the second portion TB2 of the label conversion table of FIG. 28 is converted to a label conversion table. Since the first portion TB1 of the table of FIG. 28 is originally provided as a portion of a label conversion table, the conversion is not carried out for the first portion TB1. FIG. 30 is a diagram illustrating the label conversion table generated from the table of FIG. 28. Then, as indicated in FIG. 30, the circumscribing rectangles R1 and R2 are determined in the same way as FIG. 23.

Figure 31:
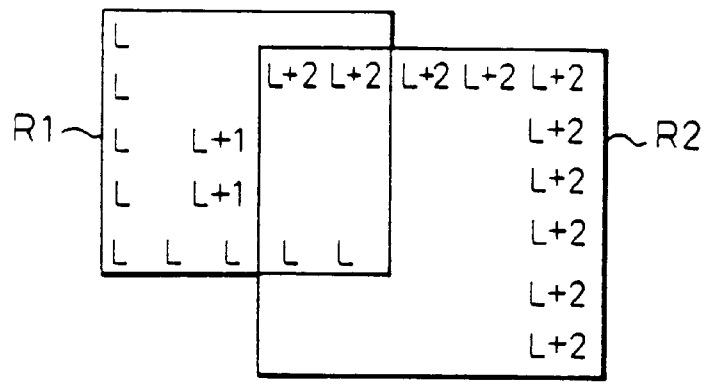
FIG. 31 is a diagram illustrating the circumscribing rectangles R1 and R2 determined in the image portion of FIG. 29.
Figure 32:
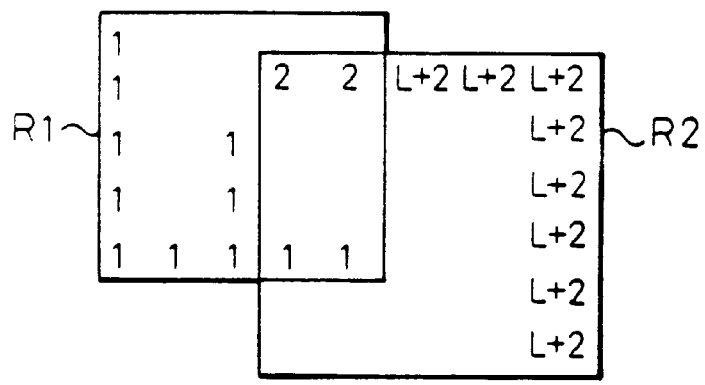
FIG. 32 is a diagram illustrating the result of the conversion from temporary labels to true labels, carried out on the image portion of FIG. 31, in accordance with the label conversion the table of FIG. 30 within the circumscribing rectangle R1 only.
Figure 33:
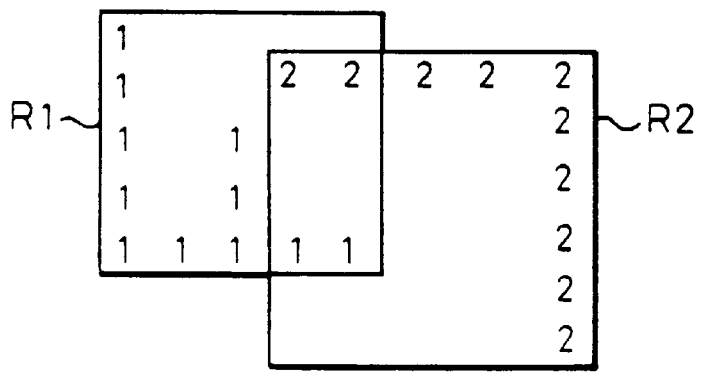
FIG. 33 is a diagram illustrating the result of the conversion from temporary labels to true labels, carried out on the image portion of FIG. 31, in accordance with the label conversion the table of FIG. 30 within the circumscribing rectangle R2.

FIG. 31 is a diagram illustrating the circumscribing rectangles R1 and R2 determined in the image portion of FIG. 29, wherein the circumscribing rectangle R1 is determined so that the circumscribing rectangle R1 contains pixels labeled by the number "L", and the circumscribing rectangle R2 is determined so that the circumscribing rectangle R2 contains pixels labeled by the number "L+2". When the conversion from temporary labels to true labels is carried out on the image portion of FIG. 31 in accordance with the label conversion the table of FIG. 30 within the circumscribing rectangle R1, the result as indicated in FIG. 32 is obtained. Then, the conversion from temporary labels to true labels is carried out on the image portion of FIG. 31 in accordance with the label conversion the table of FIG. 30 within the circumscribing rectangle R2, and thus the result as indicated in FIG. 33 is obtained. As shown in FIG. 33, the true labels are properly assigned in the image portion of FIG. 33. The temporary labels of the pixels in the overlapped portion are converted to true labels after the above conversion within the circumscribing rectangle R1, and then the true labels are respectively converted to the same true labels in accordance with the first portion TB1 of the table of FIG. 28, by the conversion within the circumscribing rectangle R2. Therefore, no problem occur in the true labels of the pixels in the overlapped portion after being doubly converted as above. For the above purpose, the number "L" is predetermined to be greater than the number of the connected areas (true labels).

Figure 34:
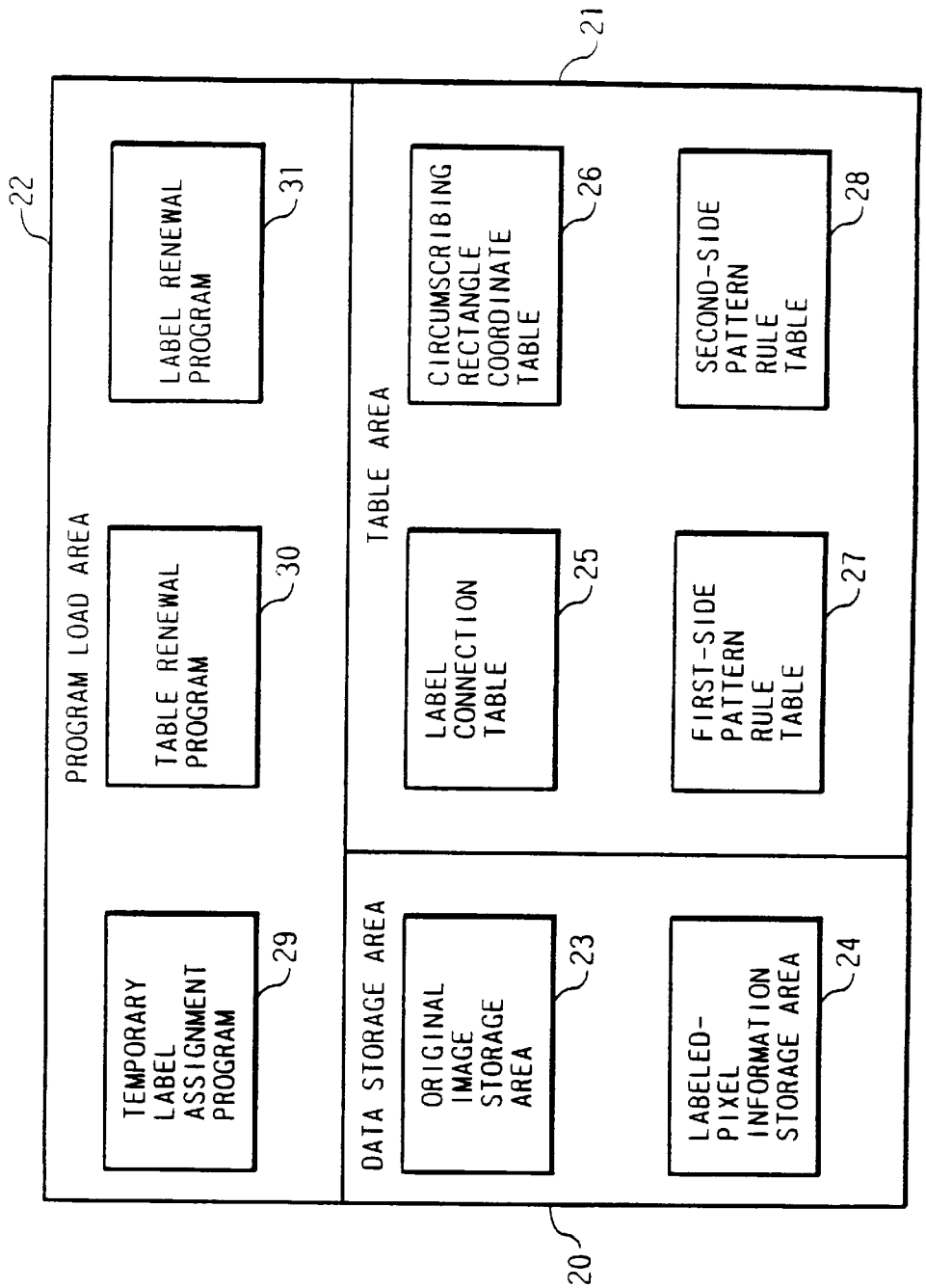
FIG. 34 is a diagram illustrating data arrangement in a memory in an embodiment of the present invention.

Data Arrangement on Memory (FIG. 34)

FIG. 34 is a diagram illustrating data arrangement in a memory in an embodiment of the present invention. In FIG. 34, reference number 20 denotes a data storage area, 21 denotes a table area, and 22 denotes a program load area. In the data storage area 20, the original image storage area 23 and the labelled-pixel information storage area 24 are provided. The original image storage area 23 stores the original image subject to the processing according to the present invention. The labelled-pixel information storage area 24 stores information on the temporarily-labelled image (i.e., temporary labels assigned to all pixels in the image) and information on the true-labelled image (i.e., true labels assigned to all pixels in the image). The label connection table 25 is such that explained with reference to FIG. 28, and therefore, the label connection table 25 is converted to the label conversion table as explained with reference to FIG. 30. The circumscribing rectangle coordinate table 26 is such that explained with reference to FIG. 15. The first-side pattern rule table 27 and the second-side pattern rule table 28 are provided in the most preferable embodiment of the present invention, and are explained later.

Figure 35:
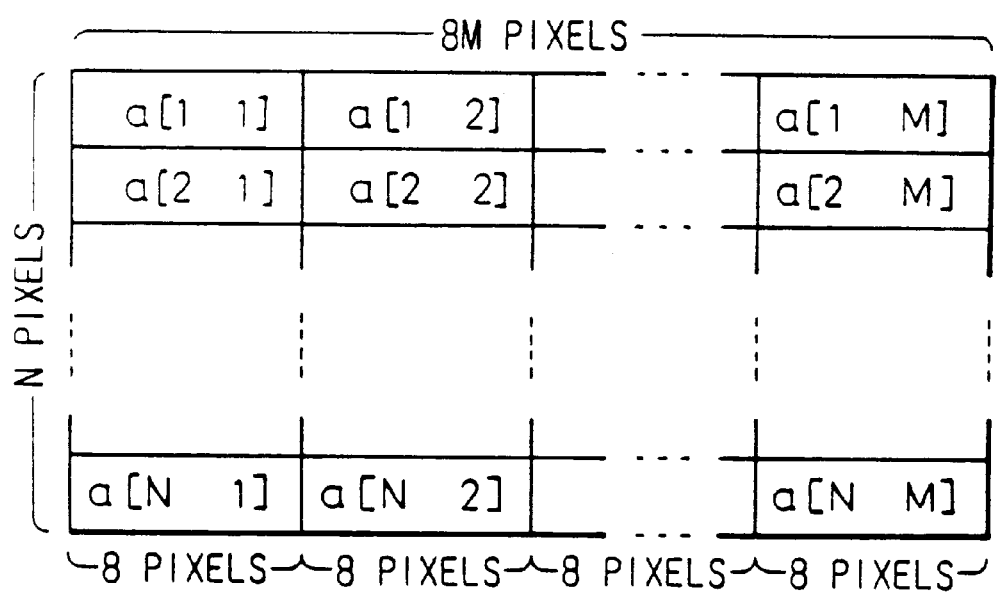
FIG. 35 is a diagram illustrating data arrangement in the original image storage area 23 in the most preferable embodiment of the present invention.

Arrangement of Original Image Date in Memory (FIGS. 35 and 23)

FIG. 35 is a diagram illustrating data arrangement in the original image storage area 23 in the most preferable embodiment of the present invention. In the most preferable embodiment of the present invention, it is assumed that the original image is a binary image data, i.e., each pixel value (brightness of each pixel) is expressed by one bit. As indicated in FIG. 35, the binary image data of 8M×N pixels is arranged in the unit of eight bits (a byte) corresponding to eight pixels, where M and N are an integer. In FIG. 35, each unit of image data is denoted by "a[i, j]", where i and j are an integer, $1 \leq i \leq M$, and $1 \leq j \leq N$.

Figure 36:
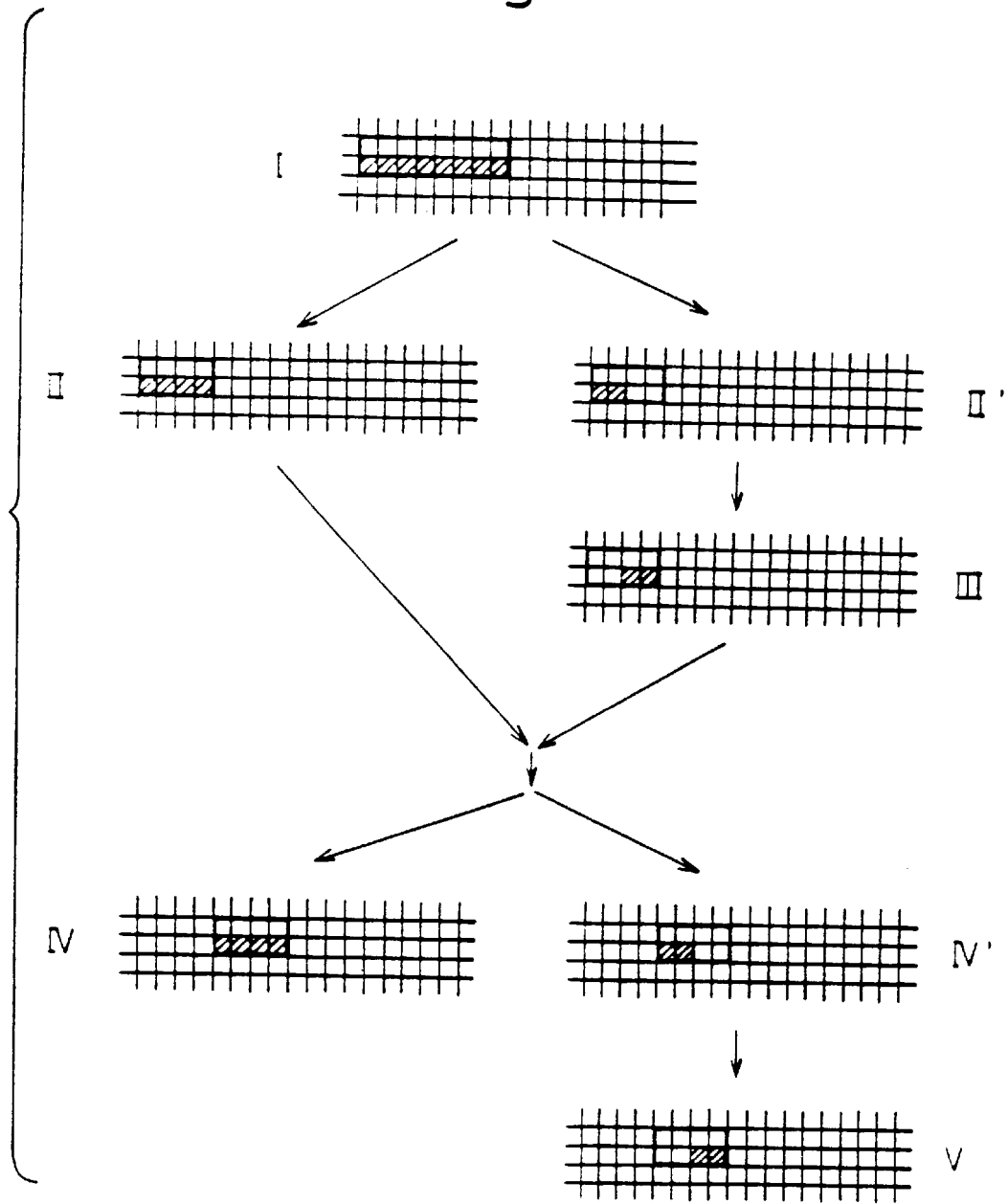
FIG. 36 is a diagram illustrating a set pixels data of which is fetched in each fetching operaton, and other sets of pixels handled in the stages following the fetching.
Figure 37A:
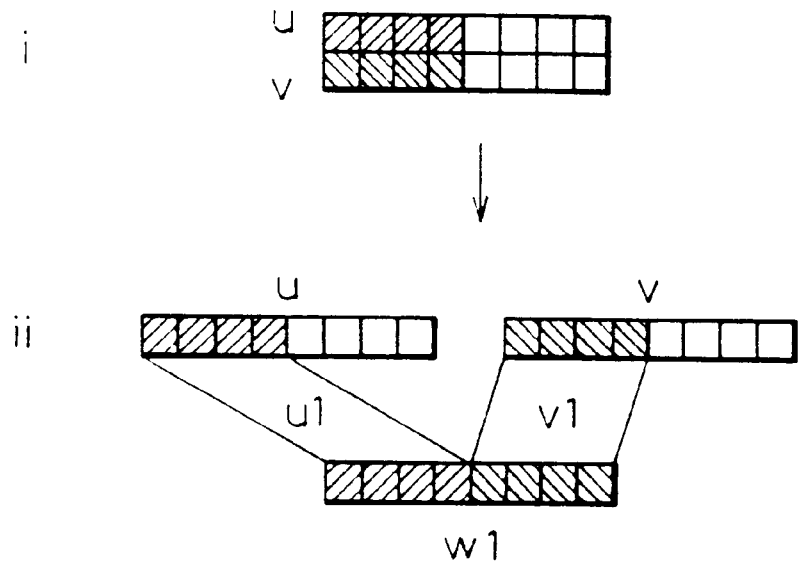
FIGS. 37A and 37B are diagrams illustrating handling of the data of the above fetched set of pixels for obtaining one byte data.
Figure 37B:
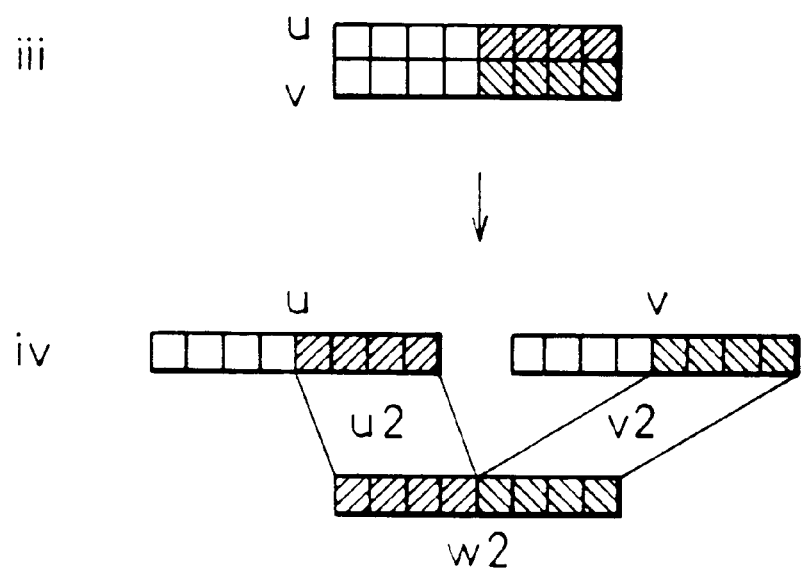

Fetching and Handling of Image Data (FIGS. 36, 37A and 37B)

FIG. 36 is a diagram illustrating a set pixels, data of which is fetched in each fetching operation, and other sets of pixels handled in the stages following the fetching. The data indicates the value of each pixel, i.e., "0" or "1". In FIG. 36, the sets of pixels fetched and handled are indicated by the locations and configurations in the original image, where the sets of pixels encircled by bold lines are those fetched and handled.

Figure 48:
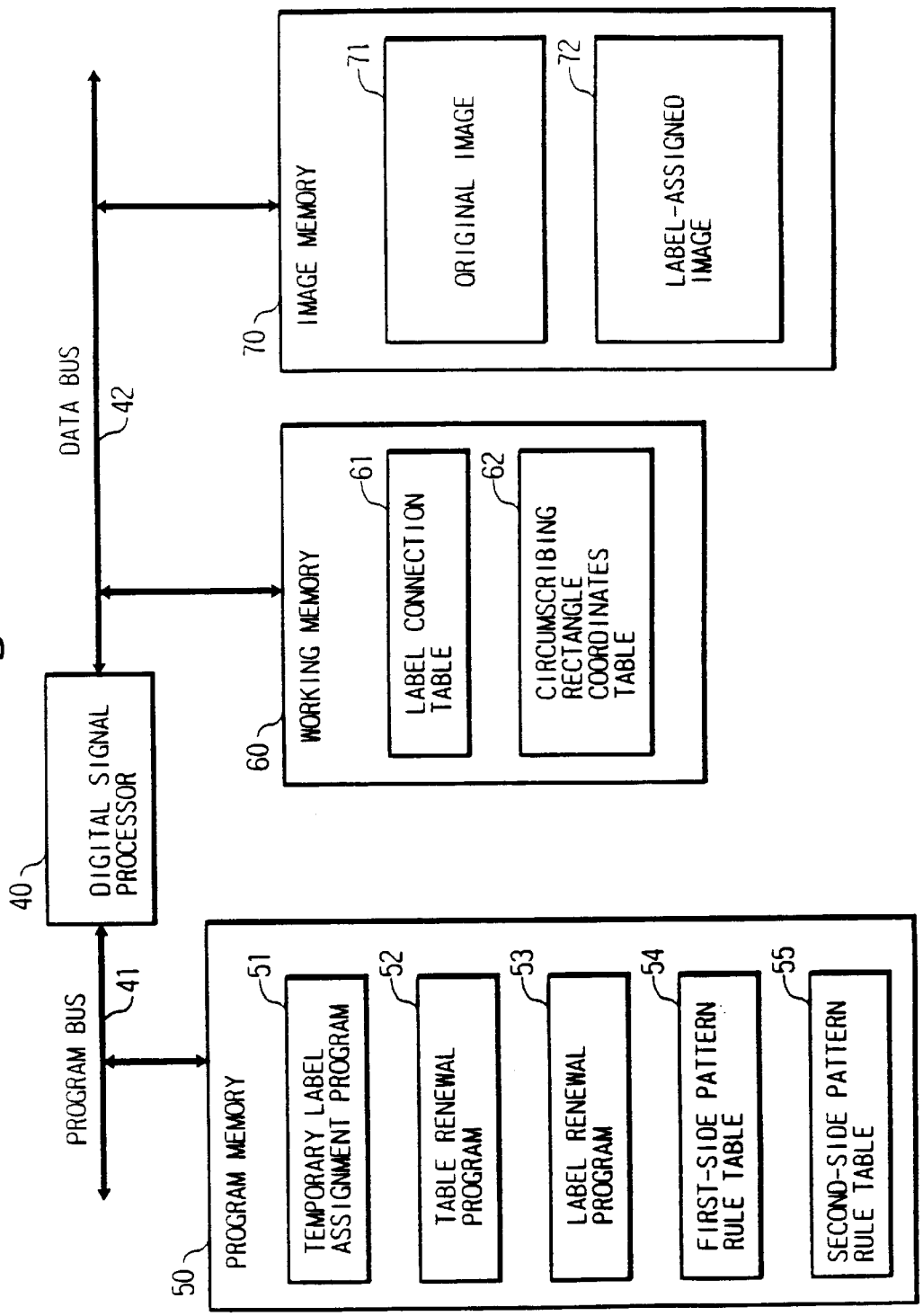
Figure 49:
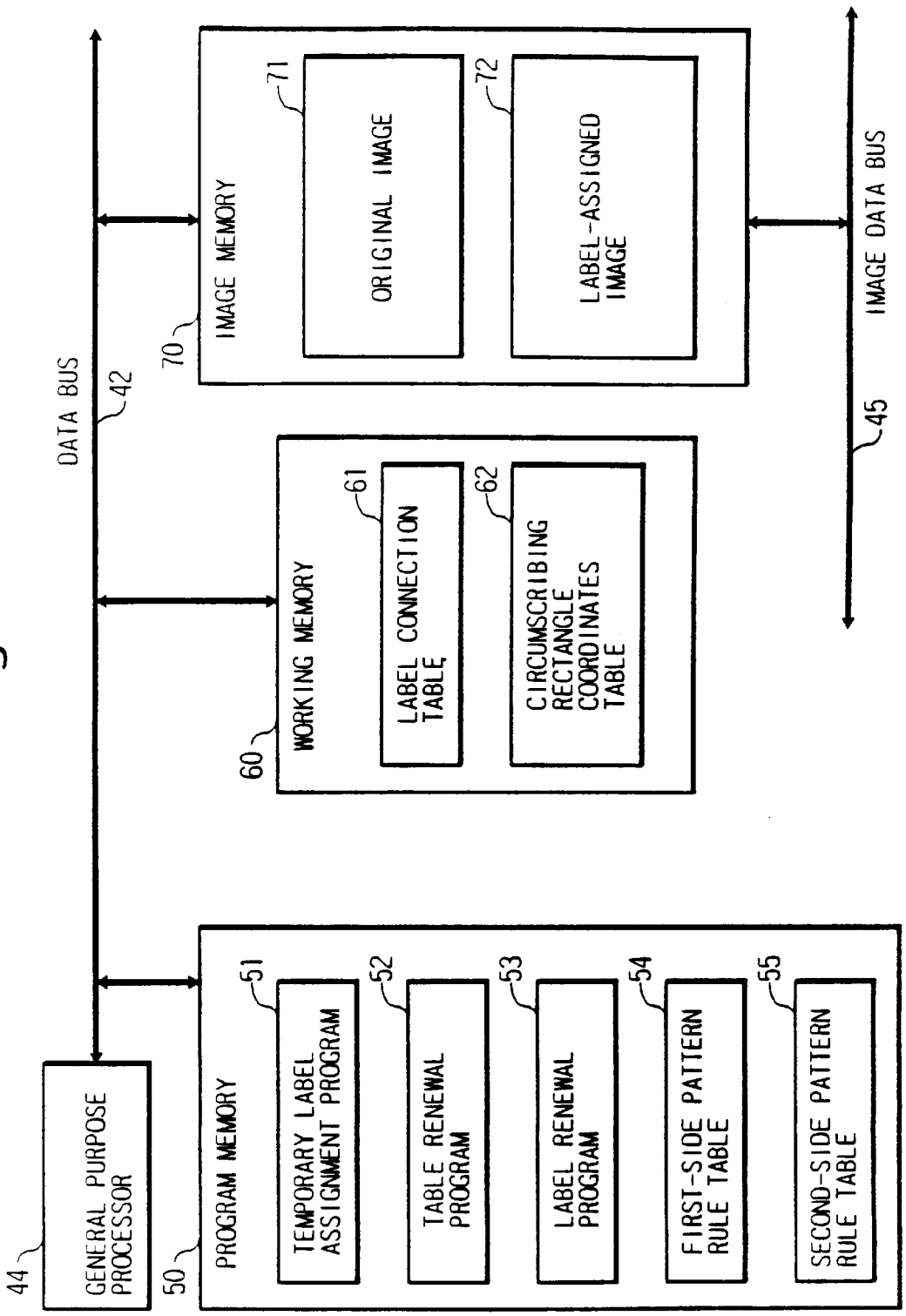

In stage I of FIG. 36, data of 8×2 pixels are fetched from the original image storage area 23 in the memory (FIG. 34) by a processor as shown in FIGS. 48 to 50. In the most preferable embodiment of the present invention, it is determined whether or not the values of the fetched 8×2 pixels are all "0". When YES is determined, the number "0" as the temporary label is assigned to the eight pixels on the lower row of the fetched 8×2 pixels, and the operation goes to the fetching of the next 8×2 pixels in the original image. When NO is determined, it is determined whether or not the value of the fetched 8×2 pixels are all "1". When YES is determined, the same number as that assigned to the eight pixels on the upper row of the fetched 8×2 pixels the temporary label is assigned to the eight pixels on the lower row of the fetched 8×2 pixels, and the operation goes to the fetching of the next 8×2 pixels in the original image. When NO is determined, the patterns obtained in the following stages II to V are examined as explained in detail later. The determination whether or not the value of the fetched 8×2 pixels are all "1", may or may not be performed in the most preferable embodiment of the present invention.

In stages II, II', and III, the data of the left half (4×2 pixels) of the fetched set of pixels (8×2 pixels) is handled. In stage II, a first pattern formed by the entirety (4×2 pixels) of the left half of the fetched set of pixels is determined, and then it is determined whether or not the above first pattern coincides with one of a plurality of predetermined patterns corresponding to which the plurality of temporary label assignment rules are stored in the assignment rule storage unit 5 in FIGS. 5 and 16. In the most preferable embodiment of the present invention, the plurality of temporary label assignment rules are included in the temporary label assignment program 29 of FIG. 34. When it is determined that the above first pattern coincides with one of a plurality of predetermined patterns corresponding to which the plurality of temporary label assignment rules are stored in the assignment rule storage unit 5 in FIGS. 5 and 16, temporary labels are assigned to the four pixels on the lower row in the entirety (4×2 pixels) of the left half of the fetched set of pixels, based on one of the plurality of temporary label assignment rules corresponding to the above determined one of the plurality of predetermined patterns.

Next, in stage II', a second pattern formed by the left half (2×2 pixels) of the above left half (4×2 pixels) of the fetched set of pixels is determined, and then it is determined whether or not the above second pattern coincides with one of a plurality of predetermined patterns corresponding to which the plurality of temporary label assignment rules are stored in the assignment rule storage unit 5 in FIGS. 5 and 16. When it is determined that the above second pattern coincides with one of a plurality of predetermined patterns corresponding to which the plurality of temporary label assignment rules are stored in the assignment rule storage unit 5 in FIGS. 5 and 16, temporary labels are assigned to the two pixels on the lower row in the left half (2×2 pixels) of the above left half (4×2 pixels) of the fetched set of pixels, based on one of the plurality of temporary label assignment rules corresponding to the above determined one of the plurality of predetermined patterns.

Then, in stage III, a third pattern formed by the right half (2×2 pixels) of the above left half (4×2 pixels) of the fetched set of pixels is determined, and then it is determined whether or not the above third pattern coincides with one of a plurality of predetermined patterns corresponding to which the plurality of temporary label assignment rules are stored in the assignment rule storage unit 5 in FIGS. 5 and 16. When it is determined that the above third pattern coincides with one of a plurality of predetermined patterns corresponding to which the plurality of temporary label assignment rules are stored in the assignment rule storage unit 5 in FIGS. 5 and 16, temporary labels are assigned to the two pixels on the lower row in the right half (2×2 pixels) of the above left half (4×2 pixels) of the fetched set of pixels, based on one of the plurality of temporary label assignment rules corresponding to the above determined one of the plurality of predetermined patterns.

In stages IV, IV', and V, the data of the right half (4×2 pixels) of the fetched set of pixels (8×2 pixels) is handled. In stage IV, a fourth pattern formed by the entirety (4×2 pixels) of the right half of the fetched set of pixels is determined, and then it is determined whether or not the above first pattern coincides with one of a plurality of predetermined patterns corresponding to which the plurality of temporary label assignment rules are stored in the assignment rule storage unit 5 in FIGS. 5 and 16. When it is determined that the above fourth pattern coincides with one of a plurality of predetermined patterns corresponding to which the plurality of temporary label assignment rules are stored in the assignment rule storage unit 5 in FIGS. 5 and 16, temporary labels are assigned to the four pixels on the lower row in the entirety (4×2 pixels) of the right half of the fetched set of pixels, based on one of the plurality of temporary label assignment rules corresponding to the above determined one of the plurality of predetermined patterns.

Next, in stage IV', a fifth pattern formed by the left half (2×2 pixels) of the above right half (4×2 pixels) of the fetched set of pixels is determined, and then it is determined whether or not the above fifth pattern coincides with one of a plurality of predetermined patterns corresponding to which the plurality of temporary label assignment rules are stored in the assignment rule storage unit 5 in FIGS. 5 and 16. When it is determined that the above fifth pattern coincides with one of the plurality of predetermined patterns corresponding to which the plurality of temporary label assignment rules are stored in the assignment rule storage unit 5 in FIGS. 5 and 16, temporary labels are assigned to the two pixels on the lower row in the left half (2×2 pixels) of the above right half (4×2 pixels) of the fetched set of pixels, based on one of the plurality of temporary label assignment rules corresponding to the above determined one of the plurality of predetermined patterns.

Then, in stage V, a sixth pattern formed by the right half (2×2 pixels) of the above right half (4×2 pixels) of the fetched set of pixels is determined, and then it is determined whether or not the above sixth pattern coincides with one of a plurality of predetermined patterns corresponding to which the plurality of temporary label assignment rules are stored in the assignment rule storage unit 5 in FIGS. 5 and 16. When it is determined that the above sixth pattern coincides with one of a plurality of predetermined patterns corresponding to which the plurality of temporary label assignment rules are stored in the assignment rule storage unit 5 in FIGS. 5 and 16, temporary labels are assigned to the two pixels on the lower row in the right half (2×2 pixels) of the above right half (4×2 pixels) of the fetched set of pixels, based on one of the plurality of temporary label assignment rules corresponding to the above determined one of the plurality of predetermined patterns.

FIGS. 37A and 37B are diagrams illustrating handling of the data of the above fetched set of pixels for obtaining one byte data. In step i of FIG. 35A, the two bytes of pixel data (which are the same as the data of the set of pixels indicated in stage I of FIG. 36) are fetched. In FIG. 37A, these two bytes are respectively denoted by u and v. Then, in step ii, the left half byte (denoted by u1) of the fetched byte u and the left half byte (denoted by v1) of the fetched byte v are combined to form a new byte w1. This byte w1 corresponds to the left half of the fetched set of pixels indicated in stage II of FIG. 36. Similarly, in step iv in FIG. 37B, the right half byte (denoted by u2) of the fetched byte u and the right half byte (denoted by v2) of the fetched byte v are combined to form another new byte w2. This byte w2 corresponds to the right half of the fetched set of pixels indicated in stage IV of FIG. 36. Although not shown, the above two bytes w1 and w2 can be obtained by providing registers for holding the above bytes u, v, w1, and w2, and connecting the registers by wires as indicated in step ii in FIG. 37A and step iv in FIG. 37B.

Patterns of Pixel Values (FIGS. 38, 39, 40, and 41)

Figures 38, 39:
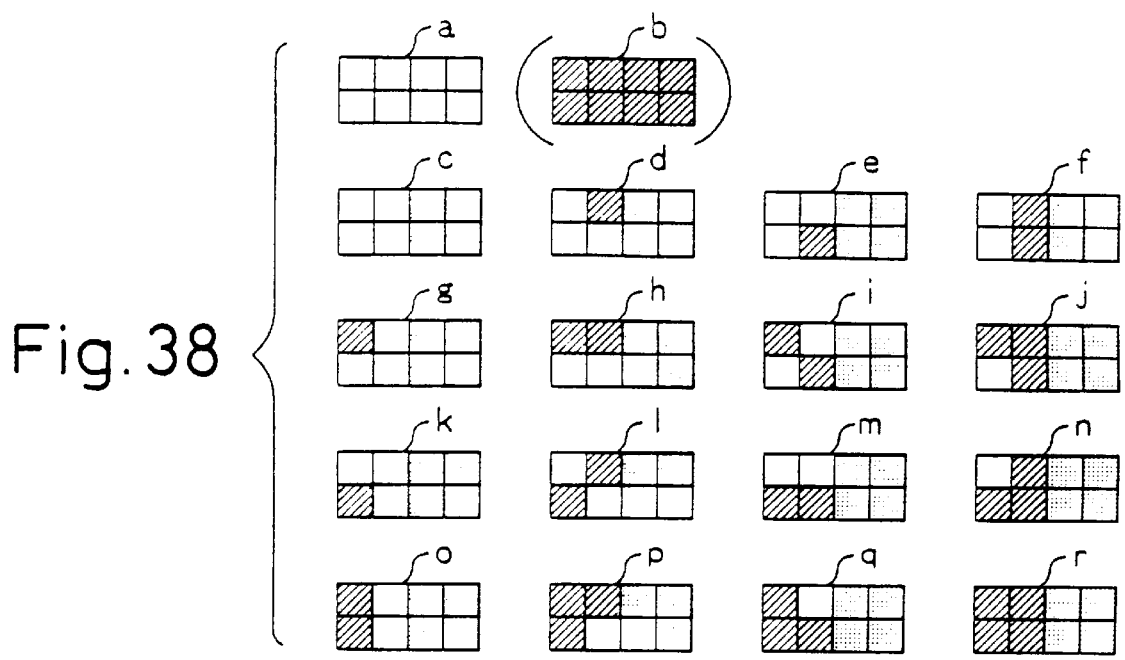
FIG. 38 is a diagram illustrating predetermined patterns a to r of pixel values in the left or right half (4×2 pixels) of the fetched set of pixel values, or in the left half (2×2 pixels) of the left or right half of the fetched set of pixel values.
FIG. 39 is a diagram illustrating the first-side pattern rule table.

FIG. 38 is a diagram illustrating predetermined patterns a to r of pixel values in the left or right half (4×2 pixels) of the fetched set of pixel values (8×2 pixels) which are examined in stages II and IV in FIG. 36, or in the left half (2×2 pixels) of the left or right half (4×2 pixels) of the fetched set of pixel values (8×2 pixels) which are examined in stages II' and IV' in FIG. 36. In each pattern indicated in FIG. 38, each square corresponds to a pixel, each blank square indicates a white pixel having a value "0", each hatched square indicates a black pixel having a value "1", and each dotted square indicates a pixel which is included in the right half (2×2 pixels) of the left or right half (4×2 pixels) of the fetched set of pixel values (8×2 pixels). The right half (2×2 pixels) of the left or right half (4×2 pixels) of the fetched set of pixel values (8×2 pixels) are not used in the determination (selection) of the temporary label assignment rule for use in assignment of temporary labels to the two lower pixels in left half (2×2 pixels) of the left or right half (4×2 pixels) of the fetched set of pixel values (8×2 pixels). As explained before with reference to FIG. 36 (stage I), among the patterns a to r indicated in FIG. 38, the pattern b may or may not be used in the most preferable embodiment of the present invention.

When determining whether or not the left or right half (4×2 pixels) of the fetched set of pixel values form one of the patterns a and b, all bits in the byte w1 or w2 are examined. When determining whether or not the left half (2×2 pixels) of the left or right half of the fetched set of pixel values form one of the patterns c and r, the corresponding four bits contained in the above byte w1 or w2 of FIGS. 37A and 37B are examined, and the other four bits in the byte w1 or w2 are not examined at the same instant. However, in the most preferable embodiment of the present invention, for the purpose of simplicity of the operations, temporary label assignment rules provided for use in assigning temporary labels to the four lower pixels in the left or right half (4×2 pixels) of the fetched set of pixel values, or in the two lower pixels in the left half (2×2 pixels) of the left or right half of the fetched set of pixel values, are indicated in the first-side pattern rule table 27 (in the table area 21 of FIG. 34) as indicated in FIG. 39, corresponding to all possible representations by the eight bits in the byte w1 or w2. Namely, one of the temporary label assignment rules is selected based on a digital value represented by the eight bits in the byte w1 or w2. The first-side pattern rule table indicated in FIG. 39 has entries corresponding to all possible values represented by the eight bits in the byte w1 or w2, and the content of each entry indicates which one of the temporary label assignment rules (respectively provided corresponding to the patterns a to r) should be used corresponding to a value represented by the eight bits in the byte w1 or w2. The content may be a top address of an area in a memory, in which area the above one of the temporary label assignment rules which should be used is stored.

Figure 40:
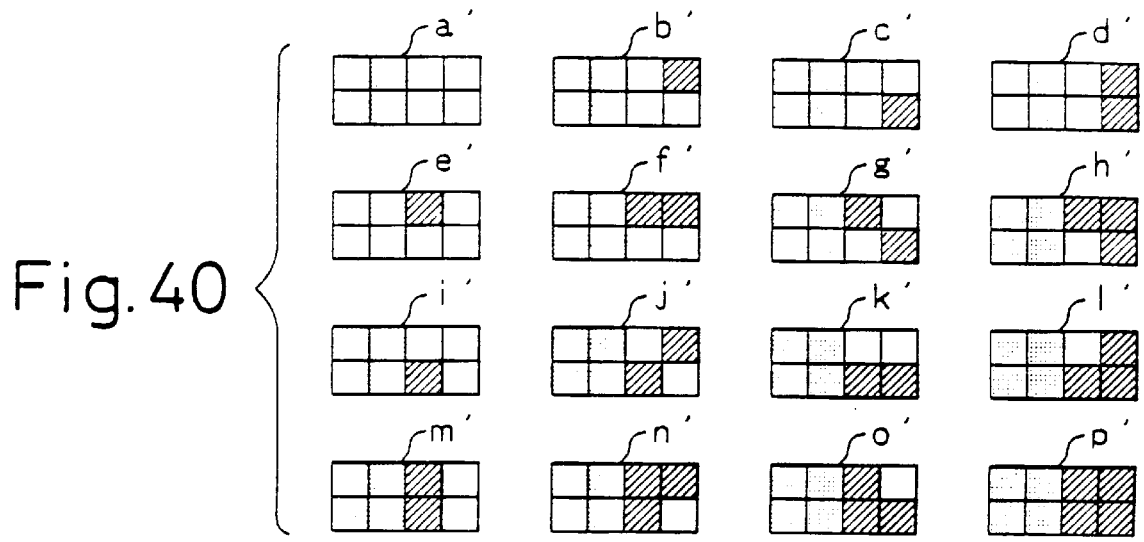
FIG. 40 is a diagram illustrating predetermined patterns a to r of pixel values in the right half (2×2 pixels) of the left or right half of the fetched set of pixel values.

FIG. 40 is a diagram illustrating predetermined patterns a' to p' of pixel values in the right half (2×2 pixels) of the left or right half (4×2 pixels) of the fetched set of pixel values (8×2 pixels) as explained which are examined in stages III and V in FIG. 36. In each pattern indicated in FIG. 38, each square corresponds to a pixel, each blank square indicates a white pixel having a value "0", each hatched square indicates a black pixel having a value "1", and each dotted square indicates a pixel which is included in the left half (2×2 pixels) of the left or right half (4×2 pixels) of the fetched set of pixel values (8×2 pixels). The left half (2×2 pixels) of the left or right half (4×2 pixels) of the fetched set of pixel values (8×2 pixels) are not used in the determination (selection) of the temporary label assignment rule for use in assignment of temporary labels to the two lower pixels in right half (2×2 pixels) of the left or right half (4×2 pixels) of the fetched set of pixel values (8×2 pixels).

Figure 41:
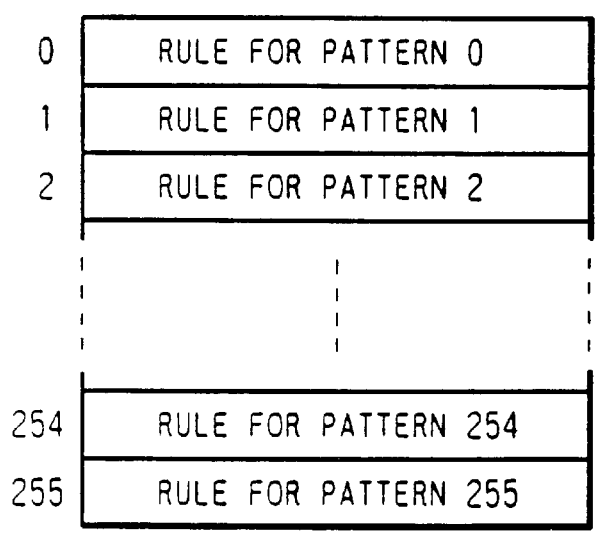
FIG. 41 is a diagram illustrating the second-side pattern rule table.

When determining whether or not the right half (2×2 pixels) of the left or right half of the fetched set of pixel values form one of the patterns a' and p', the corresponding four bits contained in the above byte w1 or w2 of FIGS. 37A and 37B are examined, and the other four bits in the byte w1 or w2 are not necessary to be examined at the same instance. However, in the most preferable embodiment of the present invention, for the purpose of simplicity of the operations, temporary label assignment rules provided for use in assigning temporary labels to the four lower pixels in the two lower pixels in the right half (2×2 pixels) of the left or right half of the fetched set of pixel values, are indicated in the second-side pattern rule table 28 (in the table area 21 in FIG. 34) as indicated in FIG. 41, corresponding to all possible representations by the eight bits in the byte w1 or w2. Namely, one of the temporary label assignment rules is selected based on a digital value represented by the eight bits in the byte w1 or w2. The second-side pattern rule table indicated in FIG. 41 has entries corresponding to all possible values represented by the eight bits in the byte w1 or w2, and the content of each entry indicates which one of the temporary label assignment rules (respectively provided corresponding to the patterns a' to p') should be used corresponding to a digital value represented by the eight bits in the byte w1 or w2. The content may be a top address of an area in the memory, in which area the above one of the temporary label assignment rules which should be used is stored.

Pattern Assignment Rules (FIGS. 42, and 43A to 43E)

Figure 42:
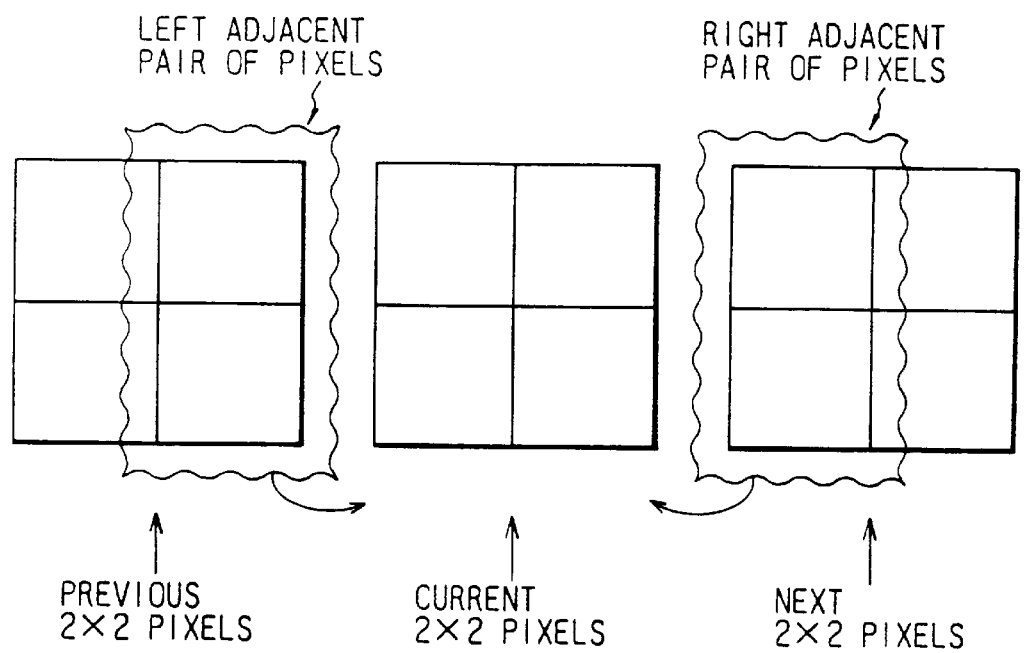
FIG. 42 is a diagram illustrating pixels located adjacent to the examined pattern of the 2×2 pixels on the right and left sides thereof.

FIGS. 43A to 43E are diagrams illustrating details of the temporary label assignment rules which are predetermined corresponding to the patterns indicated in FIGS. 38 and 40 in the most preferable embodiment of the present invention. In FIGS. 43A to 43E, each square indicates a pixel, a blank square indicates a pixel of the value "0", and a dotted square indicates a pixel of the value "1". As indicated in FIGS. 43A to 43E, in the most preferable embodiment of the present invention, the above temporary label assignment rules further instruct the operations for the determination or renewal of the coordinates (X1, Y1) of the upper left corner points and the coordinates (X2, Y2) of the lower right corner points of the circumscribing rectangles, according to the sixth and seventh aspects of the present invention, where such operations may be performed during the scanning in parallel with the temporary label assignment. Details of the operations of the determination or renewal of the coordinates (X1, Y1) of the upper left corner points and the coordinates (X2, Y2) of the lower right corner points of the circumscribing rectangles, are explained later with reference to FIGS. 44A and 44B. In addition, in the most preferable embodiment of the present invention, the above temporary label assignment rules further instruct the operations for the detection of the connection relationships as explained before with reference to FIGS. 17 to 19, which may be performed during the scanning in parallel with the temporary label assignment. Further, pixels located adjacent to the examined pattern of the 2×2 pixels (or 4×2 pixels) on the right and left sides thereof, as indicated in FIG. 42, may be used in the operations instructed by the temporary label assignment rules.

Pattern "a"

When the pattern "a" in FIG. 38 is detected in the stage II or IV of FIG. 36, the temporary label assignment rule determined corresponding to the pattern "a" instructs the following operations (1) and (2).

(1) It is determined whether or not the pixels located adjacent to the above left or right half (4×2 pixels) of the fetched set of pixel values (8×2 pixels) examined in the stage II of FIG. 36, on the left side of the left or right half (4×2 pixels) of the fetched set of pixel values (8×2 pixels), coincide with the two-pixel pattern indicated in the operation (1) in the rule for the pattern "a" in FIG. 43A. When YES is determined, the x-coordinate X2 of the lower right corner point of the circumscribing rectangle containing the "1" pixel in the above two-pixel pattern indicated in the operation (1) in the rule for the pattern "a" in FIG. 43A, is renewed in the circumscribing rectangle coordinate table 26 in FIG. 34, so that the x-coordinate of the "1" pixel is written as the x-coordinate X2 of the lower right corner point of the circumscribing rectangle.

(2) The number "0" is assigned as the temporary label to the four lower pixels in the left or right half (4×2 pixels) of the fetched set of pixel values (8×2 pixels).

Patterns "c" or "a'"

When the pattern "c" in FIG. 38 or pattern "a'" in FIG. 40 is detected in the stage II', III, IV', or V of FIG. 36, the temporary label assignment rule determined corresponding to the pattern "c" or "a'" instructs the following operations (1) and (2).

(1) It is determined whether or not the pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), coincides with the two-pixel pattern indicated in the operation (1) in the rule for the patterns "c" or "a'" in FIG. 43A. When YES is determined, the x-coordinate X2 of the lower right corner point of the circumscribing rectangle containing the "1" pixel in the above two-pixel pattern indicated in the operation (1) in the rule for the patterns "c" or "a'" in FIG. 43A, is renewed in the circumscribing rectangle coordinate table 26 in FIG. 34, so that the x-coordinate of the "1" pixel is written as the x-coordinate X2 of the lower right corner point of the circumscribing rectangle.

(2) The number "0" for the background is assigned as the temporary label to the two lower pixels in the left or right half (2×2 pixels) of the left or right half (4×2 pixels) of the fetched set of pixel values (8×2 pixels).

Patterns "d" or "b'"

When the pattern "d" in FIG. 38 or pattern "b'" in FIG. 40 is detected in the stage II', III, IV', or V of FIG. 36, the temporary label assignment rule determined corresponding to the pattern "d" or "b'" instructs the following operations (1), (2), and (3).

(1) It is determined whether or not the pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), coincide with the two-pixel pattern indicated in the operation (1) in the rule for the patterns "d" or "b'" in FIG. 43A. When YES is determined, the x-coordinate X2 of the lower right corner point of the circumscribing rectangle containing the "1" pixel in the above two-pixel pattern indicated in the operation (1) in the rule for the patterns "d" or "b'" in FIG. 43A, is renewed in the circumscribing rectangle coordinate table 26 in FIG. 34, so that the x-coordinate of the "1" pixel is written as the x-coordinate X2 of the lower right corner point of the circumscribing rectangle.

(2) The number "0" for the background is assigned as the temporary label to the two lower pixels in the left or right half (2×2 pixels) of the left or right half (4×2 pixels) of the fetched set of pixel values (8×2 pixels).

(3) The y-coordinate Y2 of the lower right corner point of the circumscribing rectangle containing the "1" pixel in the pattern "d" or "b'" is renewed in the circumscribing rectangle coordinate table 26 in FIG. 34, so that the y-coordinate of the "1" pixel in the pattern "d" or "b'" pixel is written as the y-coordinate Y2 of the lower right corner point of the circumscribing rectangle.

Patterns "e" or "c'"

When the pattern "e" in FIG. 38 or pattern "c'" in FIG. 40 is detected in the stage II', III, IV', or V of FIG. 36, the temporary label assignment rule determined corresponding to the pattern "e" or "c'" instructs the following operations (1) and (2).

(1) It is determined whether or not the pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), coincides with the two-pixel pattern indicated in the operation (1) in the rule for the patterns "e" or "c'" in FIG. 43A. When YES is determined, the x-coordinate X2 of the lower right corner point of the circumscribing rectangle containing the "1" pixel in the above two-pixel pattern indicated in the operation (1) in the rule for the patterns "e" or "c'" in FIG. 43A, is renewed in the circumscribing rectangle coordinate table 26 in FIG. 34, so that the x-coordinate of the "1" pixel is written as the x-coordinate X2 of the lower right corner point of the circumscribing rectangle.

(2) The number "0" for the background is assigned as the temporary label to the "0" pixel in the left or right half (2×2 pixels) of the left or right half (4×2 pixels) of the fetched set of pixel values (8×2 pixels). In addition, the two-pixel pattern located on the adjacent to the left or right half (2×2 pixels) of the left or right half (4×2 pixels) of the fetched set of pixel values (8×2 pixels) examined in the stage II', III, IV', or V of FIG. 36, on the right side of the left or right half (2×2 pixels) of the left or right half (4×2 pixels) of the fetched set of pixel values (8×2 pixels), is read. Then, it is determined whether the upper pixel in the two-pixel pattern is a "0" pixel or a "1" pixel. When it is determined that the upper pixel in the above two-pixel pattern is a "0" pixel, a new number is assigned as the temporary label to the "1" pixel in the left or right half (2×2 pixels) of the left or right half (4×2 pixels) of the fetched set of pixel values (8×2 pixels). When it is determined that the upper pixel in the above two-pixel pattern is a "1" pixel, the same number which has been assigned to the "1" pixel in the two-pixel pattern, is assigned as the temporary label to the "1" pixel in the left or right half (2×2 pixels) of the left or right half (4×2 pixels) of the fetched set of pixel values (8×2 pixels).

In addition, when the two pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), are "0" pixels, values of 2×2 pixels located adjacent to the left or right half (2×2 pixels) of the left or right half (4×2 pixels) of the fetched set of pixel values (8×2 pixels) examined in the stage II', III, IV', or V of FIG. 36, on the right side of the left or right half (2×2 pixels) of the left or right half (4×2 pixels) of the fetched set of pixel values (8×2 pixels), are examined. Depending on the above values of the 2×2 pixels located on the right side, a new set of x and y coordinates (X1, Y1) of an upper left corner of a new circumscribing rectangle may be determined, and the x and y coordinates of the lower right "1" pixel in the left or right half (2×2 pixels) of the left or right half (4×2 pixels) of the fetched set of pixel values (8×2 pixels), may be written in the circumscribing rectangle coordinate table 26 in the table area 21 of FIG. 34, as the new set of x and y coordinates (X1, Y1) of the upper left corner of the new circumscribing rectangle. Details of this operation are explained later with reference to FIG. 44A.

Patterns "f" or "d'"

When the pattern "f" in FIG. 38 or pattern "d'" in FIG. 40 is detected in the stage II', III, IV', or V of FIG. 36, the temporary label assignment rule determined corresponding to the pattern "f" or "d'" instructs the following operations (1) and (2).

(1) It is determined whether or not the pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), coincide with the two-pixel pattern indicated in the operation (1) in the rule for the patterns "f" or "d'" in FIG. 43B. When YES is determined, the x-coordinate X2 of the lower right corner point of the circumscribing rectangle containing the "1" pixel in the above two-pixel pattern indicated in the operation (1) in the rule for the patterns "f" or "d'" in FIG. 43B, is renewed in the circumscribing rectangle coordinate table 26 in FIG. 34, so that the x-coordinate of the "1" pixel is written as the x-coordinate X2 of the lower right corner point of the circumscribing rectangle.

(2) The number "0" for the background is assigned as the temporary label to the "0" pixel in the left or right half (2×2 pixels) of the left or right half (4×2 pixels) of the fetched set of pixel values (8×2 pixels). In addition, the same number which has been assigned to the upper right "1" pixel in the left or right half (2×2 pixels) of the left or right half (4×2 pixels) of the fetched set of pixel values (8×2 pixels), is assigned as the temporary label to the lower right "1" pixel in the left or right half (2×2 pixels) of the left or right half (4×2 pixels) of the fetched set of pixel values (8×2 pixels).

Patterns "g" or "e'"

When the pattern "g" in FIG. 38 or pattern "e'" in FIG. 40 is detected in the stage II', III, IV', or V of FIG. 36, the temporary label assignment rule determined corresponding to the pattern "g" or "e'" instructs the following operations (1), (2), and (3).

(1) It is determined whether or not the pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), coincides with the two-pixel pattern indicated in the operation (1) in the rule for the patterns "g" or "e'" in FIG. 43B. When YES is determined, connection of the upper left "1" pixel in the left or right half (2×2 pixels) of the left or right half (4×2 pixels) of the fetched set of pixel values (8×2 pixels), to the lower "1" pixel in the left adjacent two-pixel pattern is determined, and the determined connection relationship between temporary labels for the pixels which are determined to be connected, is written in the label connection table 25 in FIG. 34, as explained before with reference to FIGS. 17 to 19.

(2) The number "0" for the background is assigned as the temporary label to the two lower pixels in the left or right half (2×2 pixels) of the left or right half (4×2 pixels) of the fetched set of pixel values (8×2 pixels).

(3) The x-coordinate X2 of the lower right corner point of the circumscribing rectangle containing the "1" pixel in the pattern "g" or "e'" is renewed in the circumscribing rectangle coordinate table 26 in FIG. 34, so that the x-coordinate of the "1" pixel is written as the x-coordinate X2 of the lower right corner point of the circumscribing rectangle.

Patterns "h" or "f'"

When the pattern "h" in FIG. 38 or pattern "f'" in FIG. 40 is detected in the stage II', III, IV', or V of FIG. 36, the temporary label assignment rule determined corresponding to the pattern "h" or "f'" instructs the following operations (1), (2), and (3).

(1) It is determined whether or not the pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), coincides with the two-pixel pattern indicated in the operation (1) in the rule for the patterns "h" or "f'" in FIG. 43B. When YES is determined, connection of the upper left "1" pixel in the left or right half (2×2 pixels) of the left or right half (4×2 pixels) of the fetched set of pixel values (8×2 pixels), to the lower "1" pixel in the left adjacent two-pixel pattern is determined, and the determined connection relationship between temporary labels for the pixels which are determined to be connected, is written in the label connection table 25 in FIG. 34, as explained before with reference to FIGS. 17 to 19.

(2) It is determined whether or not the pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), coincide with the two-pixel pattern indicated in the operation (2) in the rule for the patterns "h" or "f'" in FIG. 43B. When YES is determined, the y-coordinate Y2 of the lower right corner point of the circumscribing rectangle containing the "1" pixels in the pattern "h" or "f'" is renewed in the circumscribing rectangle coordinate table 26 in FIG. 34, so that the y-coordinate of the "1" pixels in the pattern "h" or "f'" pixel is written as the y-coordinate Y2 of the lower right corner point of the circumscribing rectangle.

(3) The number "0" for the background is assigned as the temporary label to the two lower pixels in the left or right half (2×2 pixels) of the left or right half (4×2 pixels) of the fetched set of pixel values (8×2 pixels).

Patterns "i" or "g'"

When the pattern "i" in FIG. 38 or pattern "g'" in FIG. 40 is detected in the stage II', III, IV', or V of FIG. 36, the temporary label assignment rule determined corresponding to the pattern "i" or "g'" instructs the following operations (1), (2), and (3).

(1) It is determined whether or not the pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), coincide with the two-pixel pattern indicated in the operation (1) in the rule for the patterns "i" or "g'" in FIG. 43B. When YES is determined, connection of the upper left "1" pixel in the left or right half (2×2 pixels) of the left or right half (4×2 pixels) of the fetched set of pixel values (8×2 pixels), to the lower "1" pixel in the left adjacent two-pixel pattern is determined, and the determined connection relationship between temporary labels for the pixels which are determined to be connected, is written in the label connection table 25 in FIG. 34, as explained before with reference to FIGS. 17 to 19.

(2) The number "0" for the background is assigned as the temporary label to the "0" pixel in the left or right half (2×2 pixels) of the left or right half (4×2 pixels) of the fetched set of pixel values (8×2 pixels).

(3) The same number which has been assigned to the upper left "1" pixel in the left or right half (2×2 pixels) of the left or right half (4×2 pixels) of the fetched set of pixel values (8×2 pixels), is assigned as the temporary label to the lower right "1" pixel in the left or right half (2×2 pixels) of the left or right half (4×2 pixels) of the fetched set of pixel values (8×2 pixels).

Patterns "j" or "h'"

When the pattern "j" in FIG. 38 or pattern "h'" in FIG. 40 is detected in the stage II', III, IV', or V of FIG. 36, the temporary label assignment rule determined corresponding to the pattern "j" or "h'" instructs the following operations (1) and (2).

(1) It is determined whether or not the pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), coincide with the two-pixel pattern indicated in the operation (1) in the rule for the patterns "j" or "h'" in FIG. 43C. When YES is determined, connection of the upper left "1" pixel in the left or right half (2×2 pixels) of the left or right half (4×2 pixels) of the fetched set of pixel values (8×2 pixels), to the lower "1" pixel in the left adjacent two-pixel pattern is determined, and the determined connection relationship between temporary labels for the pixels which are determined to be connected, is written in the label connection table 25 in FIG. 34, as explained before with reference to FIGS. 17 to 19.

(2) The number "0" for the background is assigned as the temporary label to the "0" pixel in the left or right half (2×2 pixels) of the left or right half (4×2 pixels) of the fetched set of pixel values (8×2 pixels). In addition, the same number which has been assigned to the upper left or upper right "1" pixel in the left or right half (2×2 pixels) of the left or right half (4×2 pixels) of the fetched set of pixel values (8×2 pixels), is assigned as the temporary label to the lower right "1" pixel in the left or right half (2×2 pixels) of the left or right half (4×2 pixels) of the fetched set of pixel values (8×2 pixels).

Patterns "k" or "i'"

When the pattern "k" in FIG. 38 or pattern "i'" in FIG. 40 is detected in the stage II', III, IV', or V of FIG. 36, the temporary label assignment rule determined corresponding to the pattern "k" or "i'" instructs the following operations (1), (2), and (3).

(1) The number "0" for the background is assigned as the temporary label to the "0" pixel in the left or right half (2×2 pixels) of the left or right half (4×2 pixels) of the fetched set of pixel values (8×2 pixels).

(2) It is determined whether or not the pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), coincide with one of the three two-pixel patterns indicated in the operation (2) in the rule for the patterns "k" or "i'" in FIG. 43C. When YES is determined, the x-coordinate X2 of the lower right corner point of the circumscribing rectangle containing the "1" pixel in the pattern "k" or "i'" is renewed in the circumscribing rectangle coordinate table 26 in FIG. 34, so that the x-coordinate of the "1" pixel is written as the x-coordinate X2 of the lower right corner point of the circumscribing rectangle.

(3) It is determined whether or not the pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), coincide with the two-pixel pattern indicated in the operation (3) in the rule for the patterns "k" or "i'" in FIG. 43C. When YES is determined, the same number which has been assigned to the upper "1" pixel in the two-pixel pattern, is assigned as the temporary label to the lower left "1" pixel in the left or right half (2×2 pixels) of the left or right half (4×2 pixels) of the fetched set of pixel values (8×2 pixels).

In addition, when the two pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), are "0" pixels, a new set of x and y coordinates (X1, Y1) of an upper left corner of a new circumscribing rectangle are determined, and stored in the circumscribing rectangle coordinate table 26 in the table area 21 of FIG. 34, where the x and y coordinates of the lower left pixel in the "CURRENT WINDOW" is written as the new set of x and y coordinates (X1, Y1) of the upper left corner of the new circumscribing rectangle. Details of this operation are explained later with reference to FIG. 44A.

Patterns "l" or "j'"

When the pattern "l" in FIG. 38 or pattern "j'" in FIG. 40 is detected in the stage II', III, IV', or V of FIG. 36, the temporary label assignment rule determined corresponding to the pattern "l" or "j'" instructs the following operations (1), (2), and (3).

(1) The number "0" for the background is assigned as the temporary label to the "0" pixel in the left or right half (2×2 pixels) of the left or right half (4×2 pixels) of the fetched set of pixel values (8×2 pixels). In addition, the same number which has been assigned to the upper right "1" pixel in the left or right half (2×2 pixels) of the left or right half (4×2 pixels) of the fetched set of pixel values (8×2 pixels), is assigned as the temporary label to the lower left "1" pixel in the left or right half (2×2 pixels) of the left or right half (4×2 pixels) of the fetched set of pixel values (8×2 pixels).

(2) It is determined whether or not the pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), coincide with one of the two two-pixel patterns indicated in the operation (2) in the rule for the patterns "1" or "j'" in FIG. 43C. When YES is determined, connection of the lower left "1" pixel in the left or right half (2×2 pixels) of the left or right half (4×2 pixels) of the fetched set of pixel values (8×2 pixels), to the "1" pixel(s) in the left adjacent two-pixel pattern is determined, and the determined connection relationship between temporary labels for the pixels which are determined to be connected, is written in the label connection table 25 in FIG. 34, as explained before with reference to FIGS. 17 to 19.

(3) It is determined whether or not the pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), coincide with the two-pixel pattern indicated in the operation (3) in the rule for the patterns "l" or "j'" in FIG. 43C. When YES is determined, connection of the lower left "1" pixel in the left or right half (2×2 pixels) of the left or right half (4×2 pixels) of the fetched set of pixel values (8×2 pixels), to the "1" pixel in the left adjacent two-pixel pattern is determined, and the determined connection relationship between temporary labels for the pixels which are determined to be connected, is written in the label connection table 25 in FIG. 34, as explained before with reference to FIGS. 17 to 19.

Patterns "m" or "k'"

When the pattern "m" in FIG. 38 or pattern "k'" in FIG. 40 is detected in the stage II', III, IV', or V of FIG. 36, the temporary label assignment rule determined corresponding to the pattern "m" or "k'" instructs the following operations (1), (2), (3), and (4).

(1) It is determined whether or not the pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), coincide with one of the two two-pixel patterns indicated in the operation (2) in the rule for the patterns "m" or "k'" in FIG. 43C. When YES is determined, the same number which has been assigned to the lower "1" pixel in the two-pixel pattern is assigned as the temporary label to the lower "1" pixels in the left or right half (2×2 pixels) of the left or right half (4×2 pixels) of the fetched set of pixel values (8×2 pixels).

(2) It is determined whether or not the pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), coincide with the two-pixel pattern indicated in the operation (2) in the rule for the patterns "m" or "k'" in FIG. 43D. When YES is determined, the same number which has been assigned to the upper "1" pixel in the two-pixel pattern is assigned as the temporary label to the lower "1" pixels in the left or right half (2×2 pixels) of the left or right half (4×2 pixels) of the fetched set of pixel values (8×2 pixels).

(3) It is determined whether or not the pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), coincide with one of the two first two-pixel patterns indicated in the operation (3) in the rule for the patterns "m" or "k'" in FIG. 43D. When YES is determined, it is further determined whether or not an upper pixel in a second two-pixel pattern located adjacent to the above left or right half (2×2 pixels) of the left or right half (4×2 pixels) of the fetched set of pixel values (8×2 pixels), on the right side of the left or right half (2×2 pixels) of the left or right half (4×2 pixels) of the fetched set of pixel values (8×2 pixels), is a "0" pixel. When YES is determined, a new number is assigned as the temporary label to the "1" pixels in the left or right half (2×2 pixels) of the left or right half (4×2 pixels) of the fetched set of pixel values (8×2 pixels).

In addition, when the two pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), are "0" pixels, values of 2×2 pixels located adjacent to the left or right half (2×2 pixels) of the left or right half (4×2 pixels) of the fetched set of pixel values (8×2 pixels) examined in the stage II', III, IV', or V of FIG. 36, on the right side of the left or right half (2×2 pixels) of the left or right half (4×2 pixels) of the fetched set of pixel values (8×2 pixels), are examined. Depending on the above values of the 2×2 pixels located on the right side, a new set of x and y coordinates (X1, Y1) of an upper left corner of a new circumscribing rectangle may be determined, and the x and y coordinates of the lower left "1" pixel in the left or right half (2×2 pixels) of the left or right half (4×2 pixels) of the fetched set of pixel values (8×2 pixels), may be written in the circumscribing rectangle coordinate table 26 in the table area 21 of FIG. 34, as the new set of x and y coordinates (X1, Y1) of the upper left corner of the new circumscribing rectangle. Details of this operation are explained later with reference to FIG. 44A.

(4) When it is determined that the pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), coincide with one of the two first two-pixel patterns indicated in the operation (2) in the rule for the patterns "m" or "k'" in FIG. 43D, and that an upper pixel in a second two-pixel pattern located adjacent to the above left or right half (2×2 pixels) of the left or right half (4×2 pixels) of the fetched set of pixel values (8×2 pixels), on the right side of the left or right half (2×2 pixels) of the left or right half (4×2 pixels) of the fetched set of pixel values (8×2 pixels), is a "1" pixel, the same number which has been assigned to the upper ("1") pixel in the second two-pixel pattern, is assigned as the temporary label to the "1" pixels in the left or right half (2×2 pixels) of the left or right half (4×2 pixels) of the fetched set of pixel values (8×2 pixels).

Patterns "n" or "l'"

When the pattern "m" in FIG. 38 or pattern "k'" in FIG. 40 is detected in the stage II', III, IV', or V of FIG. 36, the temporary label assignment rule determined corresponding to the pattern "n" or "l'" instructs the following operations (1), (2), (3), and (4).

(1) The same number which has been assigned to the upper right "1" pixel in the left or right half (2×2 pixels) of the left or right half (4×2 pixels) of the fetched set of pixel values (8×2 pixels) examined in the stage II', III, IV', or V of FIG. 36, is assigned as the temporary label to the lower "1" pixels in the left or right half (2×2 pixels) of the left or right half (4×2 pixels) of the fetched set of pixel values (8×2 pixels).

(2) It is determined whether or not the pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), coincide with one of the two two-pixel patterns indicated in the operation (2) in the rule for the patterns "n" or "l'" in FIG. 43D. When YES is determined, connection of the lower left "1" pixel in the left or right half (2×2 pixels) of the left or right half (4×2 pixels) of the fetched set of pixel values (8×2 pixels), to the "1" pixel(s) in the left adjacent two-pixel pattern is determined, and the determined connection relationship between temporary labels for the pixels which are determined to be connected, is written in the label connection table 25 in FIG. 34, as explained before with reference to FIGS. 17 to 19.

(3) It is determined whether or not the pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), coincide with the two-pixel patterns indicated in the operation (3) in the rule for the patterns "n" or "l'" in FIG. 43D. When YES is determined, connection of the lower left "1" pixel in the left or right half (2×2 pixels) of the left or right half (4×2 pixels) of the fetched set of pixel values (8×2 pixels), to the "1" pixel in the left adjacent two-pixel pattern is determined, and the determined connection relationship between temporary labels for the pixels which are determined to be connected, is written in the label connection table 25 in FIG. 34, as explained before with reference to FIGS. 17 to 19.

(4) It is determined whether or not the pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), coincide with one of the two first two-pixel patterns indicated in the operation (4) in the rule for the patterns "n" or "l'" in FIG. 43D. When YES is determined, the x-coordinate X1 of the upper left corner point of the circumscribing rectangle containing the "1" pixel in the pattern "k" or "i'" is renewed in the circumscribing rectangle coordinate table 26 in FIG. 34, so that the x-coordinate of the lower left "1" pixel is written as the x-coordinate X1 of the upper left corner point of the circumscribing rectangle.

Patterns "o" or "m'"

When the pattern "o" in FIG. 38 or pattern "m'" in FIG. 40 is detected in the stage II', III, IV', or V of FIG. 36, the temporary label assignment rule determined corresponding to the pattern "o" or "m'" instructs the following operations (1) and (2).

(1) The same number which has been assigned to the upper left "1" pixel in the left or right half (2×2 pixels) of the left or right half (4×2 pixels) of the fetched set of pixel values (8×2 pixels), is assigned as the temporary label to the lower left "1" pixel in the left or right half (2×2 pixels) of the left or right half (4×2 pixels) of the fetched set of pixel values (8×2 pixels). In addition, the number "0" for the background is assigned as the temporary label to the "0" pixel in the left or right half (2×2 pixels) of the left or right half (4×2 pixels) of the fetched set of pixel values (8×2 pixels).

(2) It is determined whether or not the pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), coincide with the two-pixel pattern indicated in the operation (2) in the rule for the patterns "o" or "m'" in FIG. 43E. When YES is determined, connection of the upper left "1" pixel in the left or right half (2×2 pixels) of the left or right half (4×2 pixels) of the fetched set of pixel values (8×2 pixels), to the lower "1" pixel in the left adjacent two-pixel pattern is determined, and the determined connection relationship between temporary labels for the pixels which are determined to be connected, is written in the label connection table 25 in FIG. 34, as explained before with reference to FIGS. 17 to 19.

Patterns "p" or "n'"

When the pattern "p" in FIG. 38 or pattern "n'" in FIG. 40 is detected in the stage II', III, IV', or V of FIG. 36, the temporary label assignment rule determined corresponding to the pattern "p" or "n'" instructs the following operations (1) and (2).

(1) The same number which has been assigned to the upper left "1" pixel in the left or right half (2×2 pixels) of the left or right half (4×2 pixels) of the fetched set of pixel values (8×2 pixels), is assigned as the temporary label to the lower left "1" pixel in the left or right half (2×2 pixels) of the left or right half (4×2 pixels) of the fetched set of pixel values (8×2 pixels). In addition, the number "0" for the background is assigned as the temporary label to the "0" pixel in the left or right half (2×2 pixels) of the left or right half (4×2 pixels) of the fetched set of pixel values (8×2 pixels).

(2) It is determined whether or not the pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), coincide with the two-pixel pattern indicated in the operation (2) in the rule for the patterns "p" or "n'" in FIG. 43E. When YES is determined, connection of the upper left "1" pixel in the left or right half (2×2 pixels) of the left or right half (4×2 pixels) of the fetched set of pixel values (8×2 pixels), to the lower "1" pixel in the left adjacent two-pixel pattern is determined, and the determined connection relationship between temporary labels for the pixels which are determined to be connected, is written in the label connection table 25 in FIG. 34, as explained before with reference to FIGS. 17 to 19.

Patterns "q" or "o'"

When the pattern "q" in FIG. 38 or pattern "o'" in FIG. 40 is detected in the stage II', III, IV', or V of FIG. 36, the temporary label assignment rule determined corresponding to the pattern "q" or "o'" instructs the following operations (1) and (2).

(1) The same number which has been assigned to the upper left "1" pixel in the left or right half (2×2 pixels) of the left or right half (4×2 pixels) of the fetched set of pixel values (8×2 pixels), is assigned as the temporary label to the lower "1" pixels in the left or right half (2×2 pixels) of the left or right half (4×2 pixels) of the fetched set of pixel values (8×2 pixels).

(2) It is determined whether or not the pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), coincide with the two-pixel pattern indicated in the operation (2) in the rule for the patterns "q" or "o'" in FIG. 43E. When YES is determined, connection of the upper left "1" pixel in the left or right half (2×2 pixels) of the left or right half (4×2 pixels) of the fetched set of pixel values (8×2 pixels), to the lower "1" pixel in the left adjacent two-pixel pattern is determined, and the determined connection relationship between temporary labels for the pixels which are determined to be connected, is written in the label connection table 25 in FIG. 34, as explained before with reference to FIGS. 17 to 19.

Patterns "r" or "p'"

When the pattern "r" in FIG. 38 or pattern "p'" in FIG. 40 is detected in the stage II', III, IV', or V of FIG. 36, the temporary label assignment rule determined corresponding to the pattern "r" or "p'" instructs the following operations (1) and (2).

(1) The same number which has been assigned to the upper left "1" pixel in the left or right half (2×2 pixels) of the left or right half (4×2 pixels) of the fetched set of pixel values (8×2 pixels), is assigned as the temporary label to the lower "1" pixels in the left or right half (2×2 pixels) of the left or right half (4×2 pixels) of the fetched set of pixel values (8×2 pixels).

(2) It is determined whether or not the pixels located adjacent to the left or right half (2×2 pixels) of the left or right half (4×2 pixels) of the fetched set of pixel values (8×2 pixels) examined in the stage II', III, IV', or V of FIG. 36, on the left side of the left or right half (2×2 pixels) of the left or right half (4×2 pixels) of the fetched set of pixel values (8×2 pixels), coincide with the two-pixel pattern indicated in the operation (2) in the rule for the patterns "r" or "p'" in FIG. 43E. When YES is determined, connection of the upper left "1" pixel in the left or right half (2×2 pixels) of the left or right half (4×2 pixels) of the fetched set of pixel values (8×2 pixels), to the lower "1" pixel in the left adjacent two-pixel pattern is determined, and the determined connection relationship between temporary labels for the pixels which are determined to be connected, is written in the label connection table 25 in FIG. 34, as explained before with reference to FIGS. 17 to 19.

Figure 44A:
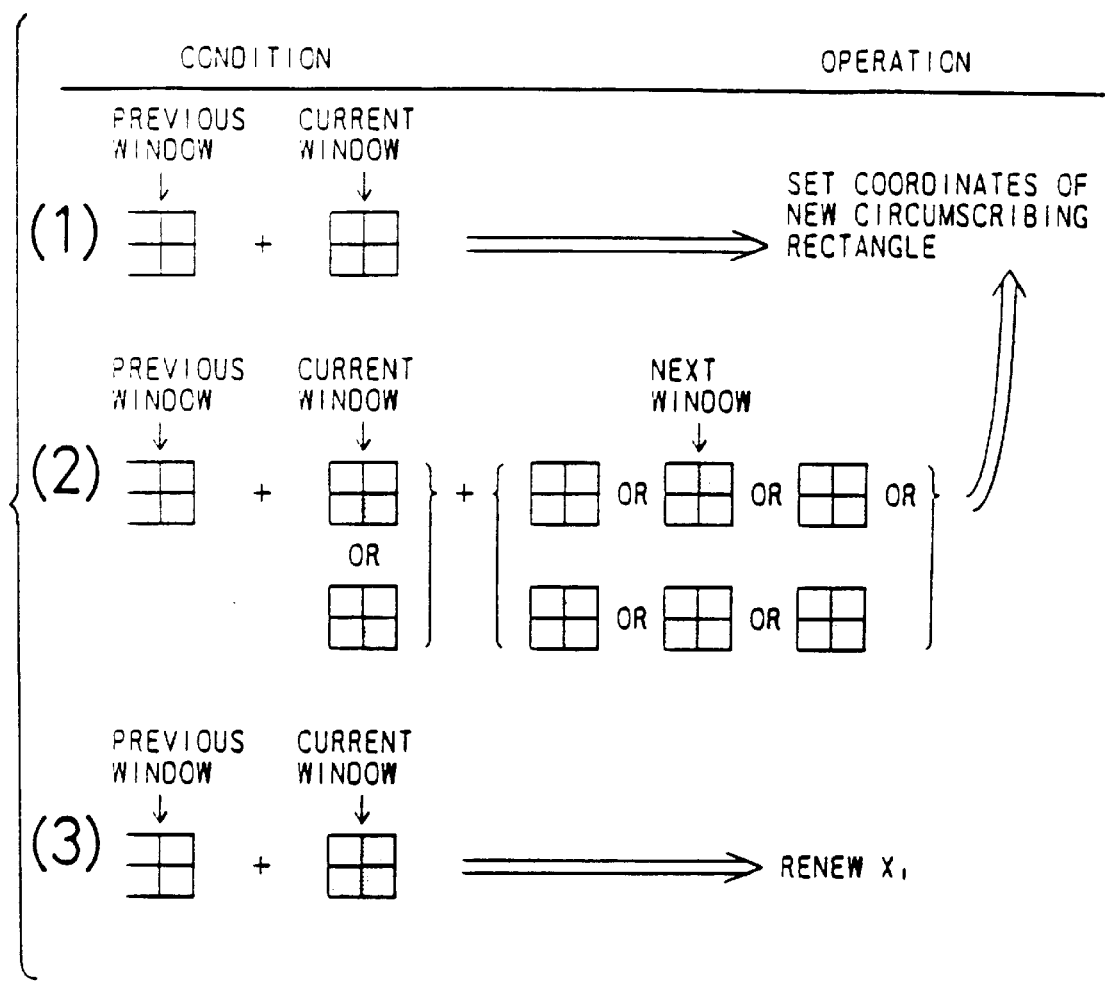
FIGS. 44A and 44B are diagrams illustrating operations for determining and renewing the coordinates of the circumscribing rectangles in the most preferable embodiment of the present invention.
Figure 44B:
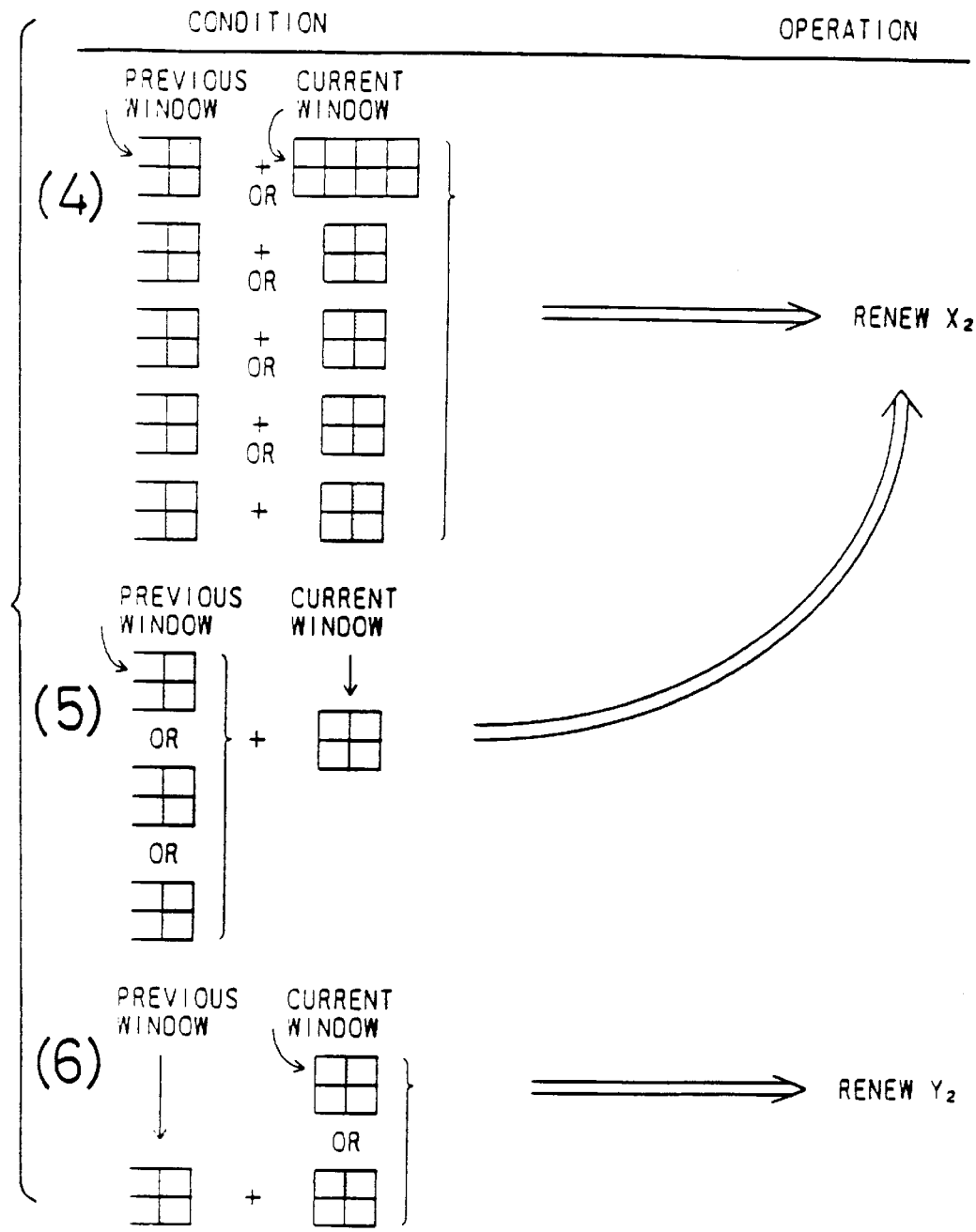

Determination and Renewal of Circumscribing Rectangles (FIGS. 44A and 44B)

The operations for determining and renewing the coordinates of the circumscribing rectangles in the most preferable embodiment of the present invention, are summarized in FIGS. 44A and 44B. In FIGS. 44A and 44B, each square indicates a pixel, a blank square indicates a pixel of the value "0", and a dotted square indicates a pixel of the value "1". "CURRENT WINDOW" means a window which has been currently scanned and examined, i.e., the left or right half (2×2 pixels) of the left or right half (4×2 pixels) of the fetched set of pixel values (8×2 pixels) examined in the stage II', III, IV', or V of FIG. 36, or the left or right half (4×2 pixels) of the fetched set of pixel values (8×2 pixels) examined in the stage II or IV of FIG. 36. "PREVIOUS WINDOW" means the window which has been scanned and examined immediately before the above "CURRENT WINDOW". Actually, in the "PREVIOUS WINDOW", the above two-pixel pattern located adjacent to the left or right half (2×2 pixels) of the left or right half (4×2 pixels) of the fetched set of pixel values (8×2 pixels) examined in the stage II', III, IV', or V of FIG. 36, or preceding to the left or right half (4×2 pixels) of the fetched set of pixel values (8×2 pixels) examined in the stage II or IV of FIG. 36, are concerned in the operations for determining and renewing the coordinates of the circumscribing rectangles. "NEXT WINDOW" means the window which will be scanned and examined following the above "CURRENT WINDOW".

(1) When the case as indicated in (1) of FIG. 44A (as explained for the patterns "k" and "i'" with reference to FIG. 43C) is detected during the scanning for assigning the temporary labels to the pixels in the lower row in the "CURRENT WINDOW", a new set of x and y coordinates (X1, Y1) of an upper left corner of a new circumscribing rectangle are determined, and stored in the circumscribing rectangle coordinate table 26 in the table area 21 of FIG. 34, where the x and y coordinates of the lower left pixel in the "CURRENT WINDOW" is written as the new set of x and y coordinates (X1, Y1) of the upper left corner the new circumscribing rectangle.

(2) When one of the cases as indicated in (2) of FIG. 44A (as explained for the patterns "e'" and "c'" with reference to FIG. 43A, and for the patterns "m" and "k'" with reference to FIG. 43D) is detected during the scanning for assigning the temporary labels to the pixels in the lower row in the "CURRENT WINDOW", values of 2×2 pixels located adjacent to the left or right half (2×2 pixels) of the left or right half (4×2 pixels) of the fetched set of pixel values (8×2 pixels) examined in the stage II', III, IV', or V of FIG. 36, on the right side of the left or right half (2×2 pixels) of the left or right half (4×2 pixels) of the fetched set of pixel values (8×2 pixels), are examined. Namely, the above "NEXT WINDOW" is examined as indicated in FIG. 44A. When the above values of 2×2 pixels in the "NEXT WINDOW" coincide with one of the six patterns indicated in (2) of FIG. 44A, a new set of x and y coordinates (X1, Y1) of an upper left corner of a new circumscribing rectangle are determined, and stored in the circumscribing rectangle coordinate table 26 in the table area 21 of FIG. 34, where the x and y coordinates of the "1" pixel located at the left end in the "CURRENT WINDOW" is written as the new set of x and y coordinates (X1, Y1) of an upper left corner of a new circumscribing rectangle, as explained before for the patterns "e'" and "c'" with reference to FIG. 43A, and for the patterns "m" and "k'" with reference to FIG. 43D.

(3) When the case as indicated in (3) of FIG. 44A (as explained for the patterns "n" and "l'" with reference to FIG. 43D) is detected during the scanning for assigning the temporary labels to the pixels in the lower row in the "CURRENT WINDOW", the x-coordinate X1 of the upper left corner of the circumscribing rectangle containing the lower left pixel in the "CURRENT WINDOW", is renewed by the x-coordinate of the lower left pixel in the "CURRENT WINDOW".

(4) When one of the cases as indicated in (4) of FIG. 44B (as explained for the pattern "a", for the patterns "c" and "a'", for the patterns "d" and "b'", and for the patterns "e" and "c'" with reference to FIG. 43A, and for the patterns "f" and "d'" with reference to FIG. 43B) is detected during the scanning for assigning the temporary labels to the pixels in the lower row in the "CURRENT WINDOW", the x-coordinate X2 of the lower right corner of the circumscribing rectangle containing the lower pixel in the "PREVIOUS WINDOW" (for the case of the pattern "a" and the patterns "c" and "a'" in FIG. 44A) or the lower left pixel in the "CURRENT WINDOW" (for the case of the patterns "d" and "b'" and the patterns "e" and "c'" in FIG. 43A, and the patterns "f" and "d'" in FIG. 43B), is renewed by the x-coordinate of the lower pixel in the "PREVIOUS WINDOW" (for the case of the pattern "a" and the patterns "c" and "a'" in FIG. 44A) or the lower left pixel in the "CURRENT WINDOW" (for the case of the patterns "d" and "b'" and the patterns "e" and "c'" in FIG. 43A, and the patterns "f" and "d'" in FIG. 43B).

(5) When the case as indicated in (5) of FIG. 44B (as explained in (2) in the rule for the patterns "k" and "i'" with reference to FIG. 43C) is detected during the scanning for assigning the temporary labels to the pixels in the lower row in the "CURRENT WINDOW", the x-coordinate X2 of the lower right corner of the circumscribing rectangle containing the lower left pixel in the "CURRENT WINDOW", is renewed by the x-coordinate of the lower left pixel in the "CURRENT WINDOW".

(6) When one of the cases as indicated in (6) of FIG. 44B (as explained in (3) in the rule for the patterns "d" and "b'" in FIG. 43A, and in (2) in the rule for the patterns "h" and "f" in FIG. 43B) is detected during the scanning for assigning the temporary labels to the pixels in the lower row in the "CURRENT WINDOW", the y-coordinate Y2 of the lower right corner of the circumscribing rectangle containing the upper right pixel in the "CURRENT WINDOW", is renewed by the y-coordinate of the upper right pixel in the "CURRENT WINDOW".

Figure 45A:
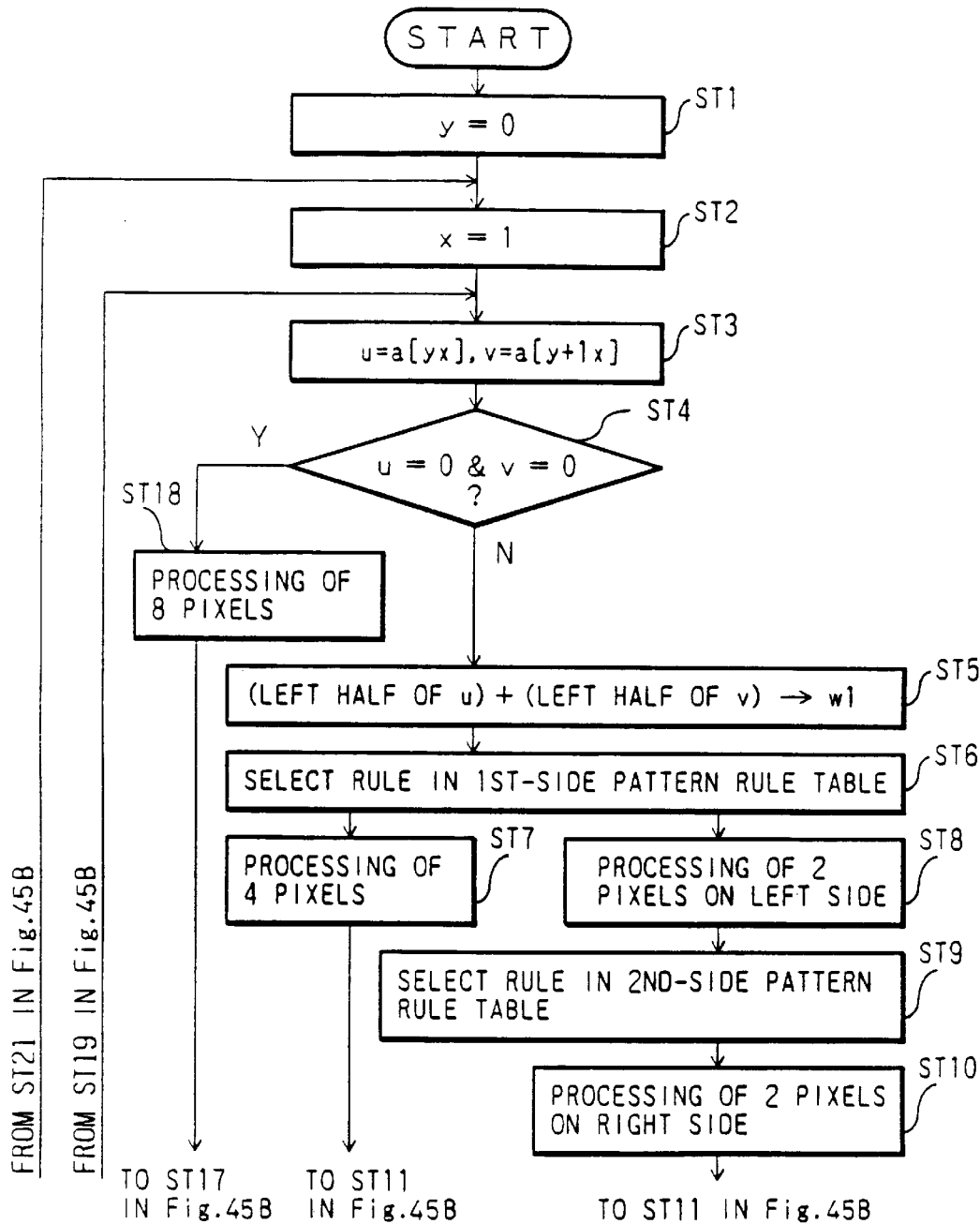
FIGS. 45A and 45B illustrate a flowchart of an example operation of the temporary label assignment program 29 which performs the temporary label assignment by scanning the original image.
Figure 45B:
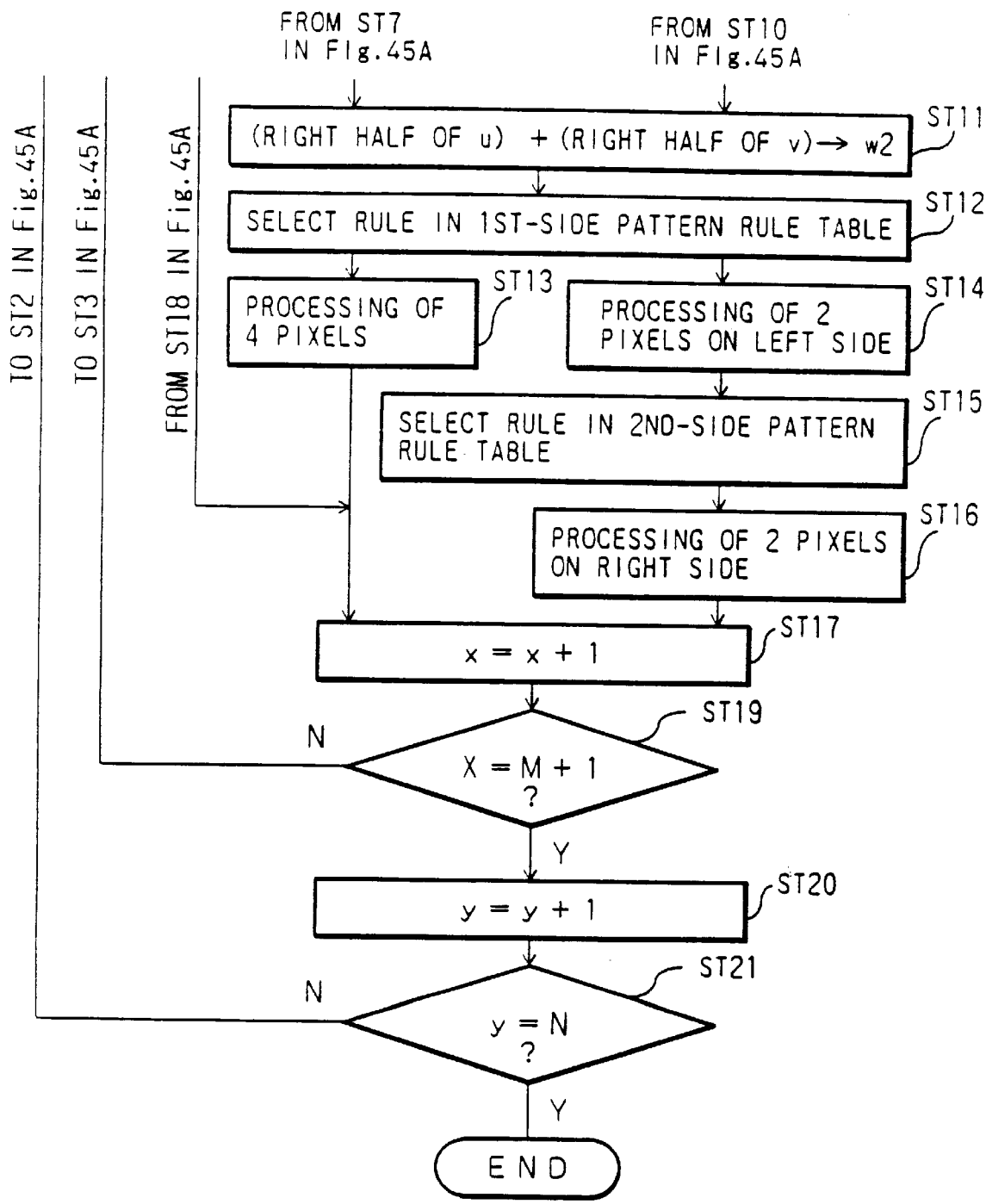

Flow of Temporary Label Assignment by Scanning Image (FIGS. 45A and 45B)

FIGS. 45A and 45B illustrate a flowchart of an example operation of the temporary label assignment program 29 loaded in the program load area 22 as indicated in FIG. 34. The assignment of temporary labels by scanning the original image is carried out in accordance with the temporary label assignment program.

In step 1 (ST1) of FIG. 45A, the index y, which indicates the location of the fetched byte in the vertical direction, is set to the initial value, zero. In step 2, the other index x, which indicates the location of the fetched byte in the horizontal direction, is set to the initial value, one. The indices x and y are used for indicating each byte of image data of FIG. 35, as "a[y x]", where $0 \leq y \leq N$, and $1 \leq x \leq M$. Although there is no data on the row corresponding to y=0, data of all zero is assumed to be exist on the row of y=0 for assigning temporary labels to the pixels on the row of y=1 by using the window of 8×2 pixels. In step 3, the bytes indicated by a[y x] and a[y+1 x] are fetched as the bytes u and v (as explained with reference to FIGS. 37A and 37B), respectively. In step 4, it is determined whether or not u=0 and v=0, i.e., whether or not all pixels in the two bytes u and v has the value "0". When YES is determined, the operation goes to step 18. In step 18, the number "0" is assigned as the temporary label for the background to all of the pixels in the bytes u and v, as explained for stage I of FIG. 36, and then the operation goes to step 17 in FIG. 45B. When it is determined in step 4 that at least one pixel in the two bytes u and v has the value "1", the operation goes to step 5. In step 5, the byte w1 is formed from the left halves of the bytes u and v, as explained with reference to FIG. 37A. In step 6, one of the plurality of predetermined temporary label assignment rules is selected based on the digital value of the byte w1 by using the first-side pattern rule table 27. When the content of the byte w1 coincides with the pattern "a" (or the pattern "b") indicated in FIG. 38, the operation goes to step 7. In step 7, the operations as indicated for the pattern "a" in FIG. 43A are performed, and then the operation goes to step 11 in FIG. 45B. When the content of the byte w1 does not coincide with the pattern "a" (or the pattern "b") indicated in FIG. 38, the operation goes to step 8. In step 8, the operations as indicated for the patterns "c" to "r" in FIGS. 43A to 43E are performed, based on the pixel values in the left side (2×2 pixels) of the 4×2 pixels formed by the left halves of the bytes u and v. Then, in steps 9, one of the plurality of predetermined temporary label assignment rules is selected based on the digital value of the byte w1 by using the second-side pattern rule table 28. In step 10, the operations as indicated for the patterns "a'" to "p'" in FIGS. 43A to 43E are performed based on the pixel values in the right side (2×2 pixels) of the 4×2 pixels formed by the left halves of the bytes u and v. In step 11, the byte w2 is formed from the right halves of the bytes u and v, as explained with reference to FIG. 37B. In step 12, one of the plurality of predetermined temporary label assignment rules is selected based on the digital value of the byte w2 by using the first-side pattern rule table 27. When the content of the byte w2 coincides with the pattern "a" (or the pattern "b") indicated in FIG. 38, the operation goes to step 13. In step 13, the operations as indicated for the pattern "a" in FIG. 43A are performed, and then the operation goes to step 17. When the content of the byte w2 does not coincide with the pattern "a" (or the pattern "b") indicated in FIG. 38, the operation goes to step 14. In step 14, the operations as indicated for the patterns "c" to "r" in FIGS. 43A to 43E are performed, based on the pixel values in the left side (2×2 pixels) of the 4×2 pixels formed by the right halves of the bytes u and v. Then, in steps 15, one of the plurality of predetermined temporary label assignment rules is selected based on the digital value of the byte w2 by using the second-side pattern rule table 28. In step 16, the operations as indicated for the patterns "a'" to "p'" in FIGS. 43A to 43E are performed based on the pixel values in the right side (2×2 pixels) of the 4×2 pixels formed by the right halves of the bytes u and v. In step 17, the index x is incremented by one, and then in step 19, it is determined whether or not the incremented index x reaches M+1. When it is determined that x does not reach M+1, the operation goes back to step 3 in FIG. 45A, and the next pair of bytes are fetched as the bytes u and v in step 3. When it is determined that x reaches M+1, the operation goes to step 20. In step 20, it is determined whether or not the index y is incremented by one, and then in step 21, it is determined whether or not the incremented index y reaches N+1. When it is determined that y does not reach N+1, the operation goes back to step 2 in FIG. 45A, and the scanning on the next rows is commenced in step 2. When it is determined that y reaches N+1, the operation is completed.

Figure 46:
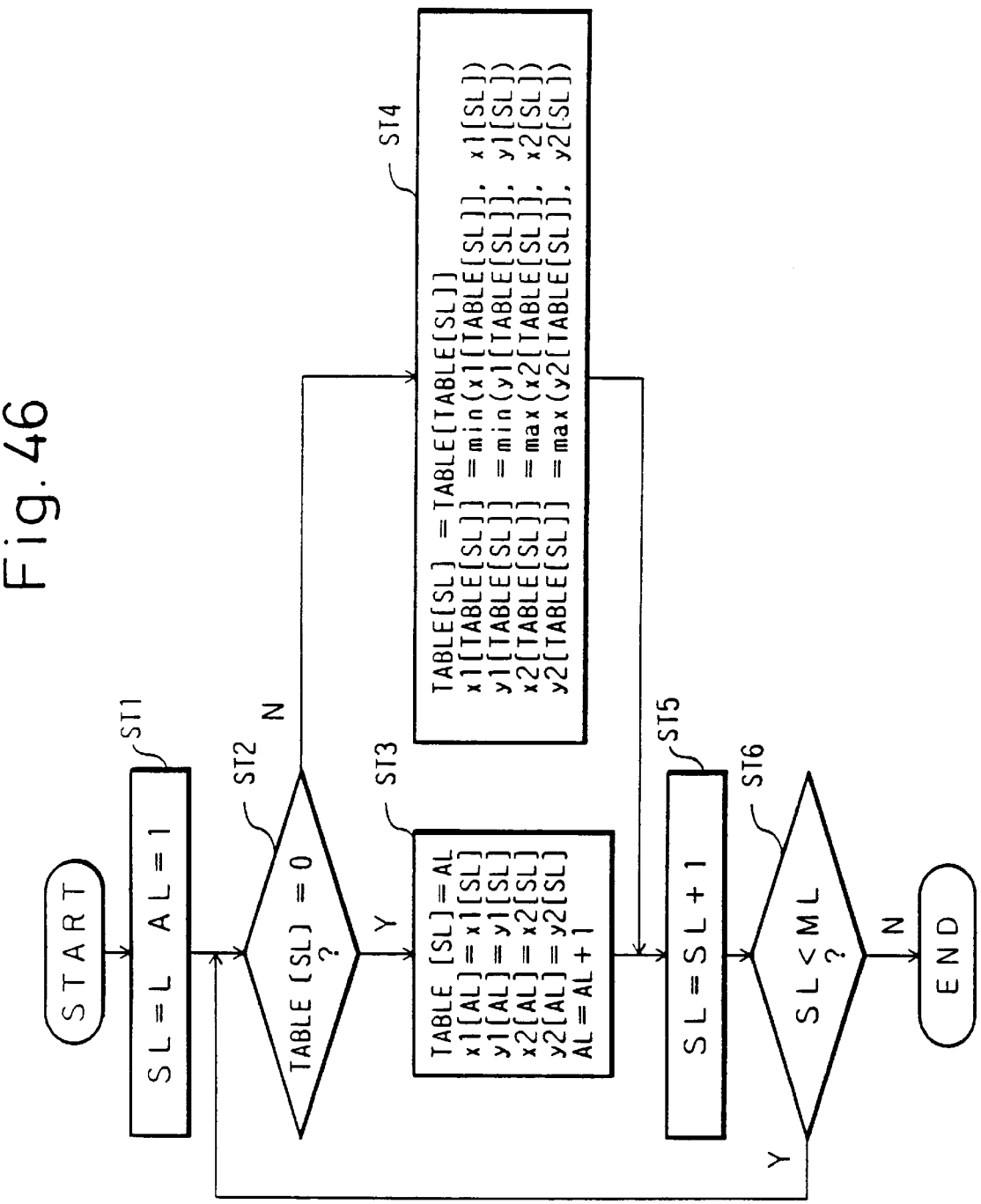
FIG. 46 illustrates a flowchart of an example operation of the table renewal program 30 which performs the conversion of the label connection table 25 into the label conversion table 25 and corresponding renewal of the circumscribing rectangle coordinate table 26.

Flow of Renewal of Circumscribing Rectangles by Scanning Image (FIG. 46)

FIG. 46 illustrates a flowchart of an example operation of the table renewal program 30 loaded in the program load area 22 as indicated in FIG. 34. The conversion of the label connection table 25 into the label conversion table and corresponding renewal of the circumscribing rectangle coordinate table 26 are carried out in accordance with the table renewal program 30.

In step 1 (ST1) of FIG. 46, the index SL, which indicates a temporary label, is set to the initial value L of the temporary label, and the other index AL, which indicates a true label, is set to the initial value, zero of the true label. In step 2, it is determined whether or not the content TABLE [SL] of the entry corresponding to the above index SL in the label connection table 25 is equal to zero. When it is determined in step 2 that the content TABLE[SL] of the entry corresponding to the above index SL in the label connection table 25 is equal to zero, the operation goes to step 3.

In step 3, the true label AL is written as the content TABLE[SL] of the entry corresponding to the above index SL in the label connection table 25, and the coordinates x1[SL], y1[SL], x2[SL], and y2[SL] of the circumscribing, rectangle containing the pixels to which the temporary label SL has been assigned, are written as the coordinates x1[AL], y1[AL], x2[AL], and y2[AL] of a circumscribing rectangle containing the pixels to which the true label AL is assigned, in the circumscribing rectangle coordinate table 26. In addition, the index AL is incremented by one in step 3. Then, the operation goes to step 5.

When, in step 2, it is determined that the content TABLE [SL] of the entry corresponding to the above index SL in the label connection table 25 is not equal to zero, the operation goes to step 4. In this case, the content TABLE[SL] of the entry corresponding to the above index SL in the label connection table 25 indicates another temporary label where the connected area to which the temporary label SL is assigned is connected to another connected area to which the above other temporary label is assigned. In step 4, the content TABLE[TABLE[SL]] of the entry corresponding to the above other temporary label TABLE[SL] is written (copied as explained with reference to FIG. 23) in the entry corresponding to the above index SL in the label connection table 25, and the coordinates x1[SL], y1[SL], x2[SL], and y2[SL] of the circumscribing rectangle containing the pixels to which the temporary label SL has been assigned, are renewed as indicated in step 4 of FIG. 46. Namely, in the circumscribing rectangle coordinate table 26: a smaller one of the x-coordinate x1[SL] of the circumscribing rectangle containing the pixels to which the above temporary label SL has been assigned, and the x-coordinate x1[TABLE[SL]] of the circumscribing rectangle containing the pixels to which the above other temporary label TABLE[SL] has been assigned, is written as the x-coordinate x1[TABLE[SL]]; a smaller one of the y-coordinate y1[SL] of the circumscribing rectangle containing the pixels to which the above temporary label SL has been assigned, and the y-coordinate y1[TABLE[SL]] of the circumscribing rectangle containing the pixels to which the above other temporary label TABLE [SL] has been assigned, is written as the y-coordinate y1[TABLE[SL]]; a greater one of the x-coordinate x2[SL] of the circumscribing rectangle containing the pixels to which the above temporary label SL has been assigned, and the x-coordinate x2[TABLE[SL]] of the circumscribing rectangle containing the pixels to which the above other temporary label TABLE[SL] has been assigned, is written as the x-coordinate x2[TABLE[SL]]; and a greater one of the y-coordinate y2[SL] of the circumscribing rectangle containing the pixels to which the above temporary label SL has been assigned, and the y-coordinate y2[TABLE[SL]] of the circumscribing rectangle containing the pixels to which the above other temporary label TABLE[SL] has been assigned, is written as the y-coordinate y2[TABLE[SL]]. Note that the x and y coordinates system as indicated in FIG. 14 is used. Then, the operation goes to step 5.

In step 5, the index SL is incremented by one, and then, in step 6, it is determined whether or not the above incremented index SL is smaller than the maximum number ML assigned as the temporary label by the operation of the temporary label assignment. When it is determined that the above incremented index SL is smaller than the maximum number ML, the operation goes back to step 2, and the above operations in steps 2 to 6 are performed for the next temporary label SL. When, in step 6, it is determined that the above incremented index SL reaches the maximum number ML, the operation is completed.

Figure 47:
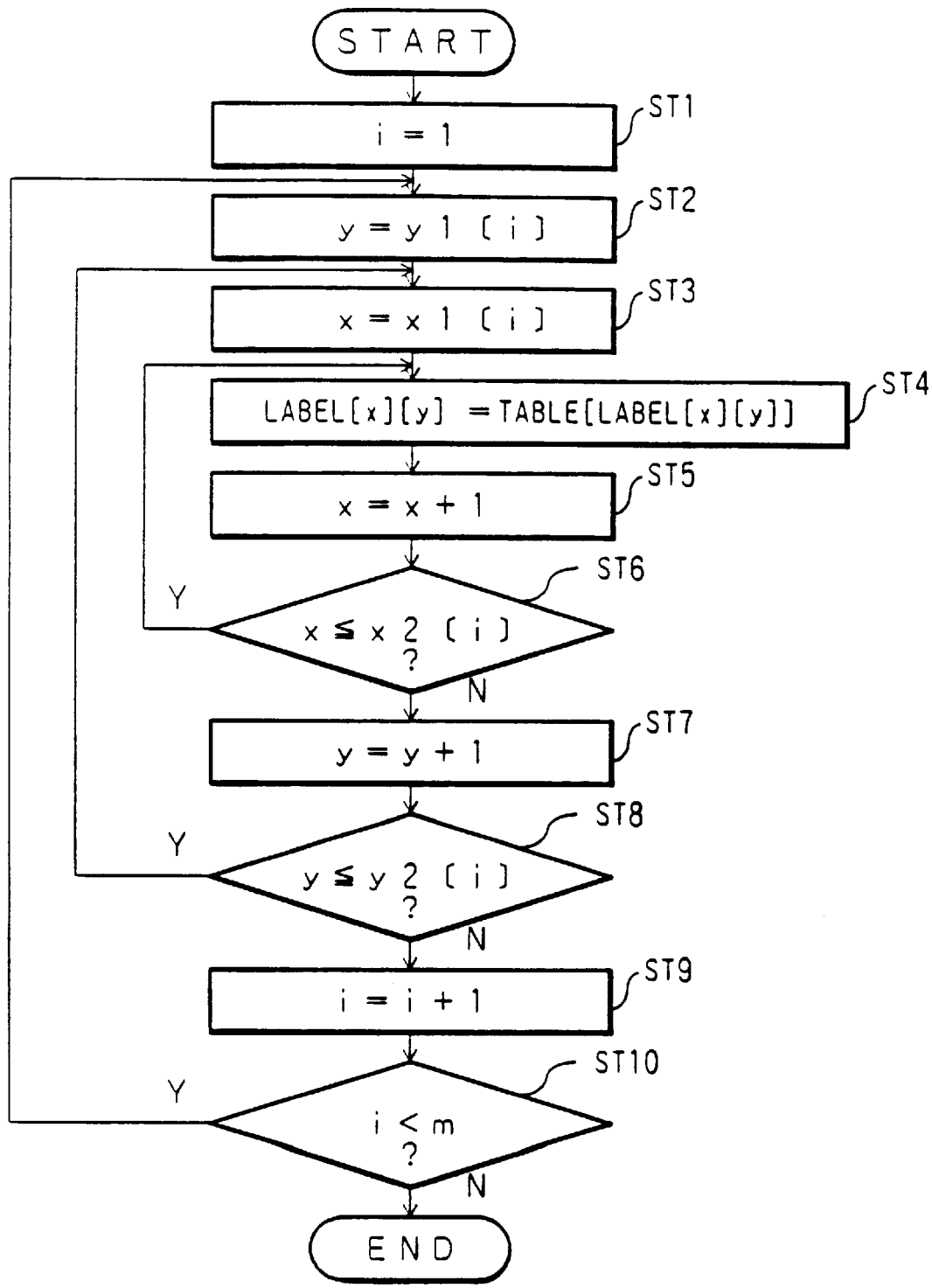
FIG. 47 illustrates a flowchart of an example operation of the label renewal program 31 which performs the conversion of the temporary labels into the corresponding true labels.

Flow of Conversion of Temporary Labels to True Labels (FIG. 47)

FIG. 47 illustrates a flowchart of an example operation of the label renewal program 31 loaded in the program load area 22 as indicated in FIG. 34. The conversion of the temporary labels into the corresponding true labels is performed in accordance with the label renewal program 31. In the operations of FIG. 47, it is assumed that the label connection table as indicated in FIG. 28 is used.

In FIG. 47, the index i indicates a circumscribing rectangle containing pixels to which a true label is assigned. In step 1, the index i is set to the initial value, one. In step 2, the y-coordinate y of the pixel subject to the conversion, is set to the y-coordinate y1 of the upper left corner of the circumscribing rectangle corresponding to the true label "1", and in step 3, the x-coordinate x of the pixel subject to the conversion, is set to the x-coordinate x1 of the upper left corner of the circumscribing rectangle corresponding to the true label "1". Then, in step 4, the currently-assigned label (temporary label), which is denoted by "LABEL[x][y]" in step 4, of the pixel at the above coordinates x and y, is read from the labelled-pixel information storage area 24 in the data storage area 20 indicated in FIG. 34. By referring to the label conversion table which has been generated by conversion from the label connection table 25, the content TABLE [LABEL[x][y]] of the entry corresponding to the currently-assigned temporary label LABEL[x][y], which indicates the corresponding true label, is read, and the currently-assigned label LABEL[x][y] in the labelled-pixel information storage area 24, is replaced with the content TABLE[LABEL[x][y]] (true label). Next, in step 5, the x-coordinate x is incremented by one, and then, in step 6, it is determined whether or not the x-coordinate x is not greater than the x-coordinate x2[i], which indicates the right end of the circumscribing rectangle corresponding to the true label i. When it is determined in step 6 that the x-coordinate x is not greater than the x-coordinate x2[i], the operation goes to step 4 to perform the conversion on the next pixel on the same row. When it is determined in step 6 that the x-coordinate x is greater than the x-coordinate x2[i], the operation goes to step 7. In step 7, the y-coordinate is incremented by one, and then, in step 8, it is determined whether or not the y-coordinate y is not greater than the y-coordinate y2[i], which indicates the bottom end of the circumscribing rectangle corresponding to the true label i. When it is determined in step 8 that the y-coordinate y is not greater than the y-coordinate y2[i], the operation goes to step 3 to perform the conversion on the pixels on the next row in the circumscribing rectangle. When it is determined in step 8 that the y-coordinate y is greater than the y-coordinate y2[i], the operation goes to step 9. In step 9, the index i is incremented by one, and then, in step 10, it is determined whether or not the index i is less than the maximum number m assigned as the true label in the label conversion table. When it is determined in step 10 that the index i is less than the maximum number m, the operation goes to step 2 to perform the conversion on the pixels in the next circumscribing rectangle corresponding to the next true label. When it is determined in step 10 that the index i is not less than the maximum number m, the operation is completed.

Hardware Constructions (FIGS. 48 to 50)

FIGS. 48 to 50 are diagrams illustrating example hardware constructions for performing the operations of the present invention.

In the construction of FIG. 48, the digital signal processor 40 executes the above-explained programs, and the digital signal processor 40 has a data port and a program port. The data port is connected to the data bus 42, and the data bus 42 is connected to the working memory 60 and the image memory 70. The program port is connected to the program bus 41, and the program bus 41 is connected to the program memory 50. Unlike the configuration of FIG. 34, the program memory 50 contains the temporary label assignment program 51, the table renewal program 52, the label renewal program 53, the first-side pattern rule table, and the second-side pattern rule table. The working memory 60 contains the label connection table 61 and the circumscribing rectangle coordinate table 62. The image memory 70 contains the original image 71 and the label-assigned image 72.

In the construction of FIG. 49, the general purpose processor 44 executes the above-explained programs, and the general purpose processor 44 has one port. The port is connected to the data bus 42, and the data bus 42 is connected to the program memory 50, the working memory 60, and the image memory 70. The contents of the respective memories 50, 60, and 70 are the same as the construction of FIG. 48. In addition, the image memory 70 in FIG. 49 has a second port other than the port which is connected to the data bus 42. The second port is connected to the image data bus which is used for an input of image data from the outside, and an output of image data to the outside.

In the construction of FIG. 50, the digital signal processor 46 executes the above-explained programs, and the digital signal processor 46 has a data input port, a data output port, and a program port. The digital signal processor 46 receives at the data input port image data from an image memory located outside the construction of FIG. 50 through the FIFO memory 48, and outputs from the data output port processed image data to the image memory located outside. The program port is connected to the program bus 41, and the program bus 41 is connected to the program memory 50. The contents of the respective program memory 50 and the working memory 63 are the same as the construction of FIG. 48.

Other Variations

In the above embodiment, the window of 8×2 pixels is divided into left and right windows of 4×2 pixels, and the patterns of 4×4 pixels are used for determination of the temporary label assignment rules. However, instead, the pattern of 8×2 pixels may be provided without dividing the window.

In the above embodiment, during the scanning of the image, the window is moved with a pitch which is equal to the width of the window in the horizontal direction, and the pixel values in the previous and next windows are referred to. However, alternatively, the right and left adjacent pixels and the pixels in the "NEXT WINDOW" used in the operations in FIGS. 43A to 43E, and FIGS. 44A and 44B are contained in the "CURRENT WINDOW". In this case, the window may be moved with a pitch smaller than the width of the window in the horizontal direction.

We claim:

1. A method for assigning true labels, respectively identifying connected areas contained in an image, to pixels in the image which have been assigned temporary labels in advance, comprising a step of assigning the true labels to pixels contained in at least one circumscribing area in the image, in accordance with a predetermined relationship between the temporary labels and the true labels, by scanning the image pixel by pixel within the at least one circumscribing area only, the at least one circumscribing area being predetermined so that the at least one circumscribing area contains all pixels in at least one of the connected areas contained in the image, which do not belong to a background area in the image, but less than the entire image.

2. A method for assigning true labels, respectively identifying connected areas contained in an image, to pixels in the image which have been assigned temporary labels in advance, said method comprising the steps of:
    (a) determining at least one circumscribing area so that the at least one circumscribing area contains all pixels which do not belong to a background area in the image; and
    (b) determining a true label to be assigned to each pixel in each of said at least one circumscribing area in the image, in accordance with a predetermined relationship between the temporary labels and the true labels, by scanning the image pixel by pixel, within the at least one circumscribing area only.

3. A method according to claim 2, wherein said at least one circumscribing area is determined so that each of the at least one circumscribing area contains at least one connected area constituted by pixels which are connected.

4. A method according to claim 2, wherein said information contains coordinates of the at least one circumscribing area.

5. A method according to claim 3, wherein said circumscribing area has a form of a rectangle, and said information contains coordinates of at least two corner points of the rectangle located at ends of a diagonal line of the rectangle.

6. An apparatus for assigning true labels, respectively identifying connected areas contained in an image, to pixels in the image which have been assigned temporary labels in advance, in accordance with a predetermined relationship between the temporary labels and the true labels, by scanning the image pixel by pixel, said apparatus comprising:
    a relationship storing unit storing said predetermined relationship between the temporary labels and the true labels;
    a circumscribing area storing unit storing information on location and extent of at least one circumscribing area which is predetermined so that the at least one circumscribing area contains all pixels which do not belong to a background area in the image;
    a scan unit scanning the image pixel by pixel within the extent of the at least one circumscribing area only; and
    a true label determining unit determining the true labels to be assigned to the pixels in the at least one circumscribing area only.

7. An apparatus according to claim 6, wherein said at least one circumscribing area is determined so that each of the at least one circumscribing area contains at least one connected area constituted by pixels which are connected.

8. An apparatus according to claim 6, further comprising a circumscribing area determining unit for determining the at least one circumscribing area.

9. An apparatus according to claim 6, wherein said information contains coordinates of the at least one circumscribing area.

10. An apparatus according to claim 9, wherein said circumscribing area has a form of a rectangle, and said information contains coordinates of at least two corner points of the rectangle located at ends of a diagonal line of the rectangle.

11. A product for use with an apparatus for assigning true labels, respectively identifying connected areas contained in an image, to pixels in the image which have been assigned temporary labels in advance, said product, when used with said apparatus, being able to output information which directs the apparatus to execute a process comprising a step of assigning the true labels to pixels contained in at least one circumscribing area in the image, in accordance with a predetermined relationship between the temporary labels and the true labels, by scanning the image pixel by pixel within the at least one circumscribing area only, the at least one circumscribing area being predetermined so that the at least one circumscribing area contains all pixels in at least one of the connected areas contains all pixels in at least one of the connected areas contained in the image, which do not belong to a background area in the image, but less than the entire image.

12. A product for use with an apparatus for assigning true labels, respectively identifying connected areas contained in an image, to pixels in the image which have been assigned temporary labels in advance, said product, when used with said apparatus, being able to output information which directs the apparatus to execute a process comprising the steps of:

(a) determining at least one circumscribing area so that the at least one circumscribing area contains all pixels which do not belong to a background area in the image; and (b) determining a true label to be assigned to each pixel in each of said at least one circumscribing area in the image, in accordance with a predetermined relationship between the temporary labels and the true labels, by scanning the image pixel by pixel, within the at least one circumscribing area only.

13. A product according to claim 12, wherein said at least one circumscribing area is determined so that each of the at least one circumscribing area contains at least one connected area constituted by pixels which are connected.

14. A product according to claim 12, wherein said information contains coordinates of the at least one circumscribing area.

15. A product according to claim 13, wherein said circumscribing area has a form of a rectangle, and said information contains coordinates of at least two corner points of the rectangle located at ends of a diagonal line of the rectangle.

* * * * *